US010731713B1

(12) United States Patent
Gall et al.

(10) Patent No.: US 10,731,713 B1
(45) Date of Patent: Aug. 4, 2020

(54) POWER OPERATED TRIMMING TOOL WITH CLUTCH DRIVE

(71) Applicant: Bettcher Industries, Inc., Birmingham, OH (US)

(72) Inventors: Matthew D. Gall, Strongsville, OH (US); Bernard J. Esarey, Lorain, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 7 days.

(21) Appl. No.: 16/251,417

(22) Filed: Jan. 18, 2019

(51) Int. Cl.
| F16D 23/14 | (2006.01) |
| A22B 5/16 | (2006.01) |
| F16D 11/14 | (2006.01) |
| F16D 125/64 | (2012.01) |

(52) U.S. Cl.
CPC .............. *F16D 23/14* (2013.01); *A22B 5/166* (2013.01); *A22B 5/168* (2013.01); *F16D 11/14* (2013.01); *F16D 2125/64* (2013.01); *F16D 2300/14* (2013.01)

(58) Field of Classification Search
None
See application file for complete search history.

(56) References Cited

U.S. PATENT DOCUMENTS

| 1,379,153 A | 5/1921 | Young |
| 2,387,602 A * | 10/1945 | Murden ............... F16C 35/073 |
| | | 384/606 |
| 2,540,462 A | 2/1951 | Smith |
| 2,730,100 A | 6/1956 | Hood |
| 3,174,599 A | 3/1965 | Spyridakis et al. |
| 3,197,808 A | 8/1965 | Mears |

(Continued)

FOREIGN PATENT DOCUMENTS

| CA | 1242854 | 10/1988 |
| GB | 1515047 | 6/1978 |

OTHER PUBLICATIONS

Operations Manual for Integra C Air Dermatome Manufactured by Integra LifeSciences Corporation, Copyright 2009, Cincinnati, OH (82 pages) (Exhibit A).

(Continued)

*Primary Examiner* — Colby M Hansen
(74) *Attorney, Agent, or Firm* — Tarolli, Sundheim, Covell & Tummino LLP

(57) ABSTRACT

A power operated trimming tool including a head assembly affixed to a handle assembly. The head assembly includes a frame body supporting a feed roll, a blade, a blade support and a blade retainer plate. The frame body includes an interface portion affixed to the handle assembly and a support portion extending from the interface portion. The blade support includes a cross member defining a blade support plate receiving the blade. The blade retainer plate is pivotally coupled to the frame body, in a first position, the blade retainer plate overlies the blade and, in a second position, the blade retainer plate is spaced from the blade. An in-line, clutch engagement assembly provides a pair of clutch engagement plates coupled between a flexible shaft drive transmission and a driver assembly insertable into the handle assembly of the tool to provide one-handed actuation and de-actuation of the feed roll.

21 Claims, 26 Drawing Sheets

(56) References Cited

U.S. PATENT DOCUMENTS

| | | | |
|---|---|---|---|
| 3,670,734 A | | 6/1972 | Hardy, Jr. |
| 3,885,658 A | * | 5/1975 | Ernst .................... F16D 23/14 |
| | | | 192/98 |
| 4,071,923 A | | 2/1978 | Smith |
| 4,186,461 A | | 2/1980 | Leining |
| 4,403,685 A | * | 9/1983 | Beccaris ................ F16D 23/14 |
| | | | 192/110 B |
| 4,451,953 A | | 6/1984 | Leining |
| 4,466,527 A | * | 8/1984 | Billet .................... F16D 23/14 |
| | | | 192/110 B |
| 4,794,273 A | | 12/1988 | McCullough et al. |
| 4,894,915 A | | 1/1990 | Decker et al. |
| 4,947,975 A | * | 8/1990 | Tojima ................... F16D 23/14 |
| | | | 192/110 B |
| 5,156,248 A | * | 10/1992 | Caron .................... F16D 23/12 |
| | | | 192/110 B |
| 6,006,883 A | * | 12/1999 | Husse ................... F16D 13/585 |
| | | | 192/101 |
| 6,325,194 B1 | * | 12/2001 | Thomire ................ B21C 23/08 |
| | | | 192/85.51 |
| 8,002,779 B2 | | 8/2011 | Barker et al. |
| 8,608,755 B2 | | 12/2013 | Mahaffey et al. |
| 8,814,881 B2 | | 8/2014 | Boles |
| 8,926,632 B2 | | 1/2015 | Mahaffey et al. |
| 9,121,438 B2 | | 9/2015 | Mascari |
| 9,265,263 B2 | | 2/2016 | Whited et al. |
| 9,480,263 B2 | | 11/2016 | Van Der Leest et al. |
| 9,516,887 B1 | | 12/2016 | Ewers |
| 9,913,482 B2 | | 3/2018 | Karublan |
| 2004/0187316 A1 | | 9/2004 | Whited et al. |
| 2004/0216976 A1 | | 11/2004 | Droste |
| 2009/0138027 A1 | | 5/2009 | Lucas et al. |
| 2009/0157095 A1 | | 6/2009 | Barker et al. |
| 2014/0236180 A1 | | 8/2014 | Shafirstein et al. |
| 2016/0031103 A1 | | 2/2016 | Mascart et al. |
| 2016/0174581 A1 | | 6/2016 | Van Der Least et al. |
| 2017/0142985 A1 | | 5/2017 | Chappell, Jr. |
| 2019/0069564 A1 | | 3/2019 | Sukey |

OTHER PUBLICATIONS

Instruction Manual for Zimmer TM Air Dermatome, Manufactured by Zimmer Surgical, Inc., Dover, OH, Copyright 1992 (127 pages) (Exhibit B).

Operators Manual, Integra TM, Model SB Dermatome, Manufactured by Integra LifeSciences Corporation, Plainsboro, New Jersey, Copyright 2005 (6 pages) (Exhibit C).

International Brochure for Humeca Dermatome Blades, Manufactured by Humeca BV, Enschede, The Netherlands, publication date Oct. 2008 (1page) (Exhibit D).

International Search Report and Written Opinion of the International Searching Authority dated Jun. 27, 2019 for PCT International Application No. PCT/US2019/020772, filed Mar. 5, 2019. PCT International Application No. PCT/US2019/020772 corresponds to and claims priority from the present application. (11 pages) (Exhibit E).

* cited by examiner

POWER OPERATED TRIMMING TOOL WITH CLUTCH DRIVE

TECHNICAL FIELD

The present disclosure relates to a power operated trimming tool used for effectively trimming outer layers of tissue or skin from a meat product, for example, trimming or removing an outer layer of fat from a hog carcass or a pork loin product, the trimming tool including a stationary or fixed blade and a power-driven rotating feed roll for engaging and advancing a layer of tissue toward the fixed blade for cutting the layer of tissue from the remaining product. The present disclosure also relates to an in-line, clutch drive engagement assembly interposed between a flexible shaft drive transmission and a driver assembly received in a handle assembly of the power operated trimming tool, the clutch drive engagement assembly including a two-position actuation lever facilitating one-handed actuation and de-actuation of the power-driven feed roll, as desired, and providing spring-loaded clutch engagement between a flex shaft of the flexible shaft drive transmission and a driver shaft of the driver assembly.

BACKGROUND

Power operated skinning devices are used to remove skin from animal carcasses. Such devices are disclosed, for example, in U.S. Pat. No. 4,186,461 to Leining, U.S. Pub. No. US 2016/0174581 A1 to Van Der Leest et al., and U.S. Pat. No. 9,516,887 to Ewers. Such devices typically include a driven tooth roll or feed roll which engages and advances an outer layer of tissue or skin of the animal carcass toward a fixed or stationary cutting blade which severs the outer layer of tissue from the remaining tissue of the animal carcass. The feed roll may be driven by a motor, such as a pneumatic or electric motor, disposed in a handle of the device.

SUMMARY

In one aspect, the present disclosure relates to a clutch drive engagement assembly coupled between a flexible shaft drive transmission and a driver assembly insertable into a handle assembly of a power operated tool, the flexible shaft drive transmission including an outer casing and an elongated shaft rotatable within the outer casing about a central axis of rotation, the outer casing including a drive engagement coupling and the driver assembly including a driver shaft rotatable within a tube assembly to provide rotational power to a drive train of the power operated tool, the tube assembly including a drive engagement coupler, the clutch drive engagement assembly comprising: a) a housing affixed to and extending between the drive engagement coupling of the outer casing of the flexible shaft drive transmission and the drive engagement coupler of the tube assembly of the driver assembly, the housing extending along a longitudinal axis and including a proximal end and an axially spaced apart distal end and a side wall including an inner surface and a radially spaced outer surface, the inner surface defining a longitudinally extending throughbore extending between the proximal and distal ends of the housing, the side wall including an opening, the proximal end of the housing affixed to the drive engagement coupling of the outer casing of the flexible shaft drive transmission and the distal end of the housing affixed to the drive engagement coupler of the tube assembly of the driver assembly; b) an activation collar assembly extending through the opening of the housing side wall and including a body slidably mounted on the housing and a first bearing assembly within the throughbore of the housing, the activation collar assembly moveable axially with respect to the longitudinal axis of the housing between a first deactivation position and a second activation position; c) a driveline coupler supported for rotation about a clutch axis of rotation within the throughbore of the housing by the first bearing assembly of the activation collar assembly and moving with the activation collar assembly between the first deactivation position and the second activation position, the driveline coupler including a proximal portion and an axially spaced apart distal portion, the proximal portion coupled to the elongated shaft of the flexible shaft drive transmission such that the driveline coupler rotates with the elongated shaft and the distal portion including a first clutch plate having a first clutch engagement surface; d) a driver coupler supported for rotation about the clutch axis of rotation within the throughbore of the housing, the driver coupler including a distal portion coupled to the driver shaft of the driver assembly to rotate the driver shaft as the driver coupler rotates about the driver coupler axis of rotation and a proximal portion including a second clutch plate having a second clutch engagement surface; and e) wherein as the activation collar is moved from the first deactivation position to the second activation position, the first clutch engagement surface of the first clutch plate of the driveline coupler engages the second clutch engagement surface of the second clutch plate of the driver coupler to rotate the driver coupler as the driveline coupler rotates about the clutch axis of rotation.

In another aspect, the present disclosure relates to a power operated trimming tool comprising: a) an elongated handle assembly including a throughbore extending along a longitudinal axis of the handle assembly; b) a head assembly affixed to the handle extension of the handle assembly, the head assembly including a frame body supporting a feed roll, a blade and a blade retainer assembly; c) the feed roll supported for rotation about a feed roll axis of rotation; d) the blade including a forward side, a back side, first and second lateral sides extending between the forward and back sides and an upper surface and a lower surface, a cutting edge of the blade extending along the forward side, the cutting edge being in proximity to an outer surface of the feed roll; e) the frame body including an interface portion and a support portion extending from the interface portion, the interface portion coupled to a distal end portion of the handle assembly to couple the head assembly to the handle assembly, the support portion defining an interior region and including an upper wall and first and second side walls extending from the upper wall, the first side wall including a first upwardly extending notch formed in a lower surface of the first side wall and the second side wall including a second upwardly extending notch formed in a lower surface of the second side wall; t) a blade support affixed to the frame body and overlying at least a portion of the upper surface of the blade; and g) a blade retainer plate assembly including a blade retainer plate pivotally coupled to first side wall of the frame body to pivot between a first, blade retaining position and a second, blade changing position, the blade retainer plate including a first upright and a second upright and a cross member extending between the first and second uprights, the first upright extending into the first upwardly extending notch of the first side wall of the support portion of the frame body and, in the first, blade retaining position of the blade retainer plate, the second upright extending into the second upwardly extending notch of the second side wall of the support portion of the frame body and the blade retainer plate overlying at least a portion of the lower surface of the blade.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

DETAILED DESCRIPTION

Figure 1:
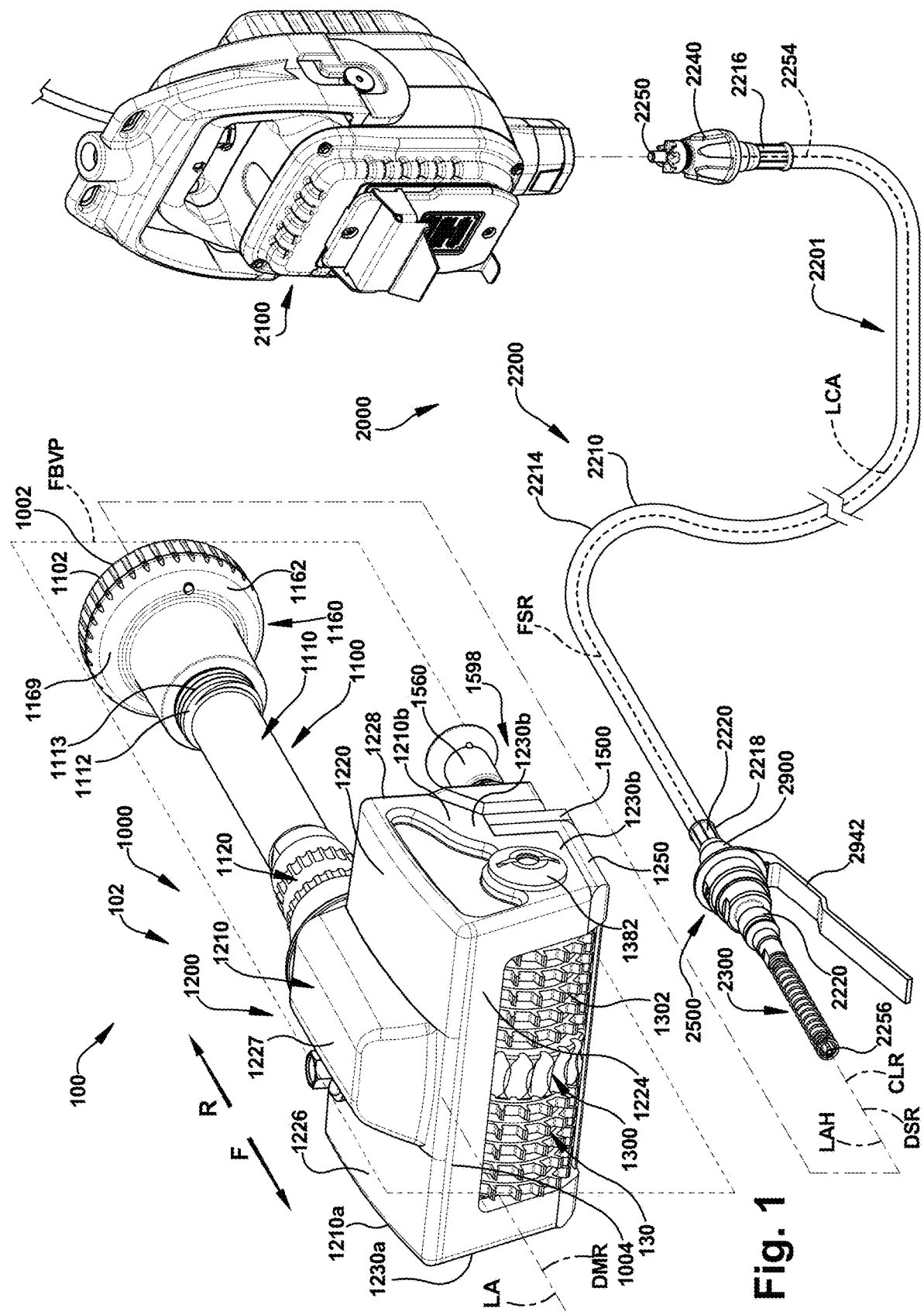
FIG. 1 is a schematic exploded, top, front perspective view of a first exemplary embodiment of a power operated trimming tool assembly of the present disclosure including a power operated trimming tool and an external drive assembly, the power operated trimming tool including a handle assembly, a head assembly, including a frame body, a feed roll assembly having a feed roll, a drive mechanism to rotate the feed roll about a feed roll axis of rotation, a fixed blade having a cutting edge, a blade support assembly for supporting the blade in a fixed position with respect to the rotating feed roll, and a blade retainer assembly and the external drive assembly including a clutch drive engagement assembly, a driver assembly, a flexible shaft drive transmission assembly and an external motor.

The present disclosure relates to a power operated tool assembly shown generally at 100 in FIG. 1. The power operated tool assembly 100 includes a power operated tool 102, including a rotating tool element 130, and an external drive assembly 2000 for providing motive power to rotate the rotating tool element 130 of the power operated tool 102. The external drive assembly 2000 includes a clutch drive engagement assembly of the present disclosure, shown generally at 2500 in FIG. 1. The external drive assembly 2000 also includes a motor 2100 which is external to the power operated tool 102 and a shaft drive transmission assembly 2200 operatively coupled between the power operated tool 102 and the external motor 2100. The shaft drive transmission assembly 2200 includes a driver assembly 2300, a flexible shaft drive transmission 2201 and the clutch drive engagement assembly 2500, which is operatively coupled between the driver assembly 2300 and the flexible shaft drive transmission 2201. The driver assembly 2300 is coupled to the power operated tool 102 and includes a rotating driver shaft 2370 that provides rotational power to the rotating tool element 130, while the flexible shaft drive transmission 2201 is coupled to the external motor 2100 and includes a drive or flex shaft 2250 that is rotated by an output shaft (not shown) of the external motor 2100.

Figure 17:
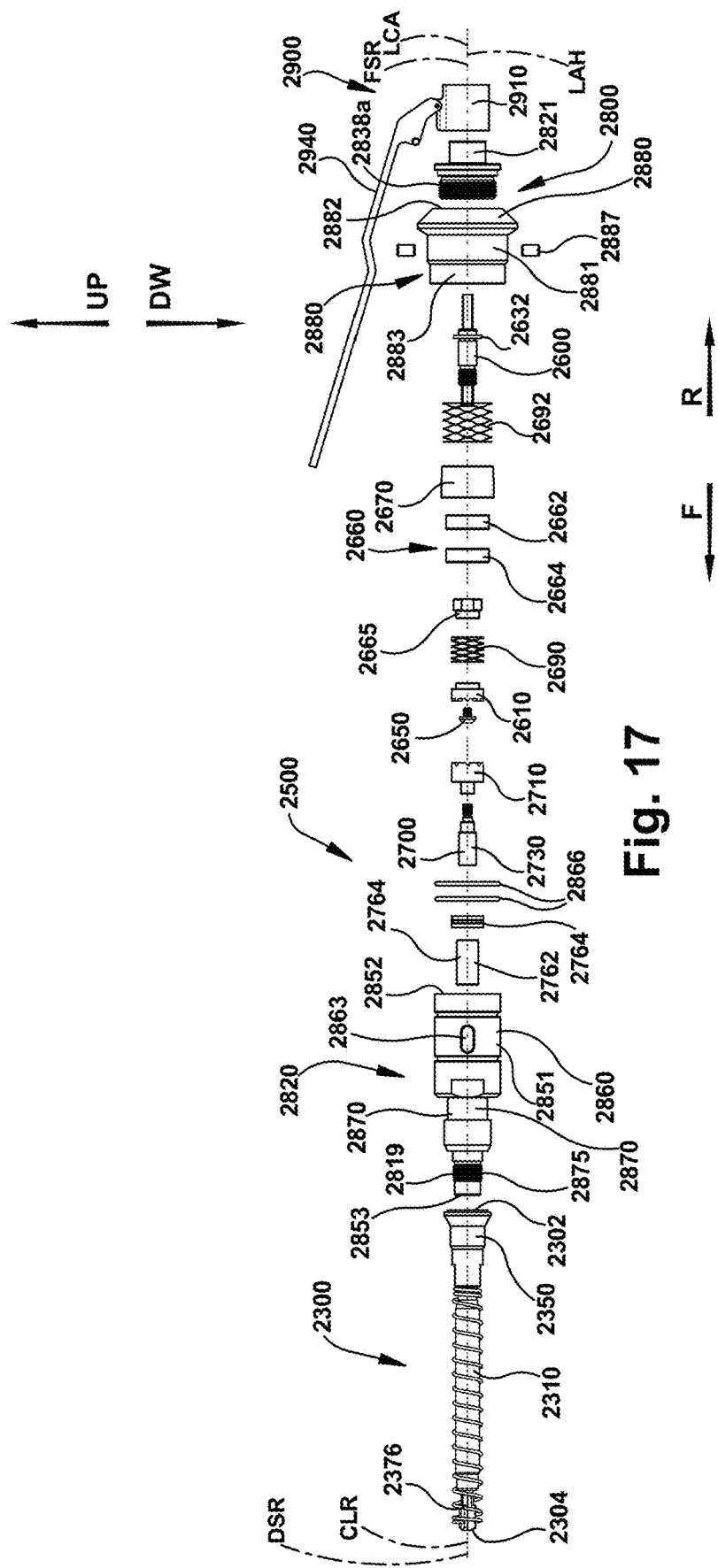
FIG. 17 is a schematic exploded, side elevation view of the clutch drive engagement assembly and driver assembly of the external drive assembly of FIG. 15.
Figure 18:
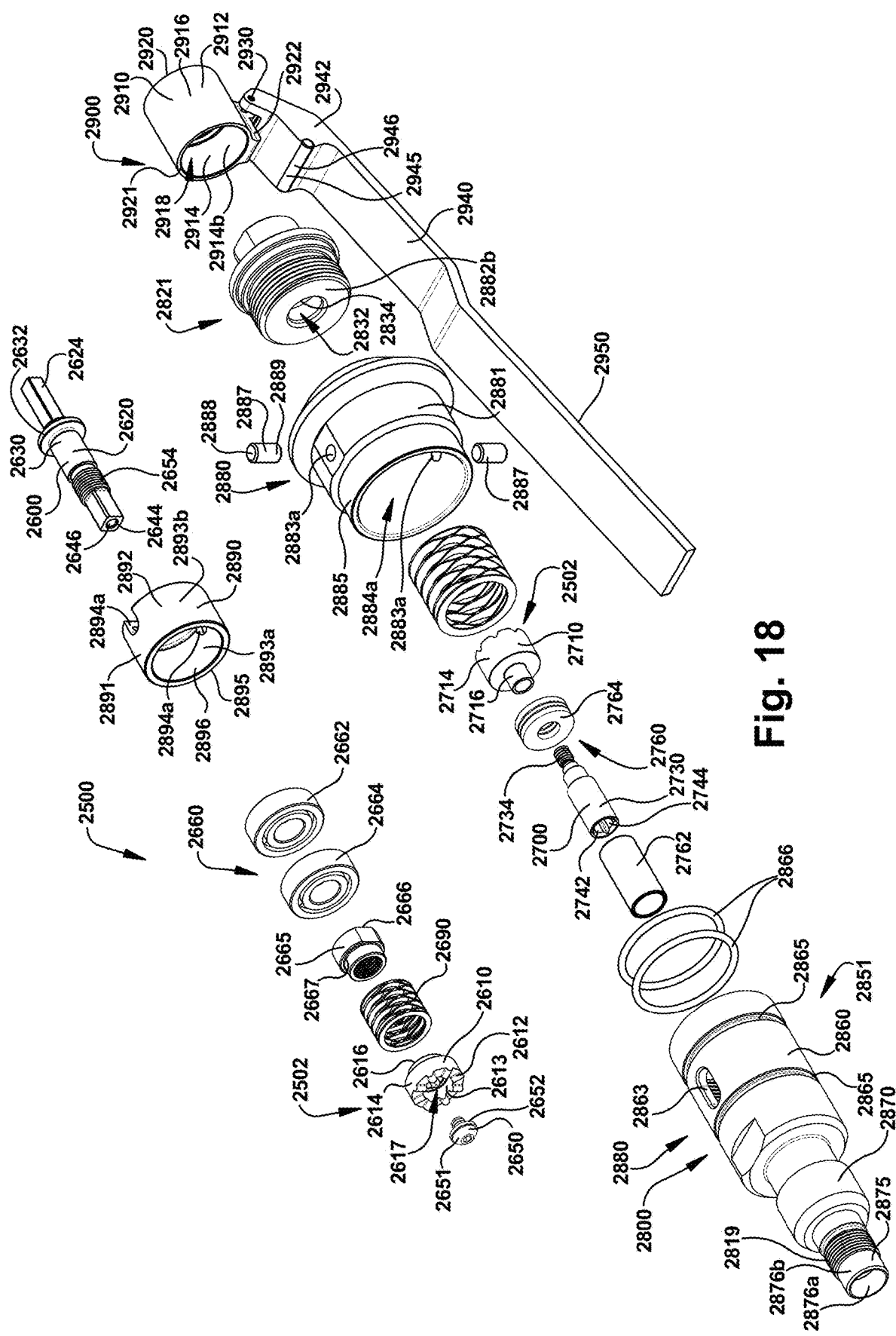
FIG. 18 is a schematic exploded, top, front perspective view of the clutch drive engagement assembly of FIG. 15.
Figure 19:
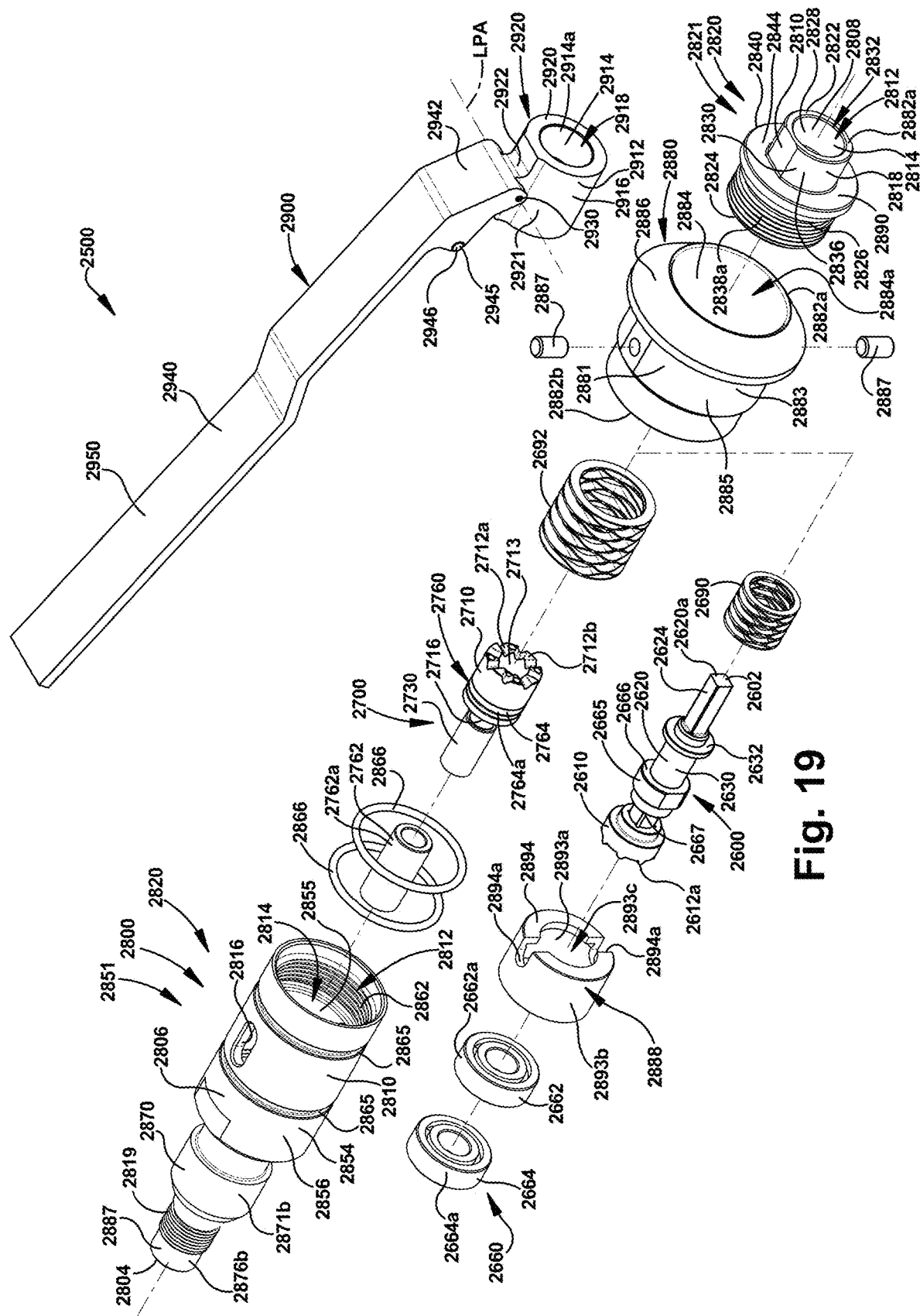
FIG. 19 is a schematic exploded, top, rear perspective view of the clutch drive engagement assembly of FIG. 15.

The clutch drive engagement assembly 2500, shown in greater detail in FIGS. 14-28, provides a clutch drive 2502 in the form of an in-line, spring-loaded, clutch engagement 3000 between opposing clutch plates 2610, 2710 of a driveline coupler 2600 and a driver coupler 2700 of the clutch drive engagement assembly 2500. In one exemplary embodiment of the present disclosure, the clutch drive 2500 includes the axially aligned driveline and driver couplers 2600, 2700, both of which rotate about a common clutch axis of rotation CLR. The flex shaft 2250 of the flexible shaft drive transmission 2201 is coupled to and rotates the driveline coupler 2600 about the clutch axis of rotation CLR. As best seen in FIGS. 17-19, the clutch drive engagement assembly 2500 also includes a lever assembly 2900 including an actuation lever 2940. When the actuation lever 2940 is moved from a de-actuation position 2999 (FIG. 16A) to an actuation position 2998 (FIG. 16B), the driveline coupler 2700 is moved axially in a forward direction F toward the power operated tool 102 such that the clutch plate 2610 of the driveline coupler 2600 engages the clutch plate 2710 of the driver coupler 2700 thereby mechanically coupling, through clutch engagement, the driveline coupler 2600 and the driver coupler 2700. When the actuation lever 2940 is in the actuation position 2998, the clutch drive 2502 results in concomitant rotation of the driver shaft 2370 of the driver assembly 2300, the driver coupler 2700, the driveline coupler 2600, the flex shaft 2250 of the flexible shaft drive transmission 2201, and the motor output shaft of the external motor 2100 to rotatably drive the rotating tool element 130 of the power operated tool 102.

In one exemplary embodiment of the present disclosure, the power operated tool 102 comprises a power operated trimming tool 1000 and the rotating tool element 1300 comprises a power-driven, rotating feed roll 1302 of a feed roll assembly 1300. As best seen in FIGS. 4-12, the power operated trimming tool 1000 includes a drive train or drive mechanism 1600 which is operatively coupled to the feed roll 1302 and rotates the feed roll 1302 about a feed roll axis of rotation FRR. The drive mechanism 1600 rotates about a drive mechanism axis of rotation DMR, which is spaced from or offset from and substantially orthogonal to the feed roll axis of rotation FRR. The power operated trimming tool 1000 further includes an elongated handle assembly 1100 and a head assembly 1200 disposed at a distal end 1104 of the elongated handle assembly 1100. The handle assembly 1100 is centered about and extends along a central longitudinal axis LA of the handle assembly 1100 and includes a longitudinal throughbore 1106 extending through the handle assembly 1100. The handle assembly longitudinal axis LA is substantially co-incident with the drive mechanism axis of rotation DMR.

The head assembly 1200 of the power operated trimming tool 1000 includes a frame body 1210 having an interface portion 1212 that is coupled to the distal end portion 1104 of the handle assembly 1100 and a support portion 1220. The support portion 1220 of the frame body 1210 supports the feed roll assembly 1300 and a stationary cutting blade 1400 which cuts or severs a layer of tissue which is advanced toward a forward cutting edge 1420 of the blade 1400 as the feed roll 1302 rotates about the feed roll axis of rotation FRR. The blade 1400 (FIGS. 5 and 14) is relatively thin, generally planar and, in plan view, is generally rectangular. The blade 1400 includes a front side 1410, which defines the cutting edge 1420, and a back side 1412 and an upper surface 1418 and a lower surface 1419. The front and back sides 1410, 1412 are spaced apart by lateral sides 1414, 1416. The frame body support portion 1220 also supports a blade support or blade support assembly 1250 and a blade retainer or blade retainer assembly 1500, which function to position and secure the stationary blade 1400 in proximity to the feed roll 1302.

The support portion 1220 of the frame body 1210 includes a pair of parallel, spaced apart side walls 1230a, 1230b. The side walls 1230a, 1230b of support portion 1220 of the frame body 1210 support both the blade support assembly 1250 and the blade retainer assembly 1500. The stationary blade 1400 is sandwiched between the blade support assembly 1250, which includes a blade support plate 1272, which overlies and supports a portion of an upper surface 1418 of the blade 1400, and the blade retainer assembly 1500, which includes a blade retainer plate 1510, which overlies and supports a portion of a lower surface 1419 of the blade 1400. The blade retainer assembly 1500 advantageously pivots between a first, blade retaining position 1598 (FIGS. 4 and 10) securing the blade 1400 against the blade support assembly 1220 and a second, blade changing position 1599 (FIGS. 5 and 9) where the blade 1400 is uncovered by the blade retainer plate 1510 thereby providing easy access to an entirety of the blade 1400 such that the blade 1400 can easily be picked up and removed from the blade support assembly 1220 for sharpening or replacement of the blade 1400. Advantageously, the blade retainer plate 1510 pivots about a pivot axis BRPA that is offset from but substantially parallel to the handle assembly longitudinal axis LA. The blade retainer plate pivot axis BRPA is offset from the blade 1400 and extends through and is substantially parallel to the side wall 1230a of a support portion 1220 of the frame body 1210.

Figure 5:
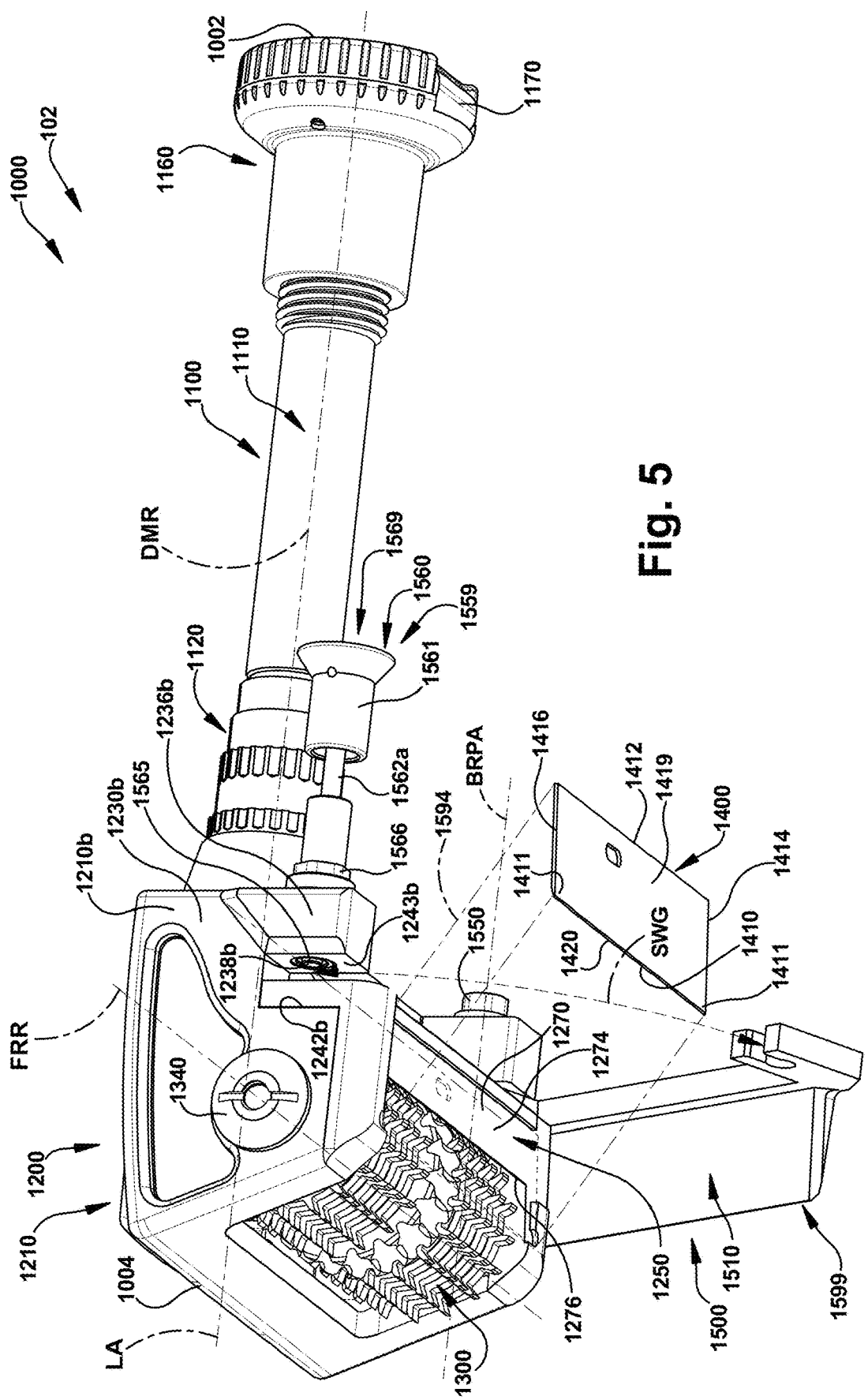
FIG. 5 is a schematic bottom, front perspective view of the power operated trimming tool of FIG. 4, with the blade retainer assembly in a second blade changing position and with the blade removed from the blade support.
Figure 13:
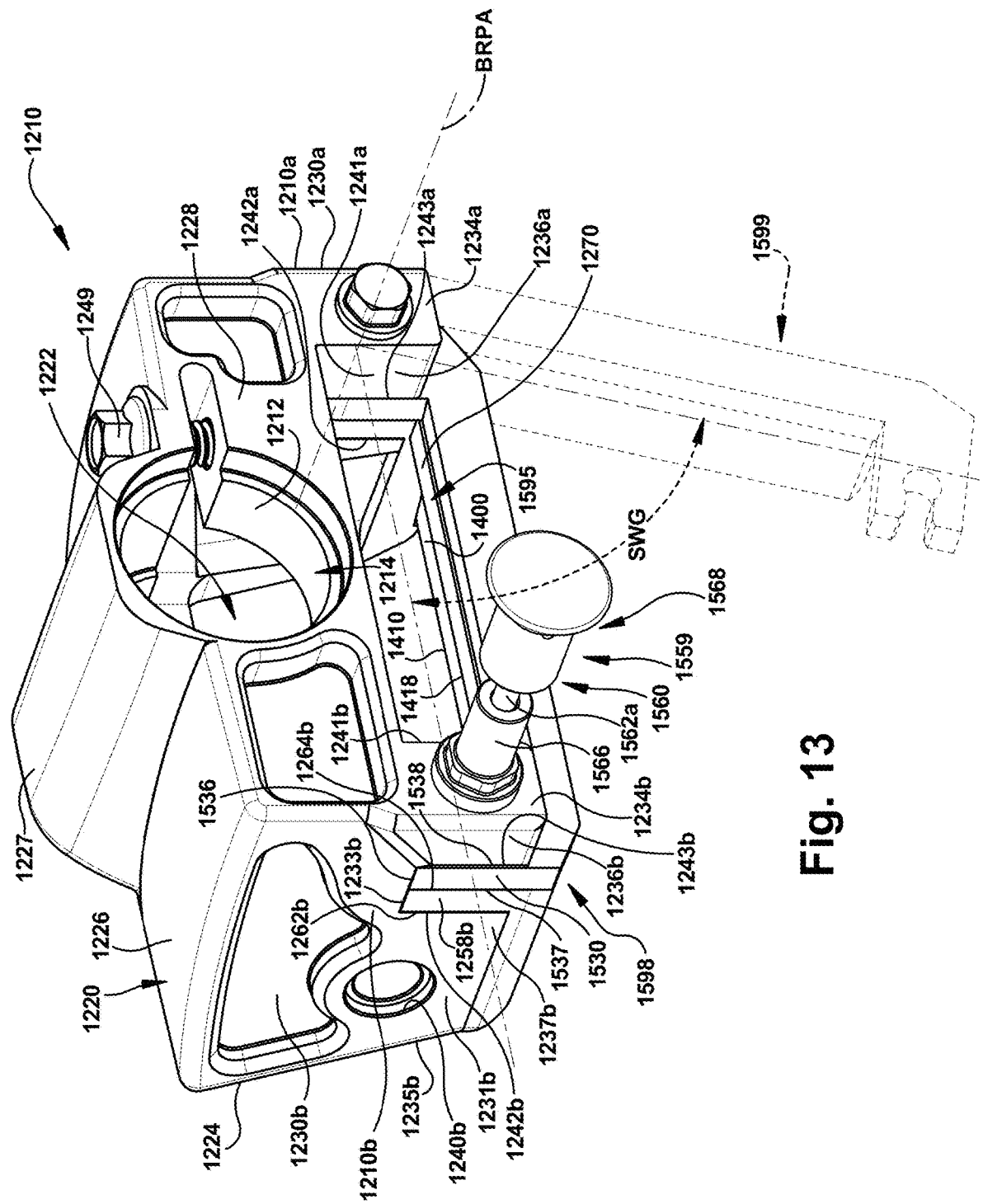
FIG. 13 is a schematic top, rear perspective view of the frame body of the head assembly of the power operated trimming tool of FIG. 4.

As best seen in FIGS. 5 and 13, the offset blade retainer plate pivot axis BRPA of the blade retainer assembly 1500 advantageously provides that the blade retainer plate 1510 has a swing angle SWG of approximately 90° such that, in the second, blade changing position 1599, the blade retainer plate 1510 is spaced from the entirety of the blade 1400 and a blade-changing region 1594 (shown schematically by dashed lines labeled 1594 in FIG. 5) axially above and adjacent to the blade 1400. In the second, blade changing position 1599, the position of the trimming tool 1000 will be inverted such that when the blade retainer plate 1510 is pivoted or swung away from the blade 1400, the blade 1400 will be resting on the blade support plate 1272 of the blade support assembly 1250. That is, the if the position of the trimming tool 1000 was not in the inverted position, pivoting or swinging the blade retainer plate 1510 away from the blade 1400 would cause the blade 1400 to fall from the blade support plate 1272 to the ground due to gravitational force. Stated another way, the blade-changing region 1594 is an area or volume axially above the blade 1400 through which the blade 1400 would move when removing the blade 1400 from the blade support plate 1272 of the blade support assembly 1250 or installing a new blade 1400 onto the blade support plate 1272 of the blade support assembly 1250. Additionally and advantageously, in the first, blade retaining position 1598 of the blade retainer plate 1510, the blade retainer plate 1510 functions to position a comb 1570 in proximity to the feed roll 1302. The comb 1570 includes a plurality of space apart angled projections 1577 that engage the layer of tissue severed by the action of stationary blade 1400 as the feed roll 1302 rotates and directs the severed tissue rearwardly through an exit opening 1595 defined by the frame body 1210, the blade support plate 1272 of the blade support assembly 1250, and the blade retainer plate 1510 of the blade retainer assembly 1500.

The external drive assembly 2000 provides rotational power to the drive train 1600 of the power operated trimming tool 1000 to rotatably drive the feed roll 1302 about its axis of rotation FRR. In one exemplary embodiment, the driver assembly 2300 of the shaft drive transmission assembly 2200 extends into the longitudinal throughbore 1106 extending through the handle assembly 1100 and is held in position with respect to the handle assembly 1100 by a driver retainer assembly 1160.

External Drive Assembly 2000

As schematically illustrated in FIG. 1, the external drive assembly 2000 of the power operated tool assembly 100 provides motive power to the drive train 1600 of the power operated trimming tool 1000 to rotatably drive the feed roll 1302 about its axis of rotation FRR. The external drive assembly 2000 includes the external motor 2100 having a rotating output shaft which provides rotational power to the drive train 1600. The external drive assembly 2000 also includes the shaft drive transmission assembly 2200 which mechanically couples the rotating output shaft of the external motor 2100 to the drive train 1600 of the power operated trimming tool 1000. The shaft drive transmission assembly 2200 comprises the flexible shaft drive transmission 2201, the driver assembly 2300 and the in-line, clutch drive engagement assembly 2500. The clutch drive engagement assembly 2500 is interposed between the flexible shaft drive transmission 2201 and the driver assembly 2300.

The flexible shaft drive transmission 2201 includes an outer casing assembly 2210 and the elongated drive shaft or flex shaft 2250 disposed within a longitudinal throughbore 2212 defined by the outer casing assembly 2210. The flex shaft 2250 is rotatable about a flex shaft axis of rotation FSR and extends along a central longitudinal axis LCA of the flex shaft 2250 that is coincident with the flex shaft axis of rotation FSR. A distal end portion 2252 of the flex shaft 2250 includes a drive fitting 2256. The drive fitting 2256 engages and rotatably drives a mating driven fitting 2624 at a proximal end 2620a of a shaft 2620 of the driveline coupler 2600 thereby rotating the clutch drive 2502 about the clutch axis of rotation CLR. The outer casing assembly 2210 includes a tubular outer casing 2214, a clutch engagement coupling 2220 at a proximal end 2216 of the outer casing 2214, and a motor end coupling 2240 at a distal end 2218 of the outer casing 2214. The clutch engagement coupling 2220 of the outer casing assembly 2210 is releasably coupled to a proximal coupling 2818 formed at a proximal end 2802 of a housing 2800 of the clutch drive engagement assembly 2500.

The driver assembly 2300 includes driver shaft 2370 rotatably supported within a tube assembly 2310. The driver assembly 2300 also includes a clutch housing coupling 2350 rotatably coupled to a proximal end 2312 of the tube assembly 2310. A forward portion 2304 of the driver assembly 2300 is received within the longitudinal throughbore 1106 of the handle assembly 1100. The driver assembly 2300 includes the driver shaft 2270 supported by the tube assembly 2210 for rotation about a driver shaft axis of rotation DSR. In addition to providing a contact surface for the latch 1170 of the driver retainer assembly 1160 of the handle assembly 1100, the clutch housing coupling 2350 also includes a threaded inner surface 2358 for releasably or detachably affixing a distal coupling 2819 formed at a distal end 2804 of the housing 2800 of the clutch drive engagement assembly 2500. A drive fitting 2376 disposed at a distal end portion 2374 of the driver shaft 2370 engages the drive train 1600 of the power operated trimming tool 1000 such that rotation of the driver shaft 2370 about its driver shaft axis of rotation DSR rotates the drive train 1600 about the drive mechanism axis of rotation DMR and thereby rotates the feed roll 1302 about its axis of rotation FRR. A proximal end portion 2372 of the driver shaft 2370 includes a driven fitting 2373. The driven fitting 2373 of the driver shaft 2370 is received in a drive fitting 2744 formed at a distal end 2704 of the driver coupler 2700 of the clutch drive engagement assembly 2500 such that rotation of the driver coupler 2700 about the clutch axis of rotation CLR rotates the driver shaft 2370 about its axis of rotation DSR. In one exemplary embodiment the driven fitting 2373 is square in cross section and the drive fitting 2744 is a female, square opening fitting.

As best seen in FIG. 1, the external motor 1800 is remote from the power operated trimming tool 1000 thereby advantageously providing for a lighter weight for the power operated trimming tool 1000 compared to, for example, a power operated trimming tool wherein a pneumatic or electric motor is mounted in a handle assembly of the trimming tool. As an operator must manipulate the trimming tool 1000 to properly orient and move the tool 1000 when cutting a layer of tissue from a workpiece (not shown), a reduction in weight of the tool 1000 reduces operator fatigue and provides for increased operator productivity over a work shift. Additionally, and advantageously, the drive mechanism 1600 of the power operated trimming tool 1000 may be configured to provide an optimal rotational speed for the feed roll 1302 such that a desired linear feed rate, as measured at an outer surface 1312 of the feed roll 1302 may be achieved given the characteristics of the workpiece to be cut or trimmed, i.e., removing or trimming an outer layer of fat tissue from a hog carcass or a pork loin product.

Clutch Drive Engagement Assembly 2500

The external drive assembly 2000 includes the in-line, clutch drive engagement assembly 2500 of the present disclosure. The in-line clutch drive engagement assembly 2500 advantageously provides for one-handed actuation and de-actuation of the drive mechanism 1600 and the feed roll 1302 of the power operated trimming tool 1000, as desired, and additionally, via engagement of respective annular, contoured engagement surfaces 2612, 2614 of opposing or facing clutch plates 2710, 2710 of the driveline coupler 2600 and the driver coupler 2700 of the assembly 2500, provides for the in-line, spring-loaded, clutch engagement 3000 (shown schematically in FIG. 16B) between the flex shaft 2250 of the flexible shaft drive transmission 2201 and the driver shaft 2270 of the driver assembly 2300. The clutch drive engagement assembly 2500 includes the housing 2800 and the clutch drive 2502, including the driveline and driver couplers 2600, 2700. The housing 2800 of the clutch drive engagement assembly 2500 is generally cylindrical and includes the proximal end portion 2802, including the proximal coupling 2818, which engages the clutch drive engagement coupling 2220 of the outer casing assembly 2210, and an axially spaced apart distal end portion 2804, including the distal coupling 2819, which engages the clutch housing coupling 2350 of the driver assembly 2300. As best seen in FIGS. 20-26, the housing 2800 includes a generally cylindrical side wall 2806 defining an inner surface 2808 and a radially spaced apart outer surface 2810. The inner surface 2808 of the housing 2800 defines a throughbore 2812, which, in turn, defines an interior region 2814 of the housing 2800. The housing throughbore 2812 extends along and is centered about a central longitudinal axis LAH of the housing 2800. The central longitudinal axis LAH of the throughbore 2812 is substantially coincident with the handle assembly longitudinal axis LA, the drive mechanism axis of rotation DMR of the trimming tool 1000, the driver shaft axis of rotation DSR of the driver shaft 2270 of the driver assembly 2300, and the clutch axis of rotation CLR of the clutch drive engagement assembly 2500. With respect to the description of the external drive assembly 2000, by axial or longitudinal extent or direction, it is meant in the direction parallel to or along of the central longitudinal axis LAH of the housing 2800 or the clutch axis of rotation CLR.

With respect to the description of the external drive assembly 2000 and components and assemblies thereof, by axial or longitudinal extent or direction, it is meant in the direction parallel to or along the central longitudinal axis LAH of the housing 2800, the driver shaft axis of rotation DSR, or the clutch axis of rotation CLR in either the forward or distal direction F or the rearward or proximal direction R. Further, with respect to the description of the external drive assembly 2000 and components and assemblies thereof, the forward direction F is a direction along or parallel to the housing central longitudinal axis LAH toward the power operated trimming tool 1000, while the rearward direction R is opposite the forward direction F, that is, in the direction of the external motor 2100.

Supported within the throughbore 2812 of the housing 2800 is the driveline coupler 2600 and the driver coupler 2700 which include respective first and second clutch plates 2610, 2710 allowing for selective clutch engagement of the driveline and driver couplers 2600, 2700. The driveline coupler 2600 is operatively connected to the flex shaft 2250 of the flexible shaft drive transmission 2201 while the driver coupler 2700 is operatively connected to the driver shaft 2370 of the driver assembly 2300. The driveline coupler 2600 (including the driveline coupler or first clutch plate 2610) and the driver coupler 2700 (including the driver coupler or second clutch plate 2710) rotate about the common clutch axis of rotation CLR. The clutch axis of rotation CLR is substantially coincident with the driver shaft axis of rotation DSR of the driver shaft 2270 of the driver assembly 2300 and is substantially coincident with the flex shaft axis of rotation FSR of the flex shaft 2250 in the region of the drive fitting 2256 at a distal end portion 2252 of the flex shaft 2250. Hence, because of the advantageously alignment of the axes of rotation CLR, FSR and DSR of the driveline coupler and driver coupler 1600, 2700, the flex shaft 2250 and the driver shaft 2270, the clutch drive engagement assembly 2500 of the present disclosure advantageously provides for "in-line" clutch engagement between the drive shaft or flex shaft 2250 of the flexible shaft drive transmission 2201 and the driver shaft 2270 of the driver assembly 2300.

The driveline coupler 2600 includes the first clutch plate 2610 at a distal end portion 2604 of the driveline coupler 2600 and the driver coupler 2700 includes the second clutch plate 2710 at a proximal end portion 2702 of the driver coupler 2700. The clutch drive engagement assembly 2500 further includes an activation collar assembly 2880 including an activation collar or annular body 2881 slidably mounted on an outer surface 2810 of the housing 2800. The annular body 2881 of the activation collar assembly 2880, is moved by the actuation lever 2940 of the lever assembly 2900 of the clutch drive engagement assembly 2500, to slide along the outer surface 2810 the housing 2800 from a first, activation position 2898 of the activation collar assembly 2880 (FIG. 16B) in which the first and second clutch plates 2610, 2710 are operatively coupled or in clutch engagement or contact 2798 and a second, de-activation position 2899 (FIG. 16A) of the activation collar assembly 2880 in which the first and second clutch plates 2610, 2710 are decoupled or disengaged 2799. The condition wherein the first and second clutch plates 2610, 2710 are operatively coupled or in clutch engagement or contact shall be referred to as an engagement condition or position 2798 of the clutch plates 2610, 2710 or the engagement condition or position 2798 of the clutch driven engagement assembly 2500, while the condition wherein the first and second clutch plates 2610, 2710 are decoupled or disengaged shall be referred to as a disengagement condition or position 2799 of the clutch plates 2610, 2710 or the disengagement condition or position 2799 of the clutch driven engagement assembly 2500.

The driveline coupler 2600 is operatively coupled to the flex shaft 2250 of the flexible shaft drive transmission 2201 and rotates with the flex shaft 2250. The drive clutch engagement assembly 2500 further includes the lever assembly 2900 including an annular base 2910 and an actuation lever 2940 pivotally coupled to the annular base 2910. The annular base 2910 of the lever assembly 2900 is mounted to the housing assembly 2900 and the actuation lever 2940 is pivoted by the operator of the power operated trimming tool 100 between two positions: a) a first, actuation position 2998 of the actuation lever 2940 wherein the actuation lever 2940 moves the activation collar 2880 such that the activation collar 2880 is in the first, activation position 2898 of the activation collar 2880, and the clutch plates 2610, 2710 are in the engagement position 2798, that is, the drive clutch engagement assembly 2500 mechanically couples the rotating flex shaft 2250 of the flexible shaft drive transmission 2201 to the driver shaft 2270 of the driver assembly 2300 to thereby actuate or drive the drive mechanism 1600 and the feed roll 1302 of the power operated trimming tool 1000 to rotate about their respective axes of rotation DMR, FRR; and b) a second, de-actuation position 2999 of the actuation lever 2940 wherein the activation collar 2880 is in the second, de-activation position 2899, and the clutch plates 2610, 2710 are in the disengagement position 2799, that is, the drive clutch engagement assembly 2500 mechanically decouples the rotating flex shaft 2250 of the flexible shaft drive transmission 2201 and the driver shaft 2270 of the driver assembly 2300 to thereby de-actuate the drive mechanism 1600 and the feed roll 1302 of the power operated trimming tool 1000 such that the feed roll 1302 and drive mechanism 1600 do not rotate about their respective axes of rotation FRR, DMR.

The driveline coupler 2600 is supported for rotation about the clutch axis of rotation CLR by a first or driveline coupler bearing assembly 2660, which is part of an axially movable activation collar assembly 2880, while the driver coupler 2700 is supported by a stationary second or driver coupler bearing assembly 2760. The activation collar assembly 2880 includes a body or casing 2881 which overlies and slides along the outer surface 2810 of the housing 2800. In one exemplary embodiment, the body 2881 is an annular body. In one exemplary embodiment, a pair of radially inwardly extending projections 2887 of the activation collar assembly 2880 extend radially inwardly from an inner surface 2884 of the annular body 2881 and pass through respective ones of a pair of slotted openings or slots 2816 in the side wall 2806 of the housing 2800 and extend into the interior region 2814 of the housing 2800 defined by the throughbore 2812. The pair of projections 2887 of the activation collar assembly 2880 engage a bearing guide 2890 of the activation collar assembly 2880. In one exemplary embodiment, the bearing guide 2890 comprises a cylindrical body or sleeve 2891. An inner surface 2893a of the bearing guide cylindrical sleeve 2891 defines a seating surface 2896 for at least a portion of the first, driveline bearing assembly 2660, which, in turn, supports the driver coupler 2600 for rotation about the clutch axis of rotation CLR. The arrangement of the components of the activation collar assembly 2880 is such that the bearing guide 2891, the pair of projections 2887 and the actuation collar or annular body 2881, as well as the driveline coupler 2600 and first, driveline coupler bearing assembly 2660, move in unison between the activation position 2898 and the de-activation position 2899 of the activation collar assembly 2880. In one exemplary embodiment, the respective slots of the pair of slotted openings 2816 of the housing side wall 2806 are circumferentially spaced approximately 180° apart.

Advantageously, a return spring 2692 is sandwiched between an interior shoulder 2864 of the housing 2880 and a distally facing surface 2895 of the cylindrical sleeve 2891 of the bearing guide 2890 such that the actuation collar assembly 2880 is biased to the de-activation position 2899. That is, as soon as the operator releases pressure on the actuation lever 2940 of the lever assembly 2900 when the lever 2940 is in the first, actuation position 2998, the return spring 2692 will move the bearing guide 2890 and the entire actuation collar assembly 2880 axially in the rearward direction R to the de-activation position 2899. As this occurs, the actuation lever 2940 will pivot away from the handle assembly 1000 to the second, de-actuation position 2999 of the actuation lever 2940 and the first and second clutch plates 2610, 2710 will decouple such that the clutch drive engagement assembly 2500 returns to the disengagement condition or position 2799.

The drive clutch engagement assembly 2500 additionally includes a clutch spring 2690 and the return spring 2692 disposed within the housing 2800. The clutch spring 2690 is positioned between the activation collar 2880 and the first clutch plate 2610, while the return spring 2692 is positioned between the housing 2800 and the bearing guide 2890 which is part of the activation collar assembly 2880. When the actuation lever 2940 of a lever assembly 2900 of the clutch drive engagement assembly 2500 is moved or pivoted by the operator of the trimming tool 1000 to first, engagement position 2992, an engagement surface 2945 of the actuation lever 2940 engages an engagement surface 2888a of the activation collar body 2881 causing the activation collar body 2881 to slide along the housing 2800 in a forward or distal direction F.

In one exemplary embodiment, the engagement surface 2945 of the actuation lever 2940 includes a roller 2946 which rolls along the engagement surface 2888a of the activation collar body 2881. Sliding movement of the activation collar 2880 in the forward direction F causes the clutch spring 2690 to compress and bear against the first clutch plate 2610. The movement of the activation collar 2880 in the forward direction F and the compression of the clutch spring 2690. The spring force of the clutch spring 2690 against the first clutch plate 2610 causes operative coupling or engagement of respective contoured engagement surfaces 2612, 2712 of the first and second clutch plates 2610, 2710, i.e., the engagement position 2798 of the first and second clutch plates 2610, 2710. This operative engagement of the first and second clutch plates 2610, 2710 results in mechanical coupling of the rotating flex shaft 2250 of the flexible shaft drive transmission 2201 and the driver shaft 2270 of the driver assembly 2300 thereby actuating or driving the drive mechanism 1600 and the feed roll 1302 of the power operated trimming tool 1000 to rotate about their respective axes of rotation DMR, FRR. Since the spring force of the clutch spring 2690 is limited, advantageously, if an over-torque condition occurs, for example, due to a lock up of the feed roll 1302, the second clutch plate 2710 and thus the driver coupler 2700 will not rotate even if the first clutch plate 2610 and the second clutch plates 2710 are in the engagement position 2798. That is, the drive clutch engagement assembly 2500 is advantageously designed, such that, under certain operating conditions, to allow the first and second clutch plates 2610, 2710 to "slip" with respect to each other (that is, the first clutch plate 2610 rotates with the flex shaft 2250, while the second clutch plate 2710 and the driver shaft 2370 of the driver assembly 2300 does not rotate, hence, clutch "slip") such that an over-torque condition resulting from a lock up of the feed roll 1302, while the flex shaft 2250 continues to rotate about the flex shaft axis of rotation FSR, is not transferred through the handle grip of the handle assembly 1100 to the hand of the operator holding the trimming tool 1000. Rather, under certain operating conditions, the over-torque condition resulting from feed roll lock up is dissipated or absorbed by the slippage or rotation between the first and second clutch plates 2610, 2710 when the clutch plates 2610, 2710 are in the engagement position 2798.

When the actuation lever 2940 is in the first, actuation position 2998, the return spring 2692 is also compressed as the activation collar 2880 moves in the forward direction F to its activation position 2898. The return spring 2692 is disposed between the bearing guide 2890 and the first shoulder 2864 formed on an inner surface 2808 of the housing 2800. In one exemplary embodiment, the housing 2800 comprises a two-part housing assembly 2820 and an inner surface 2855 of a second, distal housing part 2851 of the two-part housing assembly 2820 includes the first shoulder 2864. The shoulder 2954 is disposed forward of or distal to the activation collar assembly 2880, thus, the biasing force of the return spring 2692 urges the activation collar 2880 in the rearward or proximal direction R. When the operator of the trimming tool 1000 releases the actuation lever 2940, thereby allowing the actuation lever 2940 to pivot or move to the second de-actuation position 2999, the return spring 2692 works to urge or move the activation collar 2880 in the rearward or proximal direction R to its deactivation position 2899. Specifically, the return spring 2692 bears against the distally facing surface 2895 of a side wall 2892 of the cylindrical sleeve 2891 of the bearing guide 2890. The return spring 2692 biases the bearing guide 2890 toward the activation collar 2880, thus, the return spring 2692 constrains the activation collar body 2881, the pair of projections 2887, the bearing guide 2890, the first or driveline bearing assembly 2660 and the driveline coupler 2600 to move in unison in both the forward direction F and the rearward direction R. Thus, movement of the activation collar body 2881 is to be understood as implying concurrent movement of the aforementioned components and vice versa.

Movement of the activation collar body 2881 in the rearward direction R resulting from the operator releasing the actuation lever 2940 and the biasing force of the return spring 2692 causes two results: a) the compression of the clutch spring 2690 is reduced thus the spring force exerted by the clutch spring 2690 on the first clutch plate 2610 is reduced resulting in the first clutch plate 2610 disengaging from or decoupling from the second clutch plate 2710, that is, moving to the disengagement condition 2799; and b) the movement of the activation collar body 2881 in the rearward direction R pushes against the engagement surface 2945 of the actuation lever 2940 causing the actuation lever to pivot outwardly from the handle assembly 1100 to the second de-actuation position 2999. Disengagement of the first and second clutch plates 2610, 2710 results in mechanical decoupling of the rotating flex shaft 2250 of the flexible shaft drive transmission 2201 and the driver shaft 2270 of the driver assembly 2300 thereby de-actuating the drive mechanism 1600 and the feed roll 1302 of the power operated trimming tool 1000 such that the feed roll 1302 and drive mechanism 1600 do not rotate about their respective axes of rotation FRR, DMR. Hence, because of the clutch and return springs 2690, 2692, the activation collar 2880 and the lever assembly 2900, the clutch drive engagement assembly 2500 of the present disclosure advantageously provides for one hand operation of the power operated trimming tool 1000.

Figure 24:
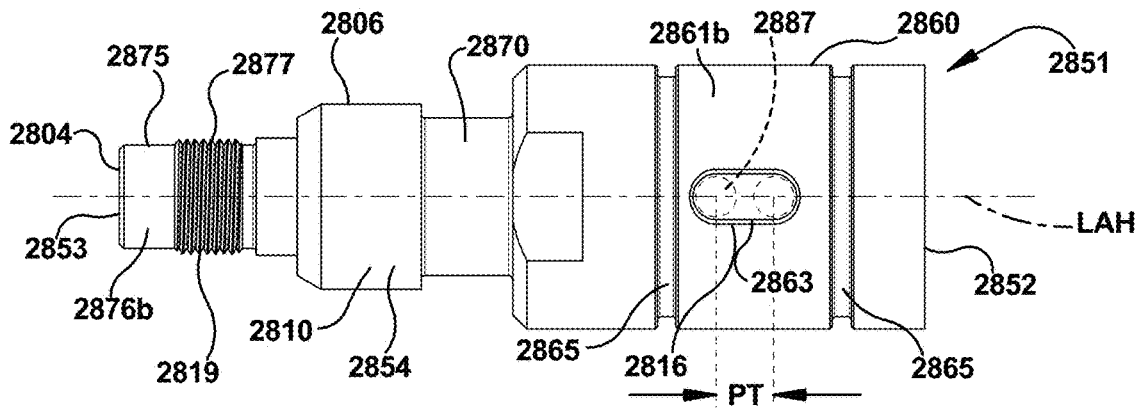
FIG. 24 is a schematic top plan view of a second distal housing part of the two part housing assembly of FIG. 20.

The clutch drive engagement assembly 2500 includes the housing 2800, the activation collar assembly 2880 including the annular sleeve or body 2881 slidably mounting on the housing 2800, the lever assembly 2900, the driveline coupler 2600 and the driver coupler 2700. The housing 2800 is stationary with respect to the driveline coupler and driver couplers 2600, 2700, which, in the activation position 2898 of the activation collar 2880, both of which rotate about the clutch axis of rotation CLR. In the de-activation position 2899 of the activation collar 2880, only the driveline coupler 2600, which is coupled to the rotating flex shaft 2250, rotates, while the driver coupler 2700, which is coupled to the driver shaft 2270 of the driver assembly 2300, does not rotate and, thus, the feed roll 1302 of the power operated trimming tool 1000 also does not rotate. The activation collar body 2881 slides along the outer surface 2810 of the housing 2800 along a path of travel PT between the activation position 2898 wherein the driveline coupler 2600 and the driver coupler 2700 are mechanically coupled (i.e., corresponding to the engagement position 2798 of the clutch plates 2610, 2710) such that rotation of the driveline coupler 2600 results in concurrent rotation of the driver coupler 2700 and the de-activation position 2899 wherein the driveline coupler 2600 and the driver coupler 2700 are mechanically decoupled (i.e., corresponding to the disengagement position 2799 of the clutch plates 2610, 2710) such that rotation of the driveline coupler 2600 does not cause concurrent rotation of the driver coupler 2700. As can best be seen in the schematic depiction of FIG. 24, an axial extent of the path of travel PT of the activation collar body 2881 is defined by a longitudinal extent of the pair of slotted openings 2816 through the side wall 2806 of the housing 2800 through which respective ones of the pair of radially inwardly extending projections 2887 extend. In FIG. 24, the two positions of one of the projections 2887 are illustrated, a forward position of the projection 2887 corresponds to the activation position 2898 of the activation collar assembly 2880, while the rearward position of the projection 2887 corresponds to the de-activation position 2899 of the activation collar assembly 2880. The clutch drive engagement assembly 2100 is disposed between the clutch drive engagement coupling 2220 of the outer casing assembly 2210 and the clutch housing coupling 2350 of the driver assembly 2300 of the flexible shaft drive transmission 2201. Advantageously, the clutch drive engagement assembly 2100 provides for the in-line, spring-loaded clutch engagement 3000 between the driveline coupler 2600, which is coupled to the rotating flex shaft 2250, and the driver coupler 2700, which is coupled to the driver shaft 2370 of the driver assembly 2300. The activation collar assembly 2880 is actuated by the actuation lever 2940 of the lever assembly 2900 to move in the forward direction F and operatively engage the clutch plates 2610, 2710 such that rotation of the driveline coupler 2600 results in concurrent rotation of the driver coupler 2700. Advantageously, the clutch drive engagement assembly 2100 provides for both: a) under certain operating conditions, reduction or mitigation of a potential over-torque condition of the trimming tool 1000 resulting from feed roll lock-up being transferred to the hand of the operator of the trimming tool 1000; and b) one-handed activation and deactivation of the feed roll 1302 via the two position actuation lever 2940.

Housing 2800

As noted previously, the housing 2800 of the clutch drive engagement assembly 2500 is generally cylindrical and includes the proximal end portion 2802, which engages the clutch drive engagement coupling 2220 of the outer casing assembly 2210, and the axially spaced apart distal end portion 2804. The distal end portion 2804 includes the distal coupling 2819 of the housing 2800 which engages the clutch housing coupling 2350 of the driver assembly 2300. The housing 2800 includes the side wall 2806 defining the radially spaced apart inner and outer surfaces 2808, 2810. The inner surface 2808 of the housing 2800 defines the throughbore 2812 and the interior region 2814 of the housing 2800. The housing throughbore 2812 extends along and is centered about a central longitudinal axis LAH of the housing 2800. The central longitudinal axis LAH of the housing 2800 is substantially coincident with the clutch axis of rotation CLR. Supported for rotation within the throughbore 2812 of the housing 2800 is the driveline and driver couplers 2600, 2700 which include respective clutch plates 2610, 2710 allowing for selective clutch engagement of the driveline and driver couplers 2600, 2700 and, hence, selective clutch engagement of the flex shaft 2250 of the flexible shaft drive transmission 2201 and the driver shaft 2270 of the driver assembly 2300. A latch 1170 of the driver retainer assembly 1160 of the handle assembly 1100 contacts an outer shoulder 2811 of the housing outer surface 2810 to releasably secure the forward portion 2304 of the driver assembly 2300 within the throughbore 1106 of the handle assembly 1100 and releasably secure the clutch drive engagement assembly 2500 to the handle assembly 1100.

Figure 20:
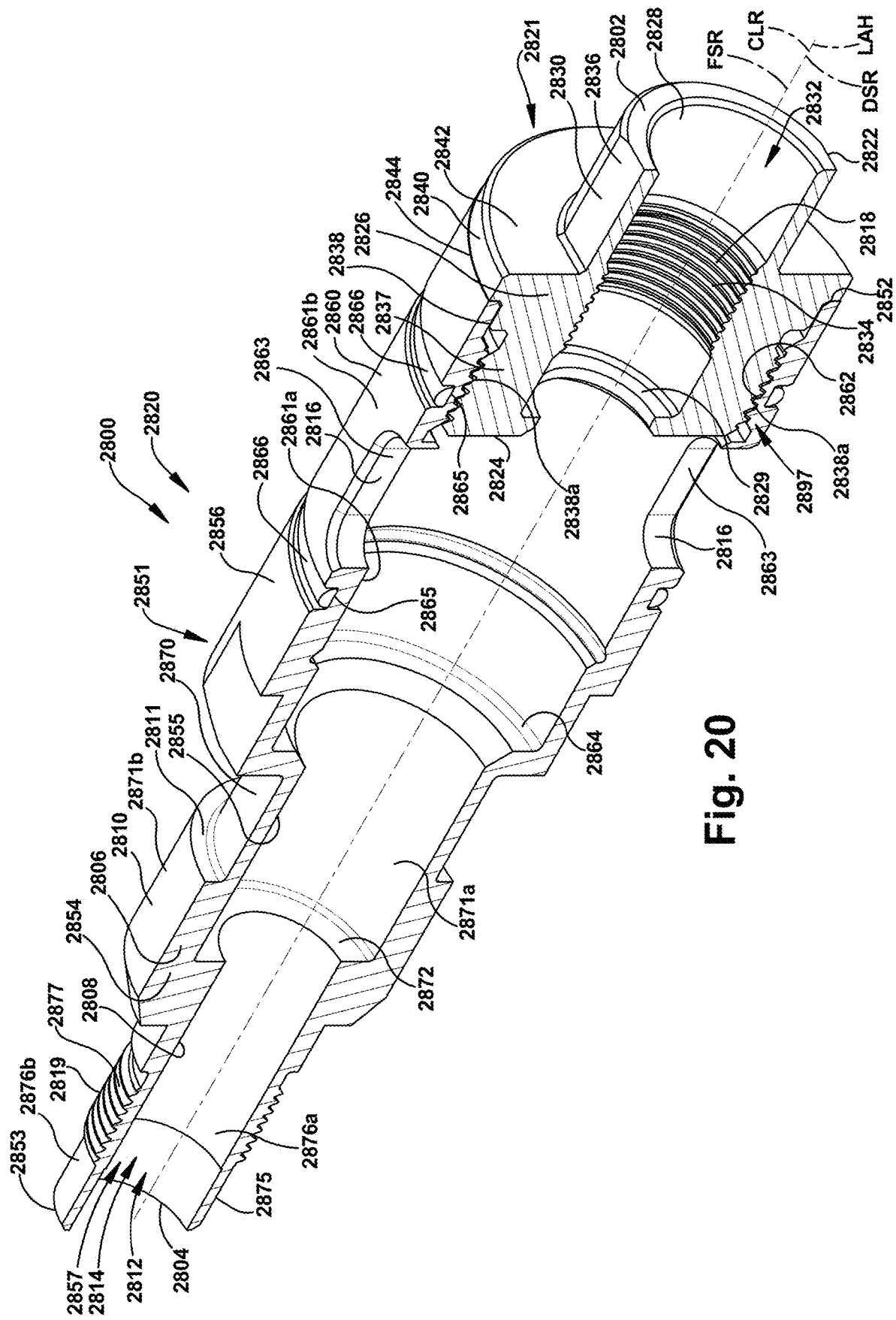
FIG. 20 is a schematic exploded, top, rear perspective view of a two part housing assembly of the clutch drive engagement assembly of FIG. 15.

In one exemplary embodiment, the housing 2800 comprises the two part housing assembly 2820 including a first, proximal housing part 2821 and the second, forward or distal housing part 2851. In one exemplary embodiment, as best seen in FIG. 20, the proximal and forward housing parts 2821, 2851 are secured together by a threaded engagement 2897. The first, proximal housing part 2821 includes a proximal end 2822 and an axially spaced apart distal end 2824. The proximal housing part 2821 is generally cylindrical and comprises a side wall 2826 including an inner surface 2828 and an outer surface 2830. The inner surface 2828 defines a throughbore 2832 which forms a part of the housing throughbore 2832 and is centered about the housing central longitudinal axis LAH. Similarly, the second, forward or distal housing part 2851 includes a proximal end 2852 and an axially spaced apart distal end 2853. The forward housing part 2851 is generally cylindrical and comprises a side wall 2854 including an inner surface 2855 and an outer surface 2856. The inner surface 2855 of the forward housing part 2851 defines a throughbore 2857 which forms a part of the housing throughbore 2832 and is centered about the housing central longitudinal axis LAH.

Figure 21:
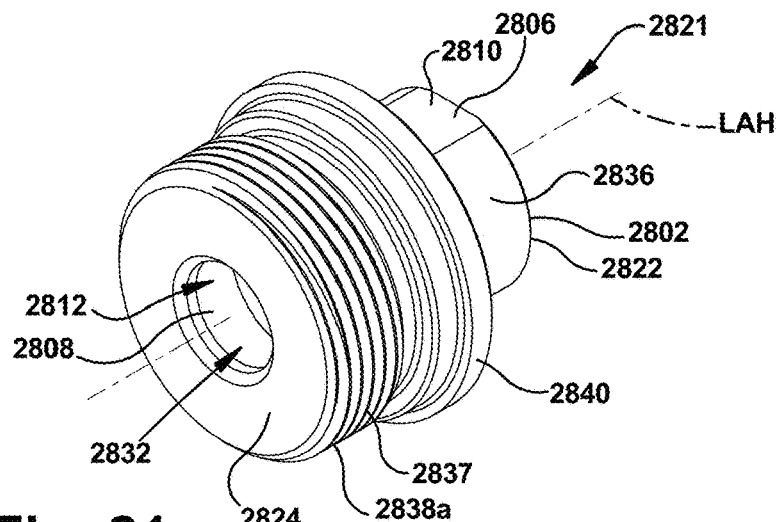
FIG. 21 is a schematic top, front perspective view of a first proximal housing part of the two part housing assembly of FIG. 20.
Figure 22:
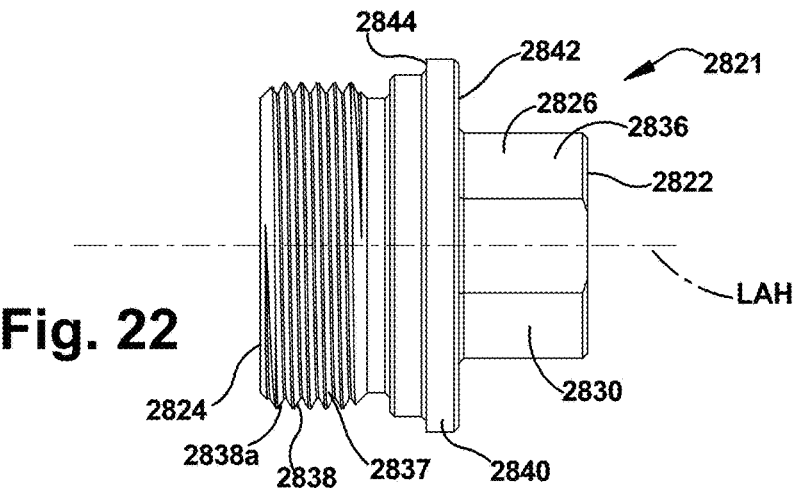
FIG. 22 is a schematic side elevation view of the first proximal housing part of FIG. 21.
Figure 23:
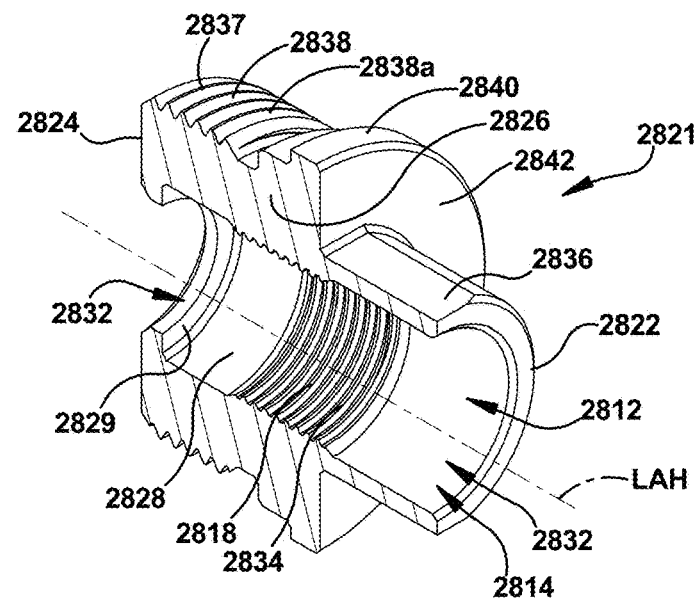
FIG. 23 is a schematic top, rear, perspective longitudinal vertical section view of the first proximal housing part of FIG. 21.

As best seen in FIGS. 21-23, the first, proximal housing part 2821 includes three cylindrical sections having different outer diameters: a) a proximal section 2836; b) a distal section 2837; and c) a large diameter central annular rim 2840 disposed axially or longitudinally between the proximal and distal sections 2836, 2837. The distal section 2837 includes an outer surface 2838 which is part of the outer surface 2830 of the first, proximal housing part 2831. The outer surface 2838 includes a threaded portion 2838a which threadedly engages a threaded inner surface portion 2862 of a large diameter rearward section 2860 of the second, forward housing part 2851 to affix the first and second housing parts 2831, 2851 together. The outer surface 2830 in the proximal section 2836 of the first, proximal housing part 2821 provides a cylindrical seating surface for an inner surface 2914 of the annular base 2910 of the lever assembly 2900 of the clutch drive engagement assembly 2500.

The first proximal housing part 2821 defines the proximal coupling 2818 of the housing 2800. Specifically, in one exemplary embodiment, the inner surface 2828 of the proximal housing part 2821 includes a threaded portion 2834. The clutch drive engagement coupling 2220 of the outer casing assembly 2210 of the flexible shaft drive transmission 2201 includes a cylindrical distal portion 2222. The cylindrical distal portion 2222 includes an exterior surface 2224 having a threaded region 2228 and a cylindrical seating region 2226. The threaded region 2834 of the inner surface 2828 of the proximal housing 2821 is threaded onto the mating threaded region 2228 of the cylindrical distal portion 2222 of the clutch drive engagement coupling 2220 to secure the clutch drive engagement assembly 2500 to the clutch drive engagement coupling 2220 of the flexible shaft drive transmission 2201. Thus, the clutch engagement coupling 2220 of the outer casing assembly 2210 is releasably coupled to the proximal coupling 2818 formed at the proximal end 2802 of a housing 2800 of the clutch drive engagement assembly 2500. With the threaded engagement of the respective mating threaded regions 2834 2228 of the clutch drive engagement assembly 2500 and the clutch drive engagement coupling 2220 of the flexible shaft drive transmission 2201, the female distal fitting 2256 at the distal end portion 2252 of the flex shaft 2250 engages a square shaft proximal end portion 2604 of the driveline coupler 2600 such that the driveline coupler 2600 rotates about the clutch axis of rotation CLR as the flex shaft 2250 rotates about the flex shaft axis of rotation FSR, the two axes of rotation being aligned in the region of the distal fitting 2256. At the distal end 2824 of the proximal housing part 2821, a radially inwardly extending ledge 2829 of the inner surface 2828 provides a positive stop for the distal end 2223 of clutch drive engagement coupling 2220 to limit an axial or longitudinal extent of the engagement between the clutch drive engagement coupling 2220 of the outer casing assembly 2210 of the flexible shaft drive transmission 2201 and the proximal housing part 2821.

Figure 25:
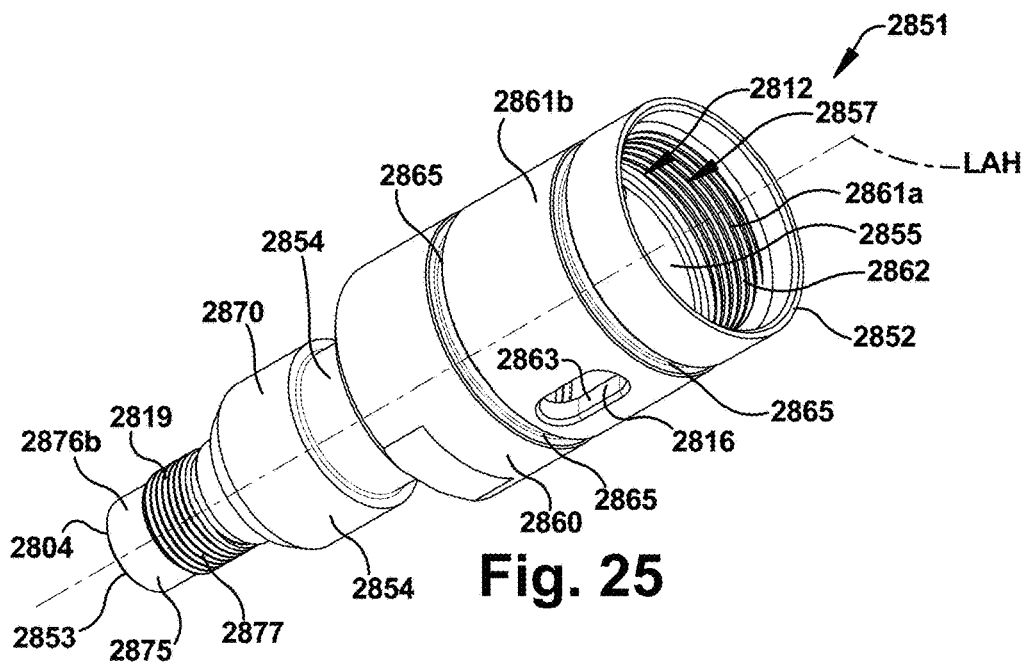
FIG. 25 is a schematic bottom, rear perspective view of the second distal housing part of the two part housing assembly of FIG. 24.
Figure 26:
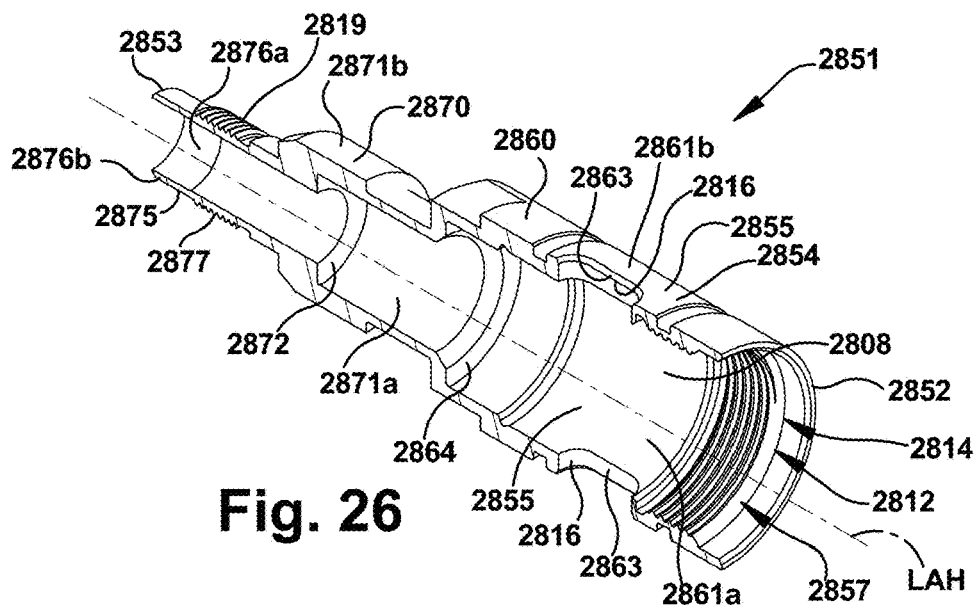
FIG. 26 is a schematic top, rear perspective longitudinal section view of the second distal housing part of the two part housing assembly of FIG. 24.
Figure 27:
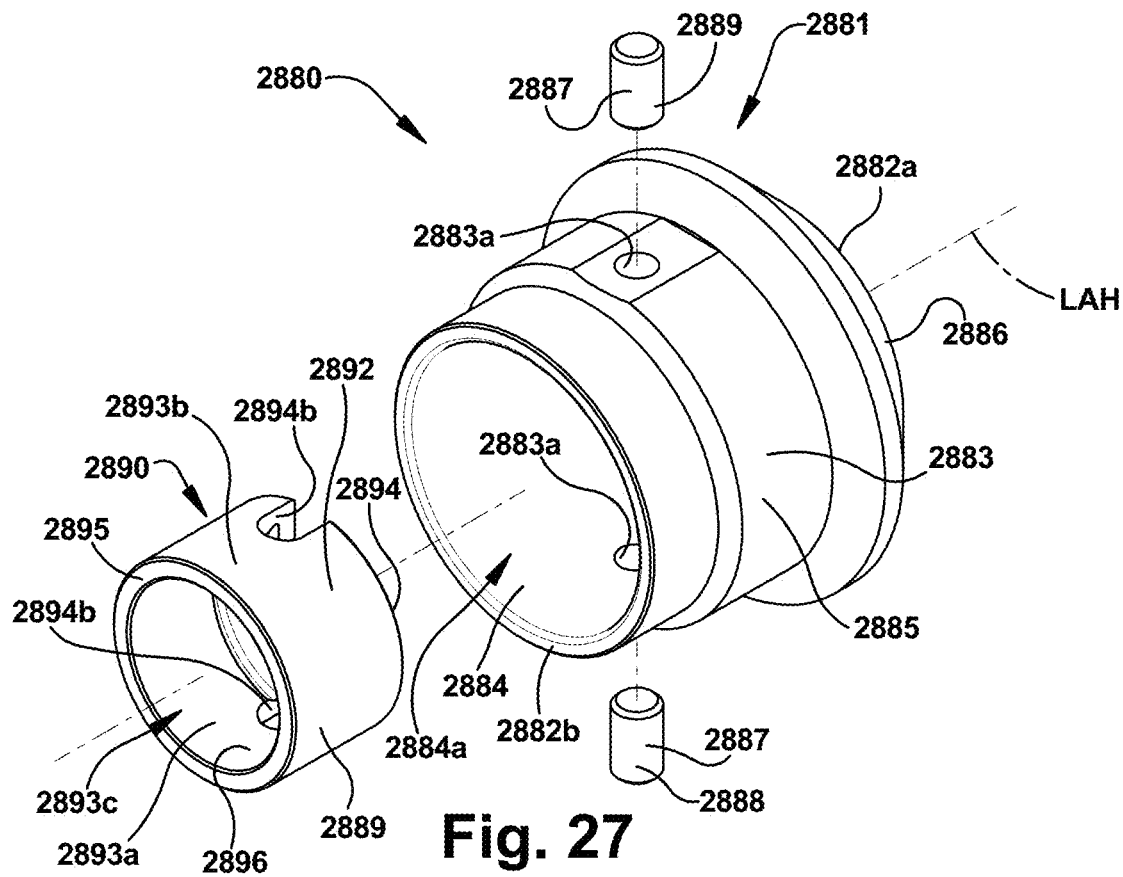
FIG. 27 is a schematic exploded front perspective view of an activation collar assembly of the clutch drive engagement assembly of FIG. 15.
Figure 28:
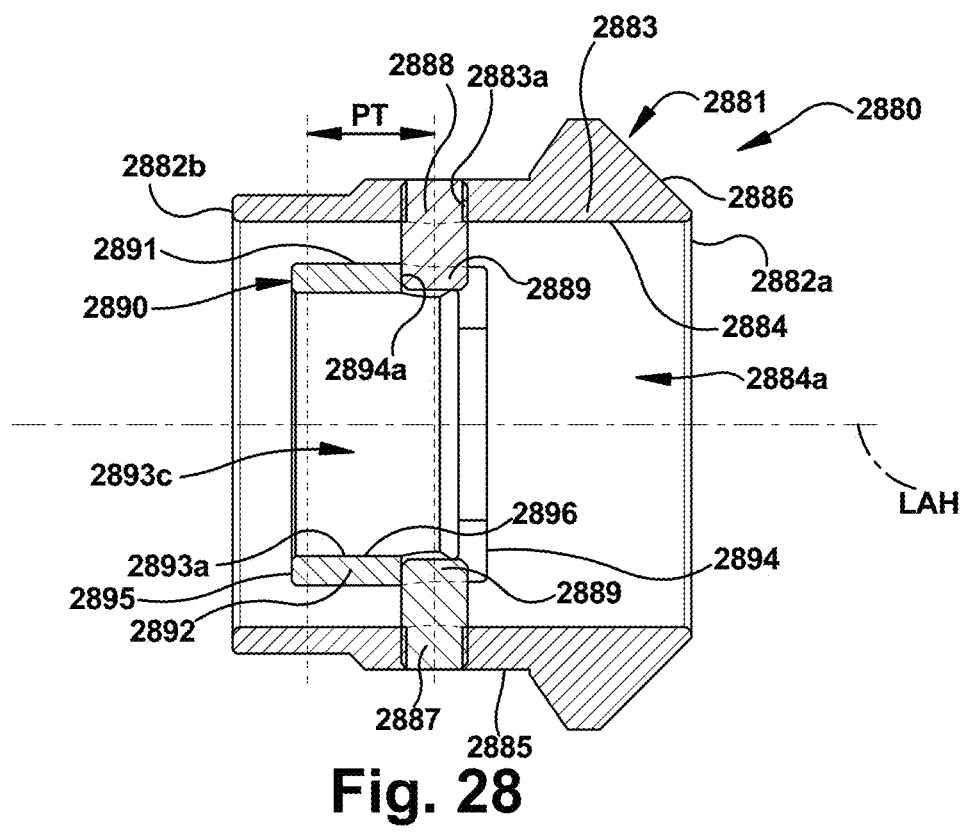
FIG. 28 is a schematic longitudinal vertical section view of the activation collar assembly of FIG. 27.

In one exemplary embodiment, as best seen in FIGS. 24-26, the forward housing part 2851 includes three cylindrical sections having differing outer diameters: a) the large diameter rearward section 2860 (having radially spaced apart inner and outer surfaces 2861a, 2861b); b) an intermediate diameter central section 2870 (having radially spaced apart inner and outer surfaces 2871a, 2871b); and a small diameter distal section 2875 (having radially spaced apart inner and outer surfaces 2876a, 2876b). The intermediate diameter central section 2870 includes two regions of slightly differing outer diameter. However, for simplicity, both regions will be referred to as the central section 2870. The large diameter rearward section 2860 includes the radially spaced apart inner and outer surfaces 2871a, 2871b spaced apart by the side wall 2854. The inner surface 2871a of the rearward section 2860 of the forward housing part 2851 includes the threaded portion 2862. The threaded outer surface portion 2838a of the first, proximal housing part 2831 threads onto the threaded inner surface portion 2862 of the large diameter rearward section 2860 of the second, forward housing part 2851 to secure the first and second housing parts 2831, 2851 together, as described above.

As best seen in FIGS. 20 and 24-26, the outer surface 2861b of the rearward section 2860 of the forward or distal housing part 2851 includes a pair of axially spaced apart circumferential grooves 2865, one groove on either side of the pair of slotted openings 2863. The pair of slotted openings 2863 of the forward housing part 2851 comprise the pair of slotted openings 2816 of the housing 2800. Each of the circumferential grooves 2865 receives an o-ring 2866. Advantageously, an inner surface 2884 of the activation collar body 2881 bridges the o-rings 2866 and, thus, the body 2881 of the activation collar assembly 2880 rides on the o-rings 2866 as the body 2881 moves between the activation position 2898 and the de-activation position 2899. The inner surface 2855 of the forward housing part 2851 includes two radially stepped shoulders 2864, 2872. The first radially stepped shoulder 2864 is part of the inner surface 2871a of the rearward section 2860 and provides a radially extending bearing surface for the return spring 2692. As discussed above, when the operator of the trimming tool 1000 releases the actuation lever 2940, thereby allowing the actuation lever 2940 to pivot or move to the second de-actuation position 2999, the return spring 2692 bears against the bearing guide 2890 and thereby urges or moves the activation collar assembly 2880 in the rearward or proximal direction R to its de-activation position 2899. The return spring 2692 is disposed or trapped between the first radially stepped shoulder 2864 and the distally facing surface 2895 of the side wall 2892 of the bearing guide 2890. The second radially stepped shoulder 2872 is part of the inner surface 2871a of the central section 2870 and provides a bearing surface for a thrust bearing 2764 of the driver coupler bearing assembly 2760 which provides bearing support for the driver coupler 2700 and, specifically, supports a clutch plate body 2714 of the clutch plate 2710 of the driver coupler 2700 so as to provide axial rotating support for the clutch plate body 2714 and constrain or prevent axial movement of the driver coupler 2700 with respect to the housing 2800 in the forward direction F. The inner surfaces 2871a, 2876b of the central and distal sections 2870, 2875 of the forward housing part 2851 also define a cylindrical seating surface for a sleeve bearing 2762 of the driver coupler bearing assembly 2760. The sleeve bearing 2762 provides radial bearing support for a longitudinally extending shaft 2730 of the driver coupler 2700. The clutch plate body 2714 is affixed to the longitudinally extending shaft 2730 of the driver coupler 2700.

The small diameter distal section 2875 of the distal or forward housing part 2875 includes the radially spaced apart inner and outer surfaces 2876a, 2876b spaced apart by the side wall 2854. The distal section 2875 of the forward housing part 2875 defines the distal coupling 2819 at the distal end 2804 of the housing 2800. Specifically, in one exemplary embodiment, the outer surface 2876b includes a threaded portion 2877 (FIGS. 24-26), which comprises the distal coupling 2819 of the housing 2800. The clutch housing coupling 2350 of the driver assembly 2300 of the shaft drive transmission assembly 2200 includes a threaded inner surface 2358. The threaded inner surface 2358 of the clutch housing coupling 2350 is threaded onto the distal coupling 2819, which is part of the outer surface 2876b of the distal section 2875 of the forward housing part 2875 to secure the drive assembly 2300 to the clutch drive engagement assembly 2500. Thus, the distal coupling 2819 formed at a distal end 2804 of the housing 2800 of the clutch drive engagement assembly 2500 engages the clutch housing coupling 2350 of the driver shaft 2300. The distal end 2853 of the forward housing part 2851 abuts engages a shoulder 2360 of the inner surface 2358 of the clutch housing coupling 2350 to function as a stop and thereby limit an extent of axial engagement between the housing 2800 and the driver assembly 2300. The intermediate diameter distal section 2875 of the forward housing part 2875 includes radially spaced apart inner and outer surfaces 2876a, 2876b spaced apart by the side wall 2854.

Lever Assembly 2900

The lever assembly 2900 of the clutch drive engagement assembly 2500 includes the annular base 2910 and the actuation lever 2940. Advantageously, the lever assembly 2900 is rotatable about the central longitudinal axis LAH of the housing 2800 due to the ring-like configuration of the annular base 2910 and its mounting on respective cylindrical outer surfaces 2836, 2222 of the first proximal housing part 2821 and the clutch drive engagement coupling 2220 of the outer casing assembly 2210 of the flexible shaft drive transmission 2201. The annular base 2910 includes a side wall 2912 defining an inner surface 2914 and a radially spaced apart outer surface 2916. The inner surface 2914 of the annular base 2910 is cylindrical and stepped. A proximal portion 2914a of the inner surface 2914 is rotatably mounted on the cylindrical distal portion 2222 of the clutch drive engagement coupling 2220 of the outer casing assembly 2210, while a larger internal diameter distal portion 2914b of the inner surface 2914 is mounted on the cylindrical proximal portion 2836 of the outer surface 2830 of the proximal housing part 2821. The rotatability of the lever assembly 2900 insures that the operator of the trimming tool 1000 may position the actuation lever 2940 in a circumferential position with respect to the trimming tool handle assembly 1100 that is most comfortable for the operator's hand in gripping the hand piece of the handle assembly 1100 and pivoting the lever 2940 between the first, actuation position 2998 of the lever 2940 and the second, de-actuation position 2999 of the lever 2940.

The annular base 2910 is constrained from axial movement with respect to the housing longitudinal axis LAH by a proximal end 2920 of the annular base 2910 abutting a shoulder 2230 formed the outer surface 2224 of clutch drive engagement coupling 2220 and by a distal end 2921 of the annular base abutting a shoulder or radial step 2844 formed at the interface of the cylindrical proximal portion 2836 of the outer surface 2830 and the cylindrical distal portion 2838 of the outer surface 2830 of the first, proximal housing part 2821. The outer surface 2920 of the annular base 2910 includes a raised boss 2922. The boss 2922 defines am opening for a pivot pin 2930 which extends through a lower connection portion 2942 of the actuation lever 2940 to pivot the actuation lever 2940 with respect to the annular base 2910. The pivot pin 2930 defines a pivot axis LPA of the lever 2940 which is spaced from and substantially orthogonal to the housing longitudinal axis LAH. An upper gripping portion 2950 of the actuation lever 2940 extends from the lower connection portion 2942 of the lever 2940 and is configured for ease of gripping and manipulation by the operator to move the actuation lever between the first, actuation position 2998 and the second, de-actuation position 2999. The lower connection portion 2942 of the actuation lever 2940 also includes the projecting engagement surface 2945 of the lever 2940. In one exemplary embodiment, the engagement surface 2945 includes the roller 2946. The actuation roller 2946 contacts the angled engagement surface 2888a of an outer surface 2888 of the activation collar 2880 such that as the lever 2940 is pivoted by the operator to the first, actuation position 2998, the activation collar 2880 slides along the housing 2800 in the forward or distal direction F to the first, activation position 2898 of the collar 2880 resulting in the clutch plates 2610, 2710 being in the engagement position 2798. And, when the operator releases the actuation lever 2940, as explained above, the return spring 2692 biases the activation collar 2880 to slide along the housing 2800 in the rearward or proximal direction R to the second, deactivation position 2899 of the collar 2880 resulting in the clutch plates 2610, 2710 being in the disengagement position 2798.

Driveline and Driver Couplers 2600, 2700

The in-line, spring-loaded, clutch engagement 3000 of the clutch drive engagement assembly 2500 is provided by: a) the driveline coupler 2600 (including the driveline coupler clutch plate 2610); b) the axially movable activation collar assembly 2880; c) the driver coupler 2700 (including the driver coupler clutch plate 2710), and d) the driver coupler bearing assembly 2760, including sleeve bearing 2762 and thrust bearing 2764, which supports the driver coupler 2700 for rotation about the clutch axis of rotation CLR. In one exemplary embodiment, the activation collar assembly 2880 includes: 1) the activation collar body 2881; 2) the driveline coupler bearing assembly 2660 which includes the first and second bearings 2862, 2864 supporting the driveline coupler 2600 for rotation about the clutch axis of rotation CLR; 3) the bearing guide 2890 which supports the driveline coupler bearing assembly 2660 and thereby also supports the driveline coupler 2700 for rotation; 4) the pair of radially inwardly extending projections 2887 extending through respective slotted openings 2816 in a side wall 2854 of the second, distal or forward housing part 2851 of the housing 2816 and 5) the return spring 2692. The clutch axis of rotation CLR is substantially coincident with the driver shaft axis of rotation DSR of the driver shaft 2270 of the driver assembly 2300 and is substantially coincident with the flex shaft axis of rotation FSR of the flex shaft 2250 in the region of a drive fitting 2256 at a distal end portion 2252 of the flex shaft 2250. Hence, because of the advantageous alignment of the axes of rotation CLR, FSR and DSR of the driveline coupler and driver coupler 1600, 2700, the flex shaft 2250 and the driver shaft 2270, the clutch drive engagement assembly 2500 of the present disclosure advantageously provides for "in-line" clutch engagement between the drive shaft or flex shaft 2250 of the flexible shaft drive transmission 2201 and the driver shaft 2270 of the driver assembly 2300.

As best seen in FIGS. 18 and 19, the driveline coupler 2600 includes a proximal end portion 2602 and an axially spaced apart distal end portion 2604. The driveline coupler 2600 includes the generally cylindrical shaft 2620 and the clutch plate 2610 slidably mounted on a distal end 2620*b* of the shaft 2620. The shaft 2620 extends between the proximal end 2620*a* and the distal end 2620*b* and includes a proximal section 2622, a larger outer diameter intermediate section 2630 and a distal section 2640. The proximal section 2622 includes the proximal end 2620*a* of the shaft 2620 and defines the proximal end portion 2602 of the driveline coupler 2600. The proximal end portion 2602 of the shaft 2620 defines the driven fitting 2624. In one exemplary embodiment, the driven fitting is square in cross section and is received in and rotatably driven by the drive fitting 2256 at the distal end 2252 of the flex shaft 2250 of the flexible shaft drive transmission 2201. The larger diameter intermediate section 2630 of the shaft 2620 includes a radially outwardly extending annular rim 2632 and flanking proximal and distal cylinders 2634*a*, 2634*b* on either side of the annular rim 2632. The proximal and distal cylindrical surfaces 2634*a*, 2634*b* have a smaller outer diameter than the outer diameter of the annular rim 2632 and define respective cylindrical outer surfaces 2635*a*, 2635*b*. The distal section 2640 of the shaft 2620 includes a cylindrical outer surface 2642 and an internal aperture 2644 extending inwardly from the distal end 2620*b* of the shaft 2620. In one exemplary embodiment, the internal aperture 2644 includes a threaded distal portion 2646.

Figure 29:
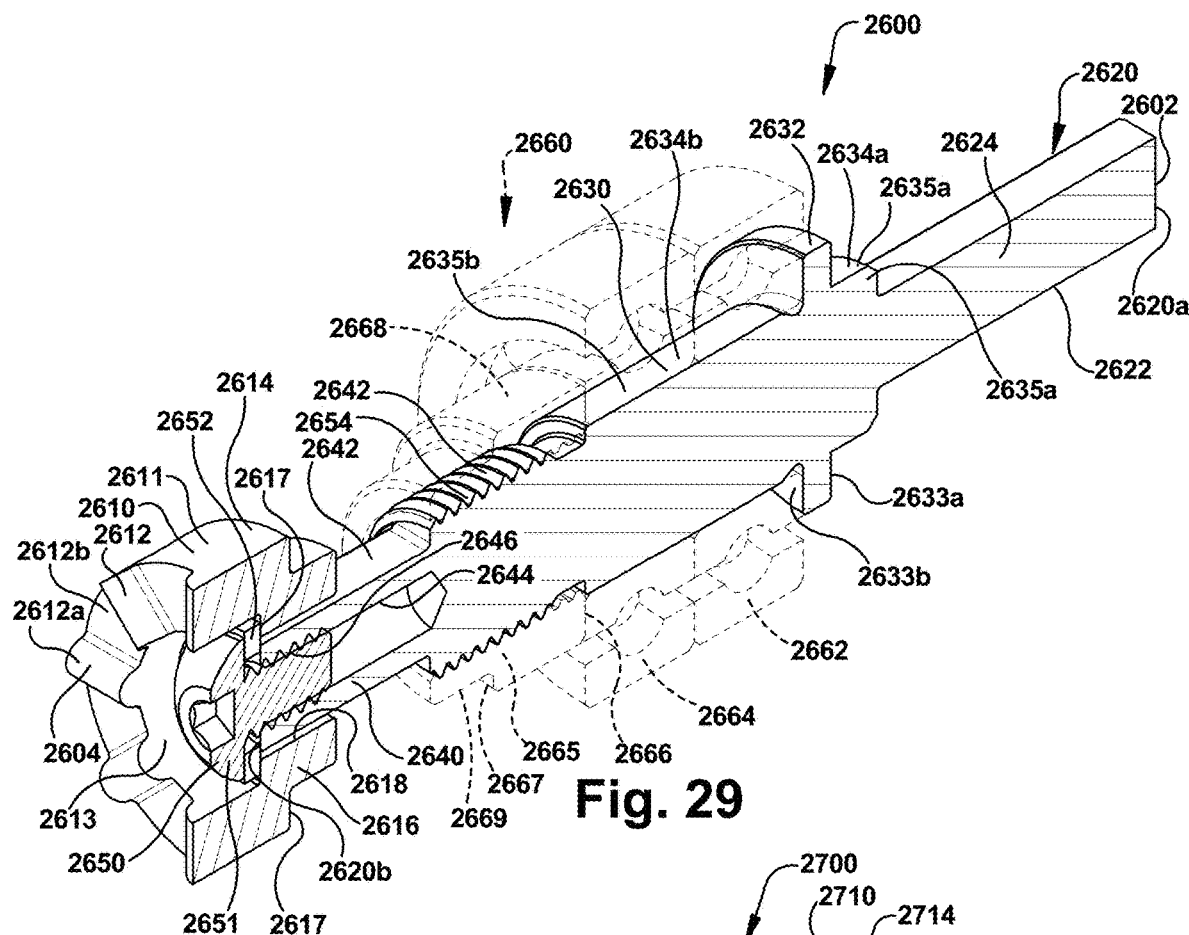
FIG. 29 is a schematic longitudinal vertical section view of the driveline coupler of the clutch drive engagement assembly of FIG. 15.
Figure 30:
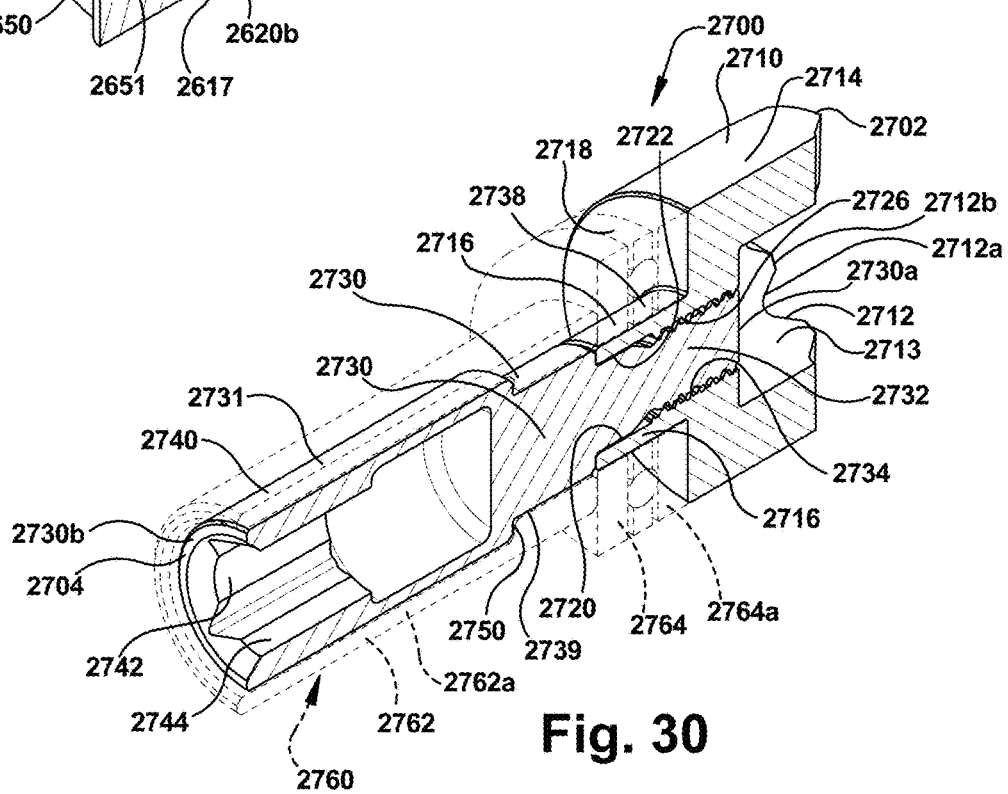
FIG. 30 is a schematic longitudinal vertical section view of the driver coupler of the clutch drive engagement assembly of FIG. 15.

A forward facing surface of the clutch plate 2610 of the driveline coupler 2610 defines an annular contoured engagement surface 2612 surrounding an axially recessed, generally cylindrical open central cavity or area 2613. In one exemplary embodiment, as best seen in FIG. 29, in one exemplary embodiment, the contoured engagement surface 2612 includes generally truncated, sinusoidal-like pattern of circumferentially spaced apart raised generally semi-cylindrical ribs 2612*a* interrupted by flat planar portions 2612*b* which can be viewed as a pattern of alternating projections/peaks 2612*a* and flat planar portions 2612*b* between each pair of peaks 2612*a*. Obviously, other patterns may be utilized for the contoured engagement surface 2612. The contoured engagement surface 2612 is annular. The open central area 2613 providing clearance for the head 2651 of a fastener 26540 that secures the clutch plate 2610 to the distal end 2620*b* of the shaft 2620. A rearward facing surface of the clutch plate 2710 of the driver coupler 2710 defines an annular contoured engagement surface 2712 surrounding an axially recessed, generally cylindrical open central cavity or area 2713. As best seen in FIGS. 19 and 30, in one exemplary embodiment, the mating contoured engagement surface 2712 of the clutch plate 2710 of the driver coupler 2700 has a matching truncated, sinusoidal-like pattern of alternating circumferentially spaced apart generally v-shaped valleys 2712*a*, sized to accept the raised ribs 1612*a* of the contoured engagement surface 2612 of the clutch plate 2610, interrupted by flat planar portions 2712*b* between each pair of valleys 2712*a*. The interfit of the ribs 2612*a* of the engagement surface 2612 and the valleys 2712*a* of the engagement surface 2712 advantageously facilitate positive drive engagement between the driveline and driver couplers 2600, 2700 in the engagement condition or position 2798 of the clutch plates 2610, 2710, while still allowing for clutch slippage under certain overload or lock up conditions of the feed roll 1302. The open central area 2713 of the facing surface of the clutch plate 2710 of the driver coupler 2700 is aligned with and matches the size of the open central area 2613 of the facing surface of the 2612 of the clutch plate 2610 of the driveline coupler 2600.

The clutch plate 2610 includes an annular clutch plate body 2614 and an annular stem 2616 extending in the rearward direction R from the clutch plate body 2614. The clutch plate 2610 includes a stepped central opening 2617. A smaller diameter proximal portion 2618 of the stepped central opening 1617 of the clutch plate 2610 is sized to be slidingly received on the cylindrical outer surface 2642 of the distal section 2640 of the shaft 2620. A washer 2652 is interposed or sandwiched between a head 2651 of a fastener 2650 and the distal end 2620*b* of the shaft 2620. The washer 2652 constrains the clutch plate 2610 from moving along the distal section 2640 of the shaft 2620 in the forward direction F. In one exemplary embodiment, the fastener 2650 is a threaded fastener and threadedly engages the internal aperture 2644 of the distal section 2640 of the shaft 2620.

Figure 16:
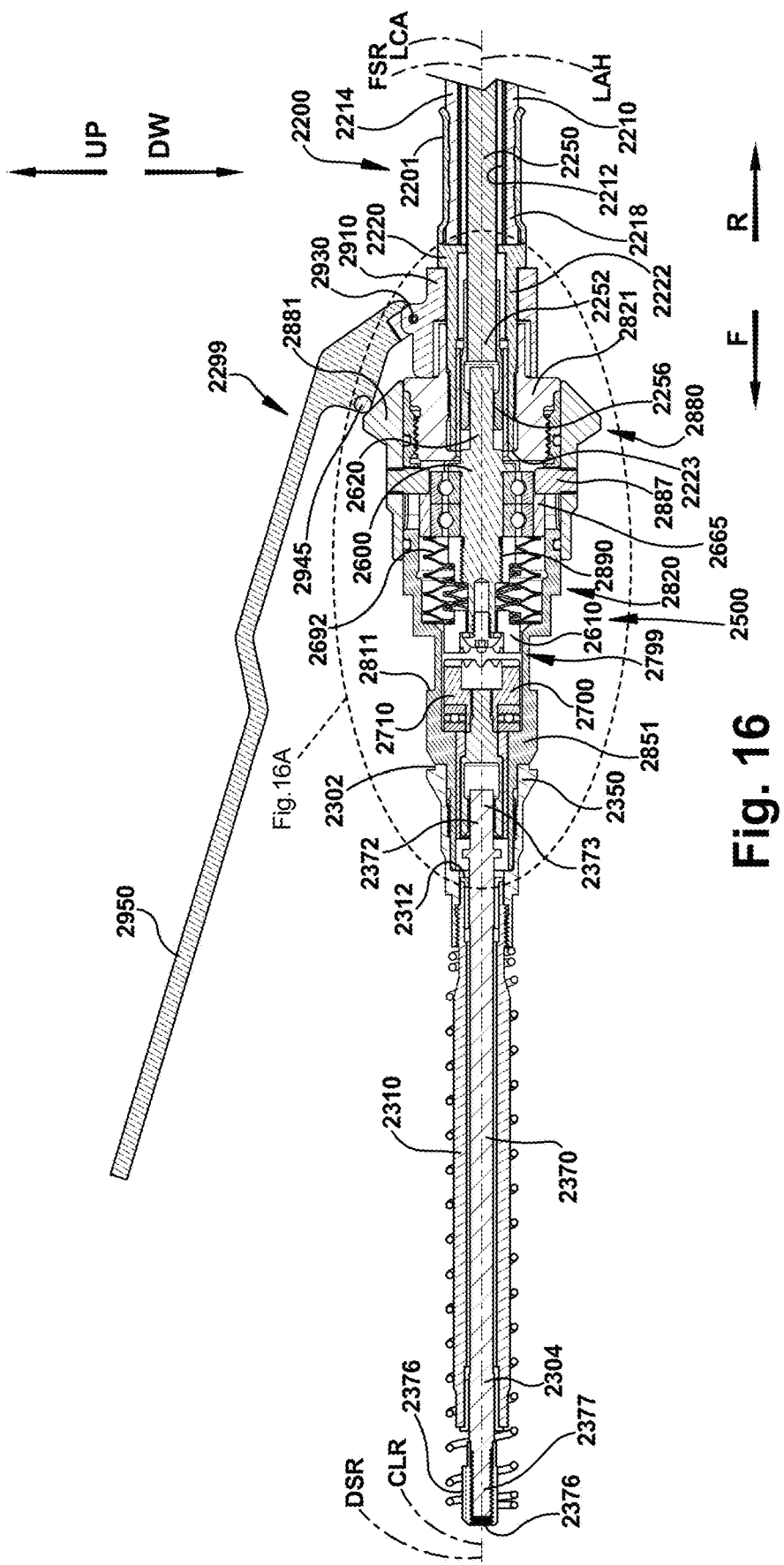
FIG. 16 is a schematic longitudinal vertical section view of the portion of the external drive assembly of FIG. 15.
Figure 16A:
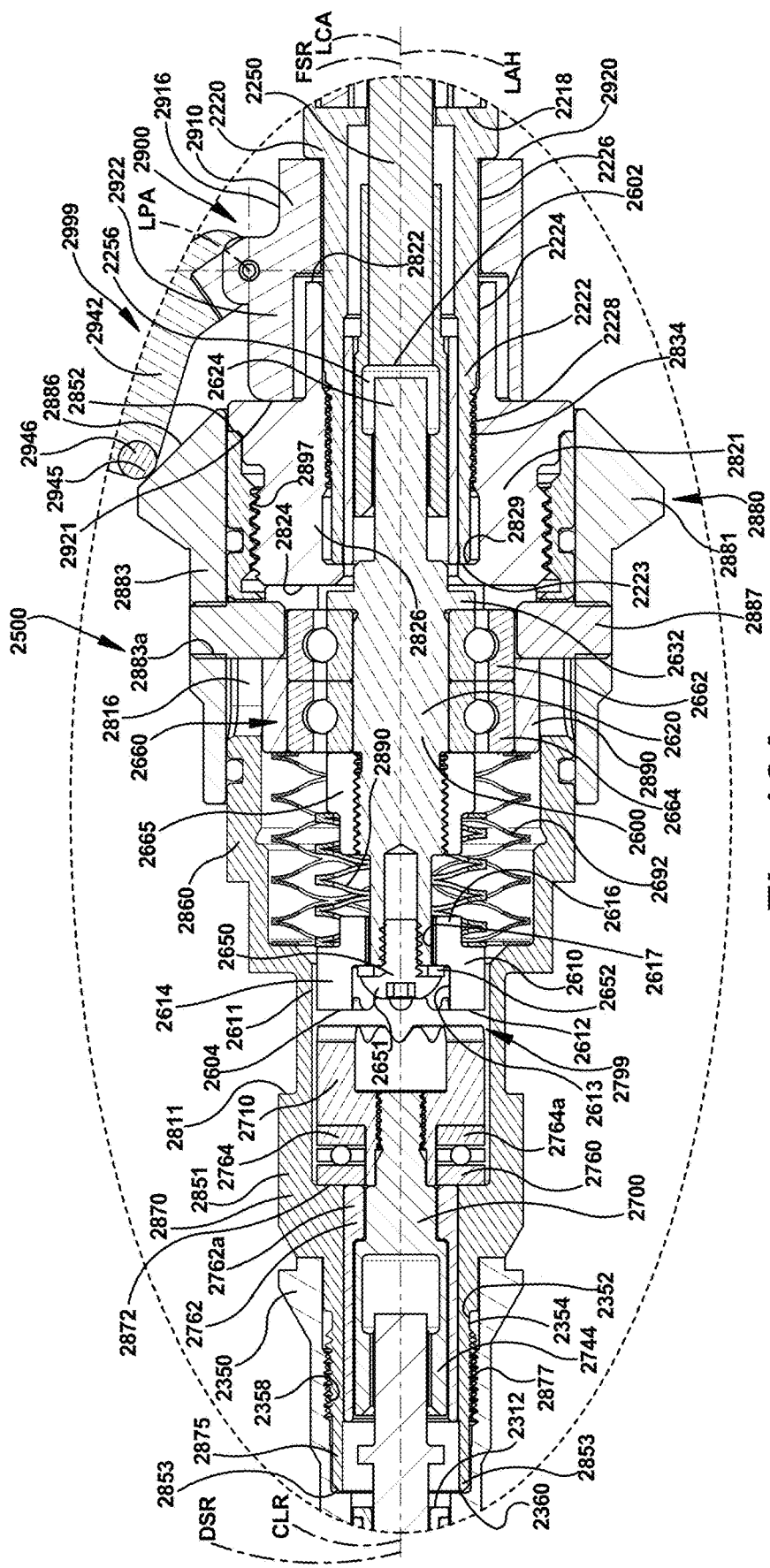
FIG. 16A is an enlarged view of a portion of FIG. 16 within the dashed line labeled FIG. 16A, with the clutch drive engagement assembly in a disengagement condition with respective clutch plates of the driveline coupler and the driver coupler being disengaged.
Figure 16B:
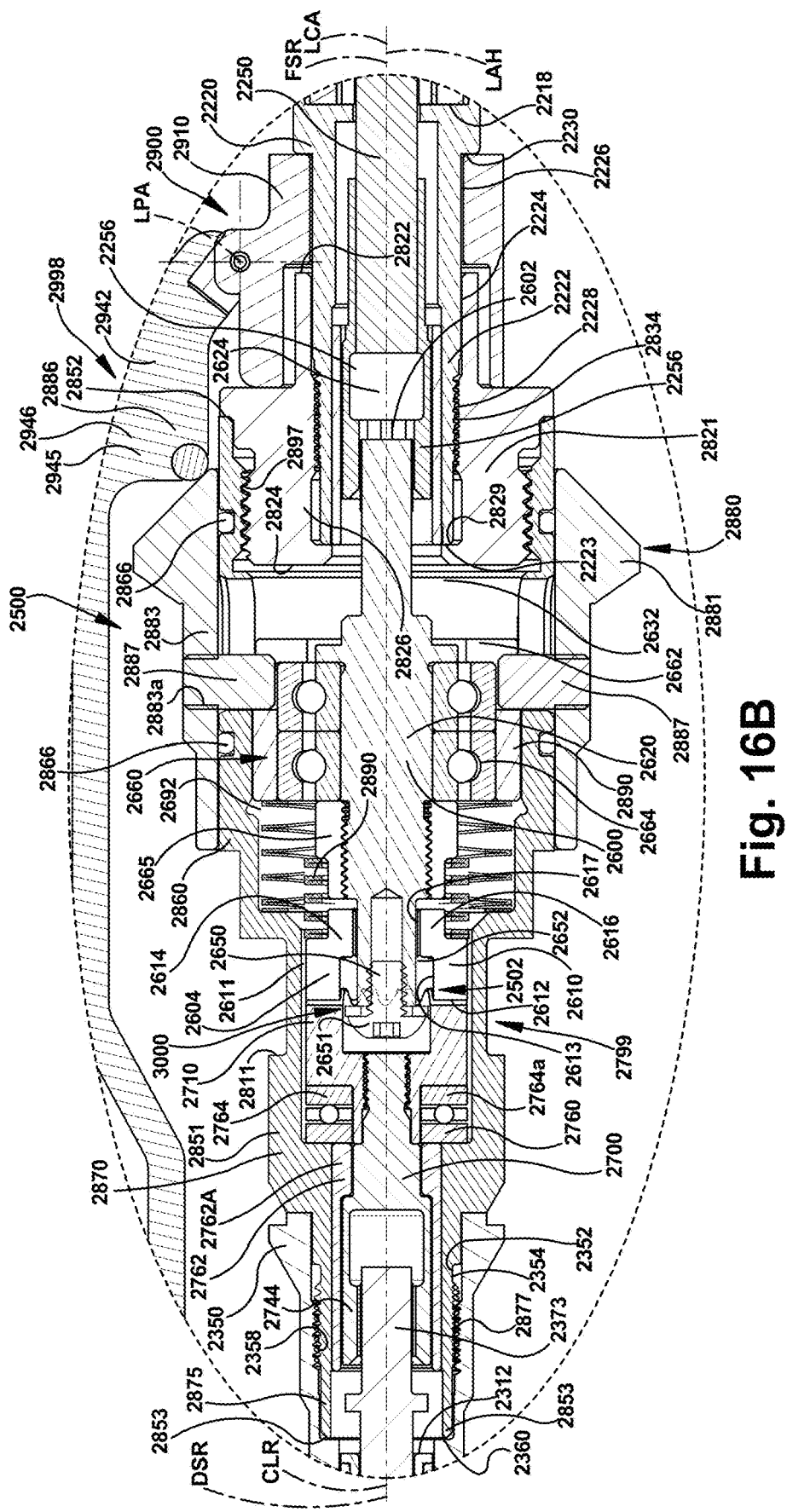
FIG. 16B is an enlarged view of the portion of FIG. 16 shown in FIG. 16A, with the clutch drive engagement assembly in an engagement condition with respective clutch plates of the driveline coupler and the driver coupler being operatively engaged.

As best seen in FIGS. 16, 16A and 16B, the shaft 2620 and therefore the driveline coupler 2600 are supported for rotation about the clutch axis of rotation CLR by the first, driveline coupler bearing assembly 2660. The driveline coupler bearing assembly 2660 includes a first bearing 2662 and a second bearing 2664 mounted on the cylindrical outer surface 2635*b* of the distal cylinder 2634*b* of the intermediate section 2630 of the shaft 2630. The driveline coupler bearing assembly 2660 further includes a bearing collar 2665, also mounted to the cylindrical outer surface 2635*b* of the distal cylinder 2634*b* of the intermediate section 2630 of the shaft 2620. In one exemplary embodiment, the first and second bearings 2662, 2664 and the bearing collar 2665 provide both thrust (axial) and radial bearing support for the shaft 2620 and thus support rotation of the driveline coupler 2600. The outer surface 2635*b* of the distal cylinder 2634*b* of the intermediate section 2630 of the shaft 2620 includes a threaded portion 2654. The bearing collar 2665 threads onto the threaded portion 2654 of the intermediate section 2630 of the shaft 2620 to sandwich or secure the first and second bearings 2662, 2664 of the first, driveline coupler bearing assembly 2660 between a proximal end 2666 of the bearing collar 2665 and the annular rim 2632 of the intermediate section 2630 of the shaft 2620. The bearing collar 2665 thereby constrains the first and second bearings 2662, 2664 from axial movement along the shaft 2620, while the first and second bearings 2662 provide radial support for the shaft 2620. In one exemplary embodiment, the first and second bearings 2662, 2664 are respective ball bearing assemblies.

The bearing collar 2665 includes a radially extending distal facing stepped shoulder 2667 between a proximal larger diameter proximal section 2668 and a smaller diameter distal section 2669. A similar radially extending stepped shoulder 2619 is formed on an outer surface 2611 of the clutch plate 2610 between the clutch plate body 2614 and the smaller outer diameter stem 2616. The stepped shoulder 2619 of the clutch plate 2610 and a corresponding stepped outer shoulder 2667 of the bearing collar 2665 provide bearing surfaces for the clutch spring 2690. That is, the clutch spring 2690 bears against the clutch plate 2610 to urge the clutch plate 2610 to move to a forwardmost position along the distal portion 2640 of the shaft 2620, as constrained by the threaded fastener 2650. That is, the forward direction spring force of the clutch spring 2690 causes the clutch plate 2610 to be moved or urged in the forward direction F against the first washer 2652. Under certain operating conditions, if a lock up or torque overload condition of the feed roll 1302 occurs and the clutch plate 2710 of the driver coupler 2700 stops rotation, the spring force of the clutch spring 2690 is small enough such that the clutch plate 2610 can move or slide rearwardly along the distal portion 2640 of the shaft 2620 a sufficient amount such that operative disengagement (i.e., a clutch plate slip or slippage condition occurs) between the respective engagement surfaces 2612, 2712 of the clutch plates 2610, 2710 occurs, even if the operator maintains the actuation lever 2940 in the actuation position 2998.

When the actuation lever 2940 is moved from the de-actuation position 2999 to the actuation position 2998 (wherein the lever 2940 is substantially parallel to the longitudinal axis LA of the handle assembly 1110, as schematically depicted in FIG. 168), the driveline coupler 2600, including the shaft 2620, and the first driveline coupler bearing assembly 2660, including the bearing collar 2665, and the clutch spring 2690 move in unison in the forward direction F. This forward movement of the shaft 2620 and the spring force of the clutch spring 2690 against the stepped shoulder 2619 of the clutch plate 2610 in the forward direction F causes the clutch plate 2610 to move in the forward direction F such that the engagement surface 2612 of the clutch plate 2610 operatively engages the engagement 2712 of the clutch plate 2710 of the driver coupler 2700 such that rotation of the driveline coupler 2600 causes concomitant rotation of the driver coupler 2700 about the common clutch rotational axis CLR. Stated another way, the forward direction spring force of the clutch spring 2690 causes the clutch plate 2610 to be moved or urged in the forward direction F against the first washer 2652. As the shaft 2620 moves to the engagement position 2798 of the clutch plates 2610, 2710, the spring force of the clutch spring 2690 urges the driveline coupler clutch plate 2610 into engagement contact with the driver coupler clutch plate 2710 such that the respective contoured engagement surfaces 2612, 2712 interfit and the clutch plates 2610, 2710 are in concomitant rotation, i.e., locked together so that the driveline coupler 2600 and driver coupler 2700 rotate in unison about the clutch axis of rotation CLR. As can be seen in the schematic depiction of FIG. 16B, when the clutch plates 2610, 2710 are in the engagement condition 2798, there exists the in-line, spring-loaded, clutch engagement 3000 between the driveline and driver couplers 2600, 2700. In one exemplary embodiment, as schematically shown FIG. 16B, in the engagement position 2798 of the clutch plates 2610, 2710, the axial position of the shaft 2610 of the driveline coupler 2600 in the forward direction F is such that the head 2651 of the threaded fastener 2650 at the distal end 2620 of the shaft 2620 of the driveline coupler 2600 is received in the central open area 2713 of mating rearward facing surface 2712 of the clutch plate 2710 of the driver coupler 2700. In one exemplary embodiment, the axial extent of the movement of the driveline coupler 2600 between the engagement and disengagement positions 2798, 2799 is approximately 0.25 in.

However, because the operative engagement of the clutch plates 2610, 2710 is dependent on the magnitude of the spring force of the clutch spring 2690 and the configuration of the engagement of the annular, sinusoidal-shaped, contoured engagement surfaces 2612, 2712 of the clutch plates 2610, 2710, the engagement force between the contoured engagement surfaces 2612, 2712 is limited. Thus, if the feed roll 1302 where to be in a lock up (no rotation) condition, the drive mechanism 1600 and the driver shaft 2370 of the driver assembly 2300 would seek to stop rotation as well. This would cause the driver coupler 2700 to seek to stop rotation as well.

Under certain operating conditions of the power operated trimming tool 1000, a lock up condition of the feed roll 1302 would advantageously result in slippage of the contoured engagement surfaces 2612, 2712 of the clutch plates 2610, 2710 of the clutch drive 2502 of the clutch drive engagement assembly even though the actuation lever 2940 remains in the actuation position 2998. Advantageously, the clutch plate 1610 slides axially back and forth along the distal portion 2640 of the shaft 2620 in the rearward direction R a sufficient amount such that operative disengagement or clutch slippage occurs between the annular contoured engagement surfaces 2612, 2712 of the clutch plates 2610, 2710. That is, as the driveline coupler 2600 continues to rotate but the driver coupler 2700 remains stationary due to the lock up condition of the feed roll 1302, slippage of sinusoidal shape of the annular contoured engagement surface 2612 of the rotating clutch plate 2610 over the sinusoidal shape of the annular contoured engagement surface 2712 of the stationary clutch plate 2710 causes back and forth axial movement of the clutch plate 2710 along the distal portion 2640 of the shaft 2620. In this way, the torque force resulting from the continued rotation of the output shaft of the external motor 2100 and the flex shaft 2250 and the driveline coupler 2600, while the driver coupler 2700, the drive mechanism 1600 and the feed roll 1302 remain stationary, is not transmitted from trimming tool 1000 to the operator's hand. Instead the torque force is dissipated or mitigated by the slippage of the driveline coupler clutch plate contoured surface 2612 over the driver coupler clutch plate contoured surface 2712. The ability of the clutch plate 2610 to move axially along the distal portion 2640 of the shaft 2620 permits the continued clutch slippage to occur. When clutch slippage occurs, the trimming tool 1000 will tend to vibrate or oscillate in the operator's hand to indicate to the operator that an overload or lock up condition is occurring and the actuation lever 2940 should be released by the operator and the cause of the overload or lock up condition addressed prior to further operation of the trimming tool 1000.

The driver coupler 2700 includes a proximal end portion 2702 and an axially spaced apart distal end portion 2704. The driver coupler 2700 includes the generally cylindrical shaft 2730 and the clutch plate 2710 fixedly mounted on a proximal end 2730a of the shaft 2730. The clutch plate 2710 includes a generally cylindrical clutch plate body 2714 and a smaller diameter stem 2716 extending in the forward direction F from the body 2714. The clutch plate 2712 includes an inner surface 2720 defining a clutch plate throughbore 2722. The shaft 2730 of the driver coupler 2700 and thus the affixed clutch plate 2710 are supported for rotation about the clutch axis of rotation CLR by the driver coupler bearing assembly 2760. In one exemplary embodiment, the driver coupler bearing assembly includes a radial load bearing 2762, in the form of a sleeve bearing or bushing 2762a and an axial load or thrust bearing 2764, in the form of a ball bearing assembly 2764a.

The shaft 2620 includes the proximal end 2730a and a distal end 2730b and a proximal section 2732, an intermediate section 2738 and a larger diameter distal section 2740. The distal section 2740 of the shaft 2730 includes the distal end 2730b of the shaft 2730 and defines the distal end portion 2704 of the driver coupler 2700. The proximal section 2732 of the shaft 2730 includes a proximal threaded exterior portion 2734. The proximal threaded exterior portion 2734 of the shaft 2730 threads into the threaded inner surface portion 2726 of the clutch plate 2710 to secure the clutch plate 2710 to the shaft 2730. The distal section 2740 of the shaft 2730 includes an inner surface 2742 defining the female drive fitting 2744. The female drive fitting 2744 receives the square driven fitting 2373 at the proximal end 2371 of the driver shaft 2370 of the driver assembly 2300. The intermediate section 2738 includes a cylindrical outer surface 2739. The cylindrical outer surface 2739 acts as a bearing surface for rotation with respect to the bushing 2764a. A radial stepped shoulder 2750 on an outer surface 2731 of the shaft 2730 between the distal and intermediate sections 2740, 2738 of the shaft 2730 defines a stop which engages the sleeve bushing 2762a to constrains movement of the driver coupler 2700 in the rearward direction R, while rotational bearing engagement of a forward wall 2715 of the clutch plate body 2714 against the ball bearing assembly 2764a constrains movement of the driver coupler 2700 in the forward direction F.

Activation Collar Assembly 2880

As best seen in FIGS. 16, 16A and 16B, the activation collar assembly 2880, as mentioned above, includes the activation collar casing or body 2881, which is slidably mounted on the outer surface 2810 of the housing 2800. Specifically, in one exemplary embodiment, the body 2881 rides or slides on the pair of o-rings 2866 retained in axially spaced apart circumferential grooves 2865 in the housing outer surface 2810, while the pair of radially inwardly extending projections 2887 extends from an inner surface 2884 of the body 2881 through respective slotted openings 2816 of the side wall 2854 of the second, distal housing part 2851 of the housing 2800. Advantageously, since the housing 2800 is stationary, the extension of the pair of projections 2887 through the slotted openings 2816 of the housing 2800 prevents the activation collar body 2881, the pair of projections 2887 and the bearing guide 2890 of the activation collar assembly 2880 from undesirably rotating with the driveline coupler 2600.

The body 2881 of the activation collar assembly 2880 includes a proximal end 2882a and an axially spaced apart distal end 2882b and the inner surface 2884 and a radially spaced apart outer surface 2885. The activation collar 2880 is generally cylindrical and substantially centered about the longitudinal axis LAH of the housing 2880. The inner surface 2884 of the activation collar body 2881 defines a cylindrical throughbore 2884a. As can best be seen in FIG. 28, the bearing guide cylindrical sleeve 2981 is received with the cylindrical throughbore 2884a of the body 2881. The outer surface 2885 of the activation collar 2880 includes the angled engagement surface 2886 which, as described above, is engaged by the engagement surface 2945 of the actuation lever 2940 of the lever assembly 2900 in order to move the activation collar 2880 between the activation position 2898 and the de-activation position 2899. Advantageously, as the outer surface 2885 of the activation collar body 2880 is annular, the angled engagement surface 2886 extends continuously around an entire 360° periphery or circumference. This provides that the lever assembly 2900 may be rotated 360° about the housing central longitudinal axis LAH. The operator need only slightly loosen or unscrew the clutch engagement coupling 2220 of the outer casing assembly 2210 from the threaded proximal coupling 2818 of the housing 2800 thereby allowing sufficient looseness to allow the annular base 2910 of the lever assembly 2900 such that the base 2910 can rotate about the clutch engagement coupling 2220 of the outer casing assembly 2210 and the proximal coupling 2818 of the housing 2800 (that is, rotate about the housing central longitudinal axis LAH) such that the operator can position the actuation lever 2940 in the desired rotational orientation. Upon retightening the threaded connection between the clutch engagement coupling 2220 of the outer casing assembly 2210 and the threaded proximal coupling 2818 of the housing 2800, the desired rotational orientation of the actuation lever 2940 will be fixed and ready for operation of the trimming tool 1000 by the operator.

In one exemplary embodiment, the radially inwardly extending projections 2887 of the activation collar assembly 2880 include outer end portions 2888 that are secured within respective openings 2883a extending through the side wall 2883 of the body 2881. Opposite inner end portions 2889 of the projections 2887 are received within longitudinally extending, u-shaped openings 2894a of the side wall 2892 of the bearing guide 2890 to couple the bearing guide 2890 and body 2881 together for movement in the forward direction F. Thus, as the body 2881 moves along the outer surface 2810 of the housing 2800, the pair of projections 2887 move in the forward direction F within the slotted openings 2816 of the housing 2800. The inner end portions 2889 of the projections 2887 within the housing interior region 2814 engage the side wall 2892 of the bearing guide 2890 and urge the bearing guide 2890 in the forward direction F. Since the bearing guide 2890 (along with an inner surface 2889a of the inner end portions 2889 of the projections 2887) provides the bearing seating surface 2896 for the first and second bearing 2662, 2664 of the driveline coupler bearing assembly 2660, the driveline coupler 2600 similarly moves with the bearing guide 2890 in the forward direction F to the engagement position 2798 of the clutch plates 2610, 2710 of the driveline and driver couplers 2600, 2700. As noted above, in one exemplary embodiment, the axial extent of the movement of the driveline coupler 2600 between the clutch engagement and disengagement positions 2798, 2799 is approximately 0.250 in., thus, the axial movement of the activation collar body 2881 between the activation and de-activation positions 2898, 2899 of the body 2881 is similarly approximately 0.250 in.

The return spring 2692 is positioned between the interior shoulder 2864 of the housing 2880 and the distally facing surface 2895 of the cylindrical sleeve 2891 of the bearing guide 2890 such that the actuation collar assembly 2880 biased in the rearward direction R. Accordingly, when the actuation lever 2940 is released by the operator, the return spring 2692 functions to move or bias the bearing guide 2890 in the rearward direction R. This action of the return spring 2692 moves the activation collar assembly 2880 and the driveline coupler 2600 to the de-activation position 2899 of the activation collar assembly (FIG. 16A). While, in one exemplary embodiment, the projections 2887 are depicted as cylindrical posts supported within respective openings 2883a extending through the side wall 2883 of the body 2881, it should be understood, that the radially inwardly extending projections 2887 may have various alternative configurations such as, for example, fasteners such as screws that extend through respective openings of the activation collar body or other types of radially inwardly extending projections that may not require any corresponding openings in the side wall 2883 of the body 2881.

It should be understood, of course, that the clutch drive engagement assembly 2500 of the present disclosure, as well as other components of the external drive assembly 2000, may advantageously be used with a variety of power operated tools, including, but not limited to, power operated rotary knives and power operated dermatomes, in addition to the power operated trimming tool 1000 disclosed herein. A power operated rotary knife or power operated dermatome may include, for example, an power driven annular rotary knife blade instead of the power driven feed roll 1302. A power operated rotary knife is shown, for example, in U.S. Pat. No. 10,040,211 to Whited, assigned to the applicant of the present application, while a power operated dermatome is shown, for example, in U.S. Pat. No. 10,039,567 to Esarey et al., assigned to Exsurco Medical, Inc., a subsidiary of the applicant of the present application. U.S. Pat. Nos. 10,040, 211 and 10,039,567 are hereby incorporated by reference herein in their respective entireties.

Power Operated Trimming Tool 1000

The power operated trimming tool 1000 extends between a rearward or proximal end 1002 and a forward or distal end 1004. As best seen in FIGS. 1-12, the power operated trimming tool 1000, in one exemplary embodiment, includes the elongated handle assembly 1100 extending along the longitudinal axis LA and the head assembly 1200 coupled to the distal end portion 1104 of the handle assembly 1100. The handle assembly 1100 includes the proximal end 1102 and the axially spaced apart distal end 1104 and an inner surface 1105 and a radially spaced apart outer surface 1108. The inner surface 1105 defines a generally cylindrical throughbore 1106 that is centered about the handle assembly longitudinal axis LA. The handle assembly 1100 includes a handle body 1110, a handle extension 1120 extending distally from the handle body 1110 and the driver retainer assembly 1160 extending proximally from the handle body 1110. A central portion 1114 of the handle body 1110 is generally cylindrical and is sized to receive an overlying contoured hand piece (not shown) that is gripped by the operator to manipulate the power operated trimming tool 1000.

The handle extension 1120 extends distally from the handle body 1110 and includes a reduced diameter distal end portion 1122. The reduced diameter end portion 1122 of the handle extension is sized to be snugly received in the interface portion 1212 of the frame body 1210 and, more specifically, to be snugly received in a throughbore 1214 defined by the interface portion 1212. In one exemplary embodiment, the handle extension end portion 1122 is secured to the interface portion 1212 of the frame body 1210 via a bolt 1249 that is threaded into a threaded insert 1249*a* disposed in openings extending through a horizontally split portion of an upper wall 1226 of the frame body 1210 adjacent the throughbore 1214 of the interface portion 1212. As the bolt 1249 is tightened the circumference of the throughbore 1214 is reduced thereby securing the handle extension end portion 1122 within the throughbore 1214 and thereby affixing the handle assembly 1100 to the head assembly frame body 1210. The threaded insert 1249*a* (FIG. 12) is provided to mitigate the possibility of the bolt pulling out of the frame 1210 as the bolt 1249 is tightened. An inner surface 1130 of the handle extension 1120 defines a forward portion 1107 of the handle assembly throughbore 1106. A distal section 1132 of the inner surface 1130 of the handle extension 1120 defines a bearing seating region 1134 which receives and supports the shaft support assembly 1680. The shaft support assembly 1680 includes a first distal bearing support assembly 1682 and a second proximal bearing support assembly 1684. The first and second bearing support assemblies 1682, 1684 are received in the bearing seating region 1134 of the handle extension 1120. The inner surface 1130 of the handle extension 1120 also includes an annular groove 1136 adjacent the bearing seating region 1134 that receives a retaining or snap ring 1690 of the shaft support assembly 1680 to maintain the first and second bearing support assemblies 1682, 1684 in place. When viewed along the handle assembly longitudinal axis LA, the first and second bearing support assemblies 1682, 1684 are located within the throughbore 1214 of the interface portion 1212, as is a portion of a shaft cylindrical body 1611 of a drive gear 1602 of the drive mechanism 1600.

Figure 3:
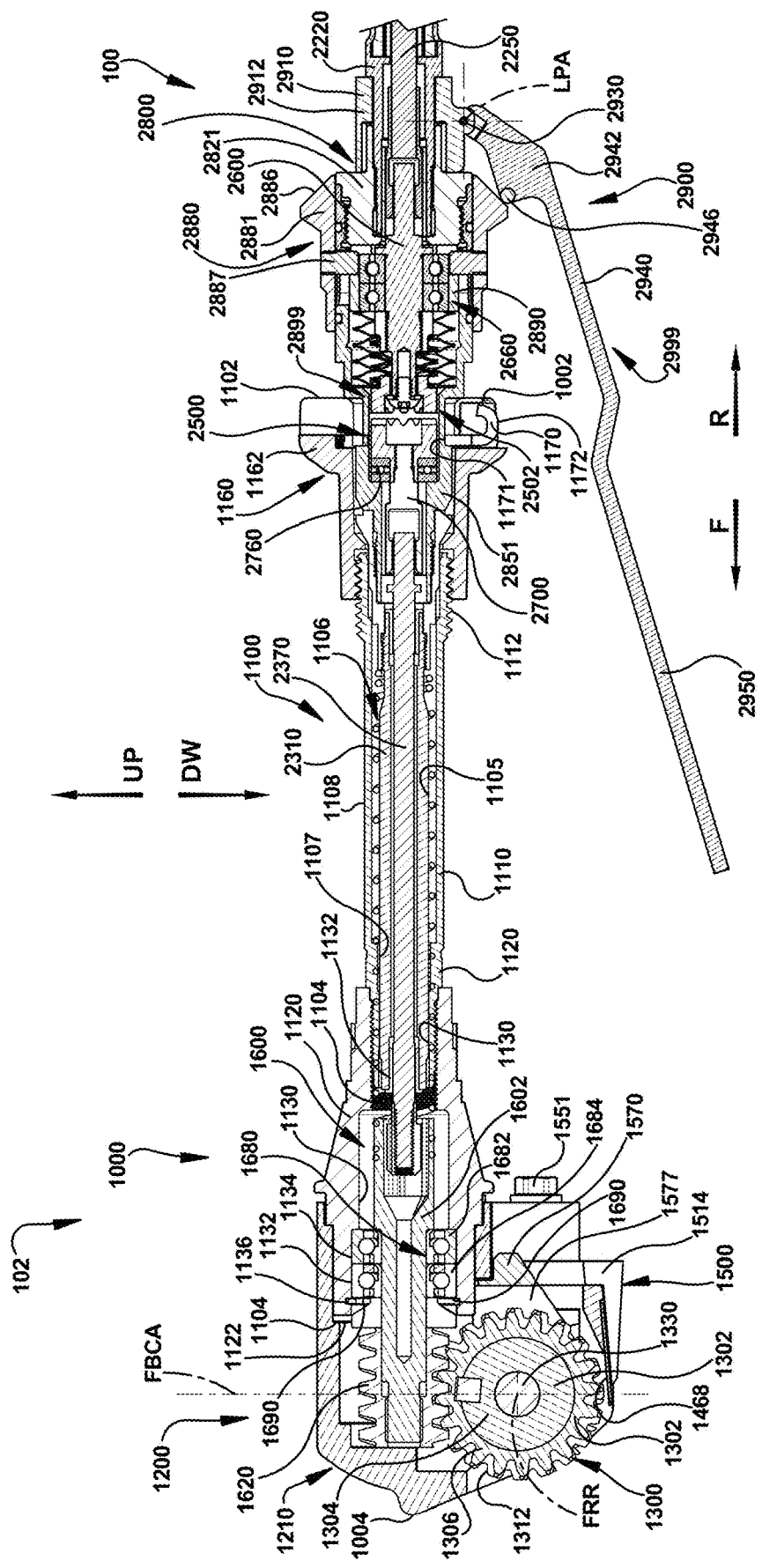
FIG. 3 is a schematic longitudinal vertical sectional view of the power operated trimming tool assembly of FIG. 2.
Figure 12:
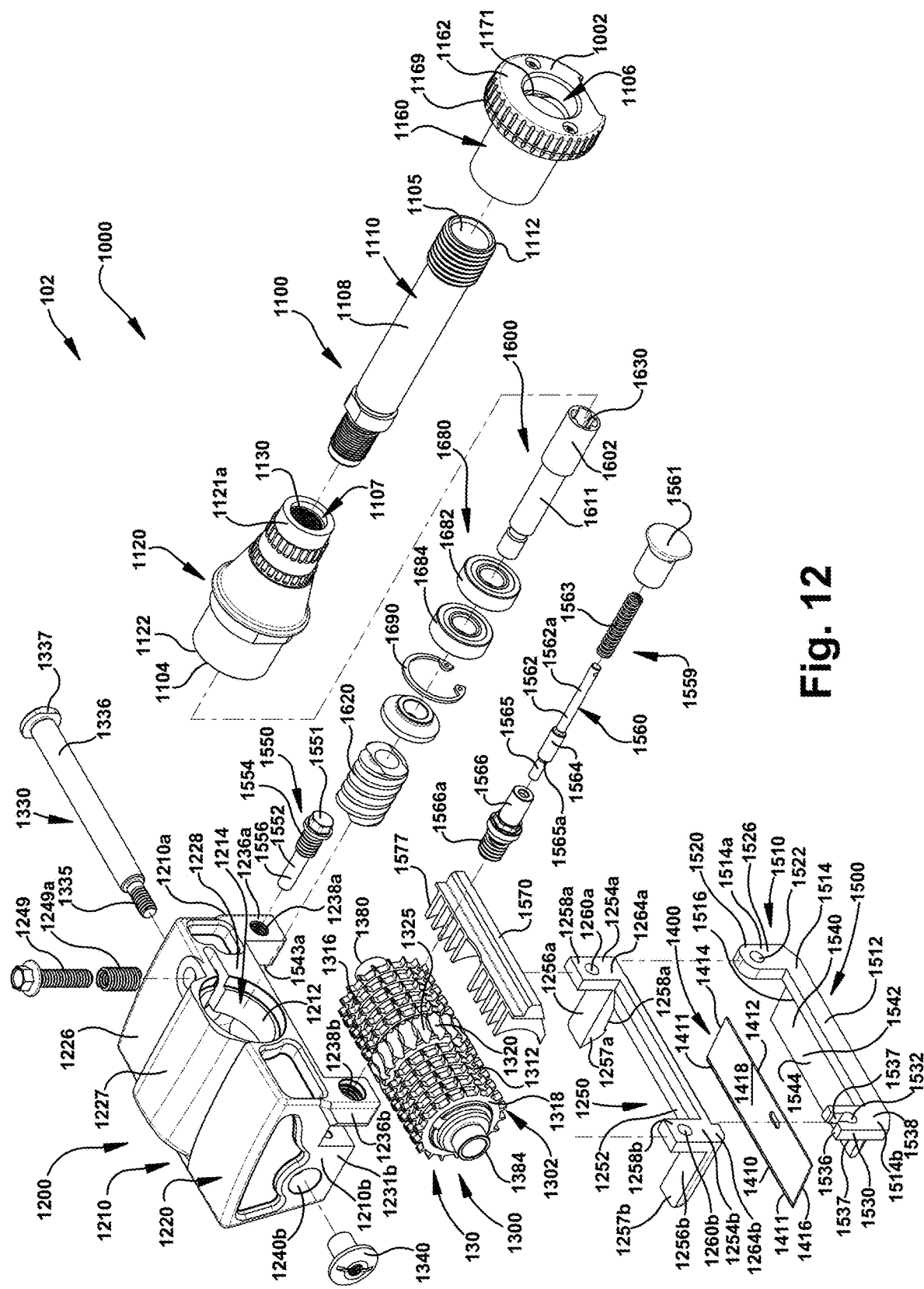
FIG. 12 is a schematic exploded, top, rear perspective view of the power operated trimming tool of FIG. 4.

As best seen in FIGS. 3 and 12, the driver retainer assembly 1160 secures the driver assembly 2300 of the shaft drive transmission assembly 2200 of the external drive assembly 2000 within the throughbore 1106 of the handle assembly 1100. The driver retainer assembly 1160 extends from a proximal end portion 1112 of the handle body 1110 and includes a knob 1162 defining a throughbore 1164. The knob throughbore 1164 is aligned with and part of the throughbore 1106 of the handle assembly 1100. The knob 1162 slidingly supports the latch 1170. The latch 1170 includes a central opening 1171 of the latch 1170 and is biased by a pair of springs to slide or move the latch 1170 to a locked position. The central opening 1171 of the latch 1170 is aligned with the throughbore 1164 of the knob 1162 and allows passage of the driver assembly 2300 of the shaft drive transmission assembly 2200 into the handle assembly throughbore 1106. In the locked position, the central opening 1171 of the latch 1170 is slightly misaligned with the throughbore 1164 of the knob 1162 thereby causing a portion of a peripheral surface of the latch 1170 defining the latch opening 1171 to bear against the outer shoulder 2811 of the housing outer surface 2810 of the clutch drive engagement assembly 2500 to releasably secure the forward portion 2304 of the driver assembly 2300 within the throughbore 1106 of the handle assembly 1100 and releasably secure the clutch drive engagement assembly 2500 to the handle assembly 1100. A radially extending outer surface of the latch 1170 defines an exposed actuation surface 1172 that is accessible in via a slot in an outer surface 1169 of the knob 1162. When the operator pushes on the actuation surface 1172 of the latch 1170, the latch opening 1171 is aligned with the knob throughbore 1164 and the driver assembly 2300 may be completely removed from the handle assembly 1100 by moving the driver assembly in the rearward or proximal direction R.

Additional specific details of a power operated trimming tool, including specific details of a head assembly including a feed roll assembly, a drive mechanism 1600, and a stationary blade, suitable for the present trimming tool 1000 are found in U.S. application Ser. No. 15/696,866 to Sukey, filed on Sep. 6, 2017, which is assigned to the assignee of the present application. U.S. application Ser. No. 15/696,866 is hereby incorporated herein in its entirety by reference.

Head Assembly and Frame Body 1210

Figure 2:
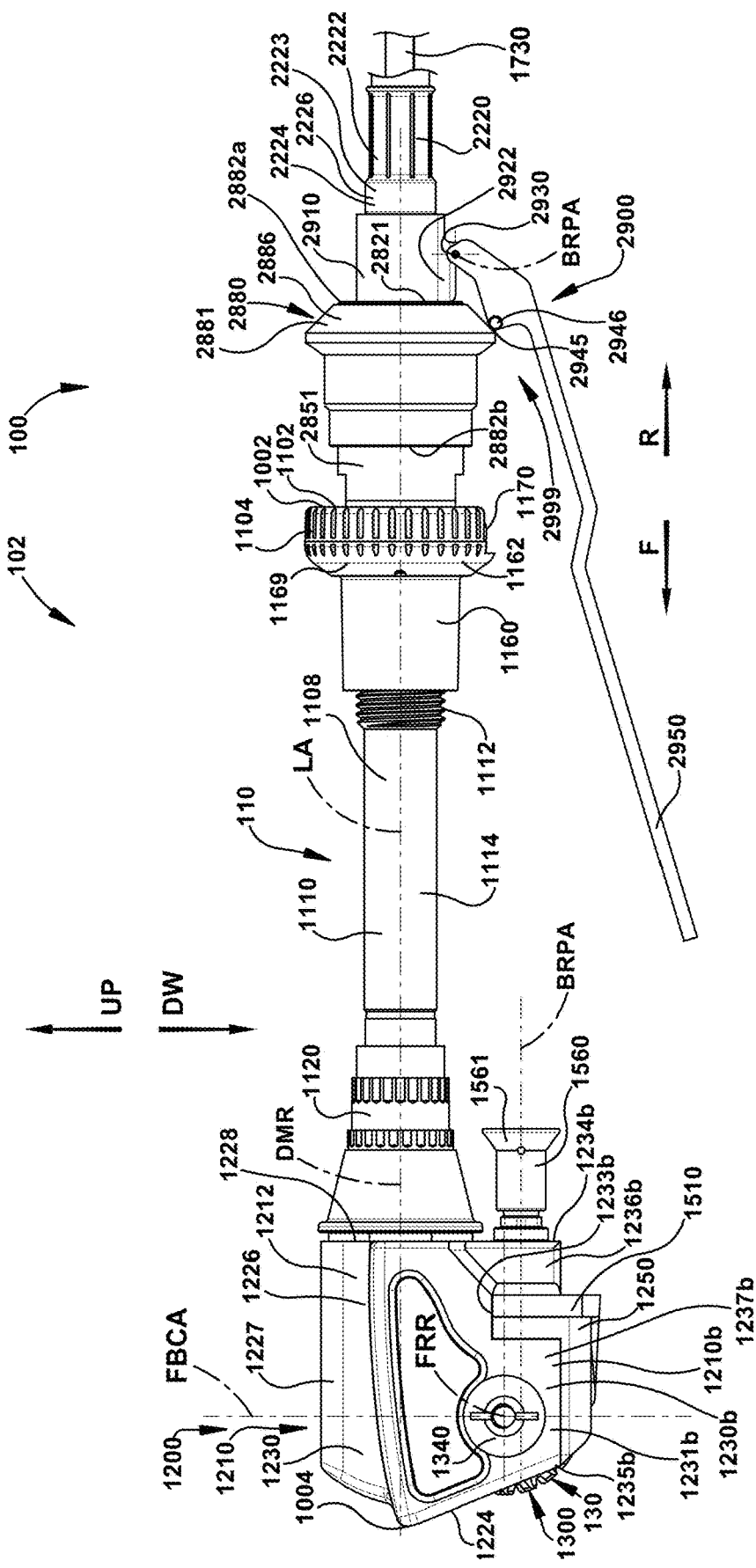
FIG. 2 is a schematic side elevation view of a portion of the power operated trimming tool assembly of FIG. 1 including the power operated trimming tool and a portion the external drive assembly including the clutch drive engagement assembly, the driver assembly, and a portion of the flexible shaft drive transmission assembly.

As best seen in FIGS. 2-13, the head assembly 1200 of the power operated trimming tool 1000 extends generally from the distal end portion 1104 of the handle assembly 1100 and includes the generally box-like frame body 1210. The frame body 1210 includes a vertically oriented frame body central axis FBCA (FIG. 2) which intersects and is orthogonal to the housing assembly longitudinal axis LA and which intersects and is orthogonal to the feed roll axis of rotation FRR (FIG. 2). The frame body 1210 is also characterized by a frame body vertical plane FBVP (FIG. 7) that bisects the frame body 1210 and extends along and is coincident with the handle assembly longitudinal axis LA and the frame body central axis FBCA. The frame body vertical plane FBVP bisects the frame body 1210 into a right side 1210*a* and a left side of the frame body 1210*b*, when viewed in plan view from above the power operated trimming tool 1000 and looking from the proximal end 1002 toward the distal end 1004 of the tool (that is, looking from the handle assembly 1100 toward the head assembly 1200). The right and left sides 1210a, 1210b of the frame body 1210 are substantially symmetrical about the frame body vertical plane FBVP and the right and left sides 1210a, 1210b are substantially mirror images of each other.

As best seen in FIGS. 3 and 12, the head assembly 1200 further includes the drive mechanism 1600, the feed roll assembly 1300, the blade 1400, the blade support or blade support assembly 1250 and the blade retainer or blade retainer assembly 1500. As noted previously, advantageously, the blade retainer assembly 1500 pivots between the first, blade retaining position 1598 securing the blade 1400 against the blade support assembly 1220 and the second, blade changing position 1599 where the blade 1400 is uncovered by the blade retainer plate 1510 thereby providing easy access to the blade 1400 such that the blade 1400 can easily be picked up and removed from the blade support assembly 1220 for sharpening or replacement of the blade 1400. Additionally and advantageously, the support portion 1220 of the frame body 1210 provides an advantageous configuration that: a) facilitates pivotal movement of the blade housing plate 1510 between the first, blade retaining position 1598 and the second, blade changing position 1599 of the blade retainer plate 1510; and b) affixes or secures the blade support assembly 1250 to the frame body 1210 using two fasteners, namely, a pivot pin fastener or pivot pin 1550 and a latch or latch fastener 1560 of a latch fastener assembly 1559. Further, as noted above, the frame body 1210 provides an advantageous configuration that results in the pivot axis BRPA (FIG. 2) of the blade retainer plate 1510 being offset from but substantially parallel to the handle assembly longitudinal axis LA, that is blade retainer plate pivot axis BRPA is offset from the blade 1400 and extends through and is substantially parallel to the side wall 1230a of the support portion 1220 of the frame body 1210.

The frame body 1210 includes the interface portion 1212, which is coupled to the handle extension 1120 of the handle assembly 1100 to secure the head assembly 1200 to the handle assembly 1100, and the support portion 1220, that supports the feed roll assembly 1300 within an interior region 1222 of the support portion 1220. The support portion 1220 also supports the fixed or stationary blade 1400, the blade support assembly 1250 and the blade retainer assembly 1500, which are also part of the head assembly 1200. The support portion 1220 of the frame body 1210 includes the parallel first and second side walls 1230a, 1230b which extend substantially parallel to the handle assembly longitudinal axis LA and an upper wall 1226 which bridges the spaced apart first and second side walls 1230a, 1230b. The support portion 1220 of the frame body 1210 also include a front wall 1224 and a rear wall 1228 both of which extend downwardly from the upper wall 1226, but only extend a portion of the way down the first and second side walls 1230a, 1230b. The first and second side walls 1230a, 1230b include respective lower portions 1231a, 1231b. The lower portions 1231a, 1231b of the first and second side walls 1230a, 1230b include respective downwardly facing surfaces 1232a, 1232b. Interrupting the downwardly facing surfaces 1232a, 1232b of the lower portions 1231a, 1231b of the first and second side walls are respective u-shaped upwardly extending notches 1233a, 1233b. The notches 1233a, 1233b of the lower portions 1231a, 1231a each includes a front wall section 1242a, 1242b and a rear wall section 1243a, 1243b separated or bridged by a horizontally extending upper wall section 1244a, 1244b. The front and rear wall sections 1242a, 1242b, 1243a, 1243b are substantially parallel and parallel to the frame body central axis FBCA.

Figure 6:
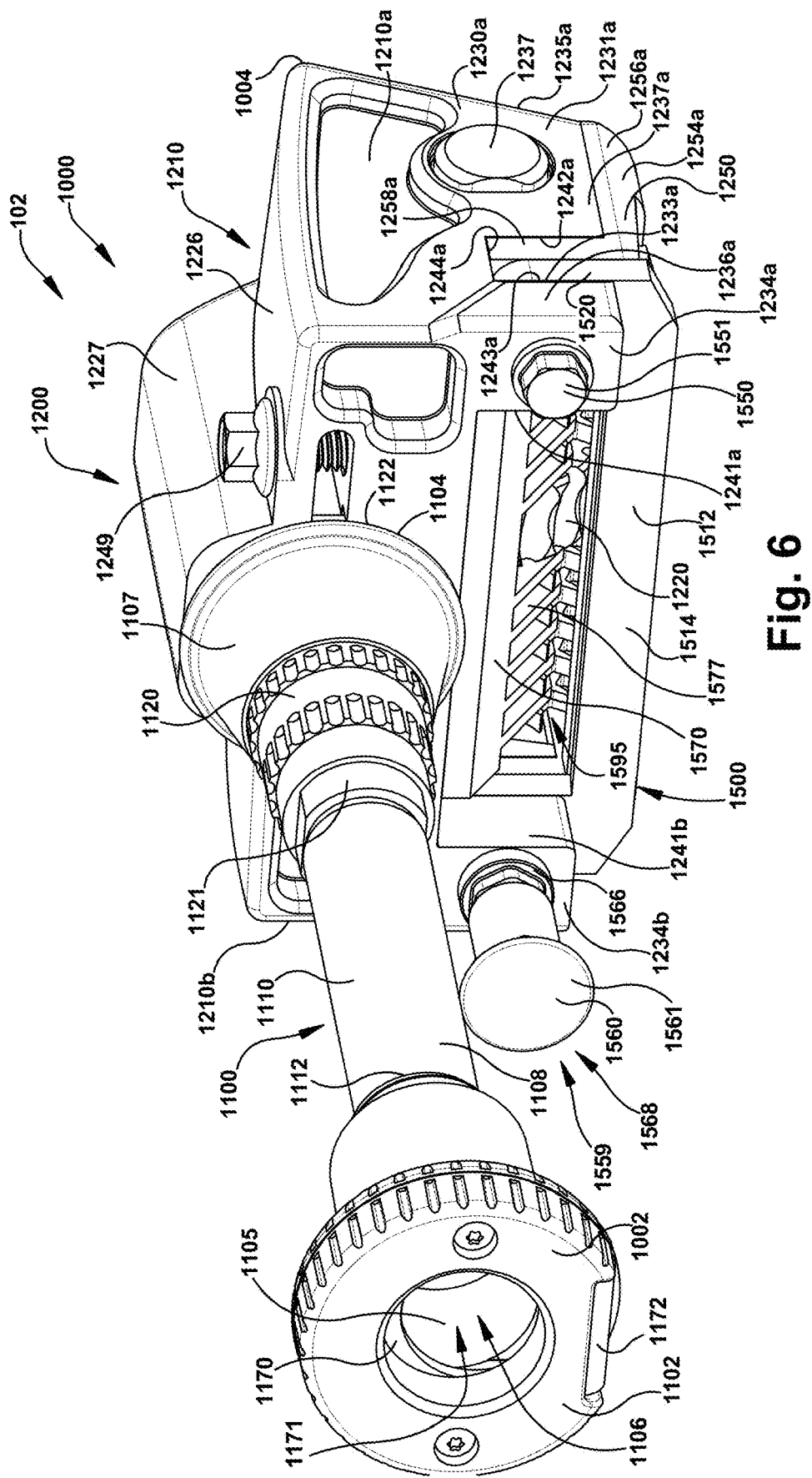
FIG. 6 is a schematic top, rear perspective view of the power operated trimming tool of FIG. 4, with the blade retainer assembly in the first blade retaining position.
Figure 7:
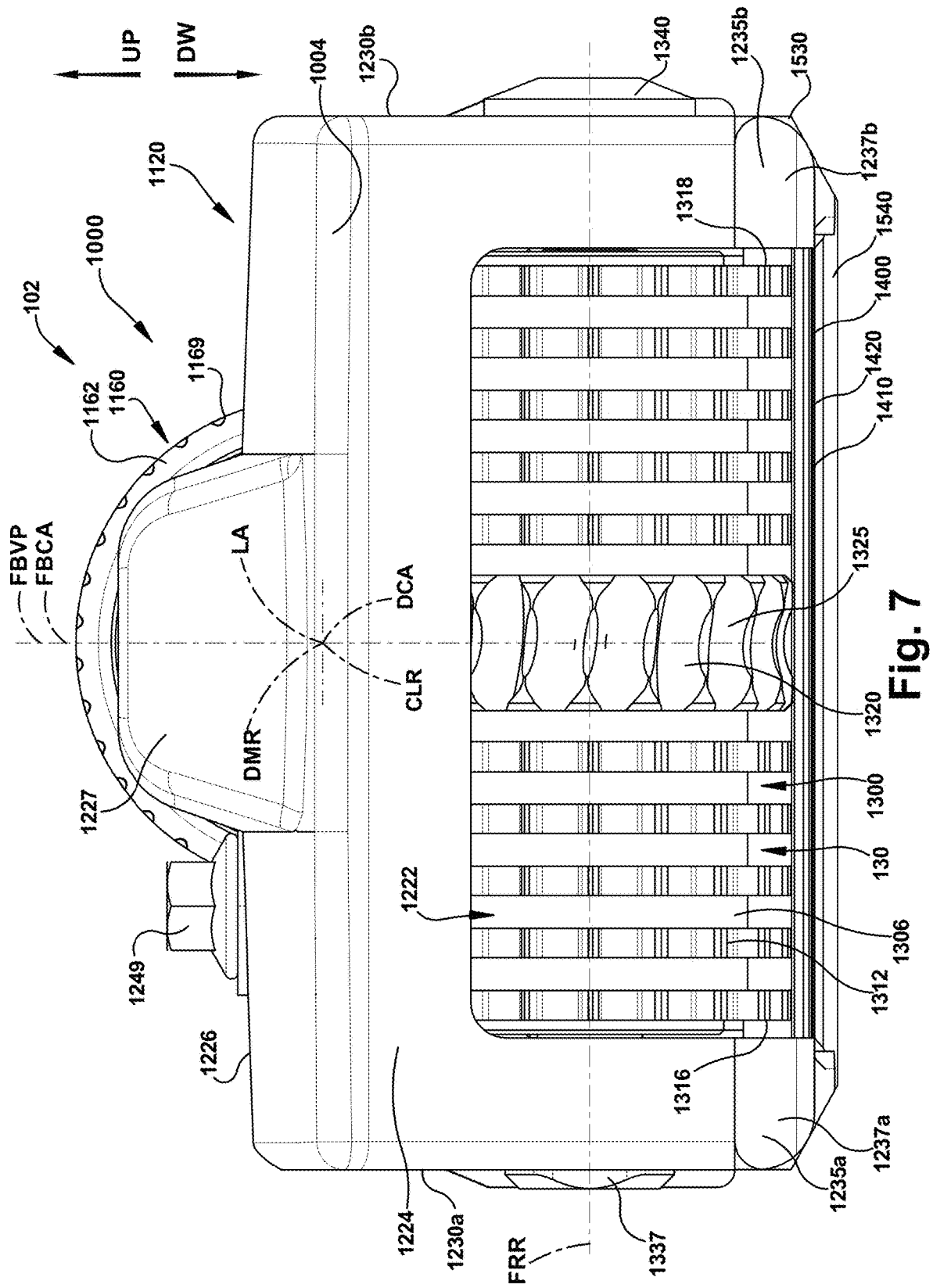
FIG. 7 is a schematic front elevation view of the power operated trimming tool of FIG. 4, with the blade retainer assembly in the first blade retaining position.
Figure 8:
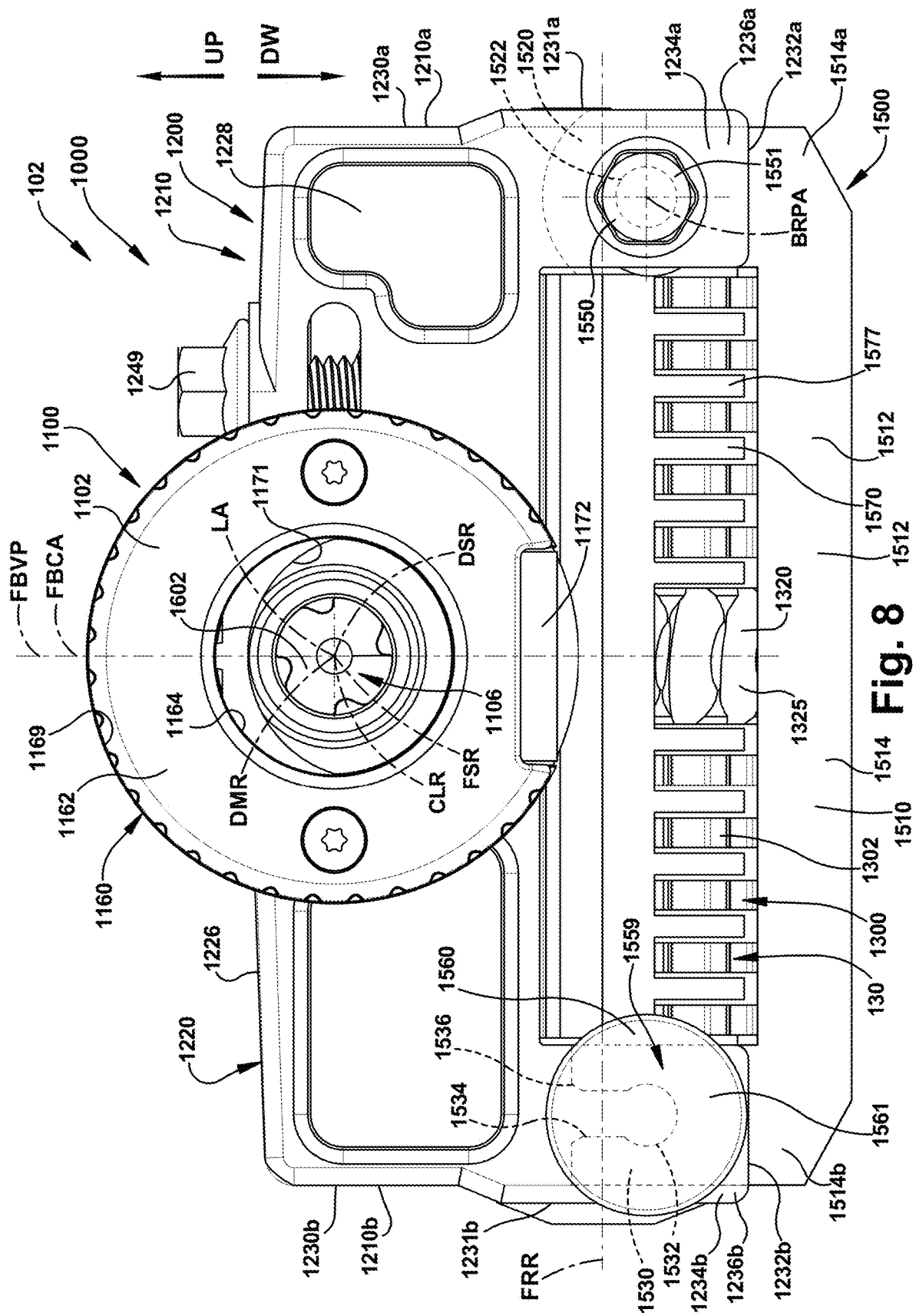
FIG. 8 is a schematic rear elevation view of the power operated trimming tool of FIG. 4, with the blade retainer assembly in the first blade retaining position.

As best seen in FIGS. 5, 6 and 13, the lower portions 1231a, 1231b of the first and second side walls 1230a, 1230b of the support portion 1220 of the frame body 1210 also include respective rearward or proximal facing surfaces 1234a, 1234b and respective forward or proximal facing surfaces 1235a, 1235b. Sections of the lower portions 1231a, 1231b of the first and second side walls 1230a, 1230b extending between the rearward facing surfaces 1234a, 1234b and the inverted u-shaped or upwardly extending notches 1233a, 1233b define first and second side wall bosses 1236a, 1236b. Sections of the lower portions 1231a, 1231b of the first and second side walls 1230a, 1230b extending between the u-shaped upwardly extending notches 1233a, 1233b and the forward facing surfaces 1235a, 1235b define first and second side wall mounting pedestals 1237a, 1237b. A first threaded horizontal opening 1238a in the lower portion 1231a of the first side wall 1230a extends through the first side wall boss 1236a and an aligned second horizontal opening 1239a in the lower portion 1231a of the first side wall 1230a extends through a portion of the first side wall mounting pedestal 1237a. A second threaded horizontal opening 1238b in the lower portion 1231b of the second side wall 1230b extends through the second side wall boss 1236b and an aligned second horizontal opening 1239b in the lower portion 1231b of the second side wall 1230b extends through a portion of the second side wall mounting pedestal 1237b.

In one exemplary embodiment, the second threaded horizontal opening 1238b is threaded to receive the threaded outer portion 1566a of a cylindrical casing 1566 of a latch fastener assembly 1559, while the first threaded horizontal opening 1238a is threaded to receive a threaded outer portion 1554 of the pivot pin 1550. As best seen in FIGS. 11-14, in one exemplary embodiment, the pivot pin 1150 includes and enlarged head 1551 and a shaft 1552 extending from the head 1551. The shaft 1552 includes the threaded outer portion 1554 adjacent the head 1551 and a distal non-threaded portion 1556. The latch fastener assembly 1559 includes a latch or latch fastener 1560, a return spring 1563 and the cylindrical casing 1566 which supports the latch fastener 1560 in a throughbore 1566b of the casing 1566 for sliding movement with respect to the support portion 1220 of the frame body 1210. In one exemplary embodiment, the casing 1566 includes a threaded outer surface portion 1566a that is received in a threaded horizontally extending opening 1238b of the support boss 1236b of the frame body side wall 1230b.

The first threaded horizontal opening 1238a threadedly engages and receives the pivot pin 1550 of the blade retainer assembly 1500. Advantageously, the pivot pin 1550 extends through aligned openings 1522, 1260a of the blade retainer assembly 1500 and the blade support assembly 1250. Thus, the pivot pin 1550 functions to both: a) pivotally secure or pivotally couple the blade retainer plate 1510 to the lower portion 1231a of the first side wall 1230a of the support portion 1220 of the frame body 1210; and b) secure a frame 1252 of the blade support assembly 1250 to the lower portion 1231a of the first side wall 1230a of the support portion 1220 of the frame body 1210. Thus, the pivot pin 1550 a part of both the blade retainer assembly 1500 and the blade support assembly 1250 as it functions to secure both the blade support plate 1210 of the blade retainer assembly 1500 and the frame 1252 of the blade support assembly 1250 to the first side wall 1230a of the frame body support portion 1220.

Figure 11:
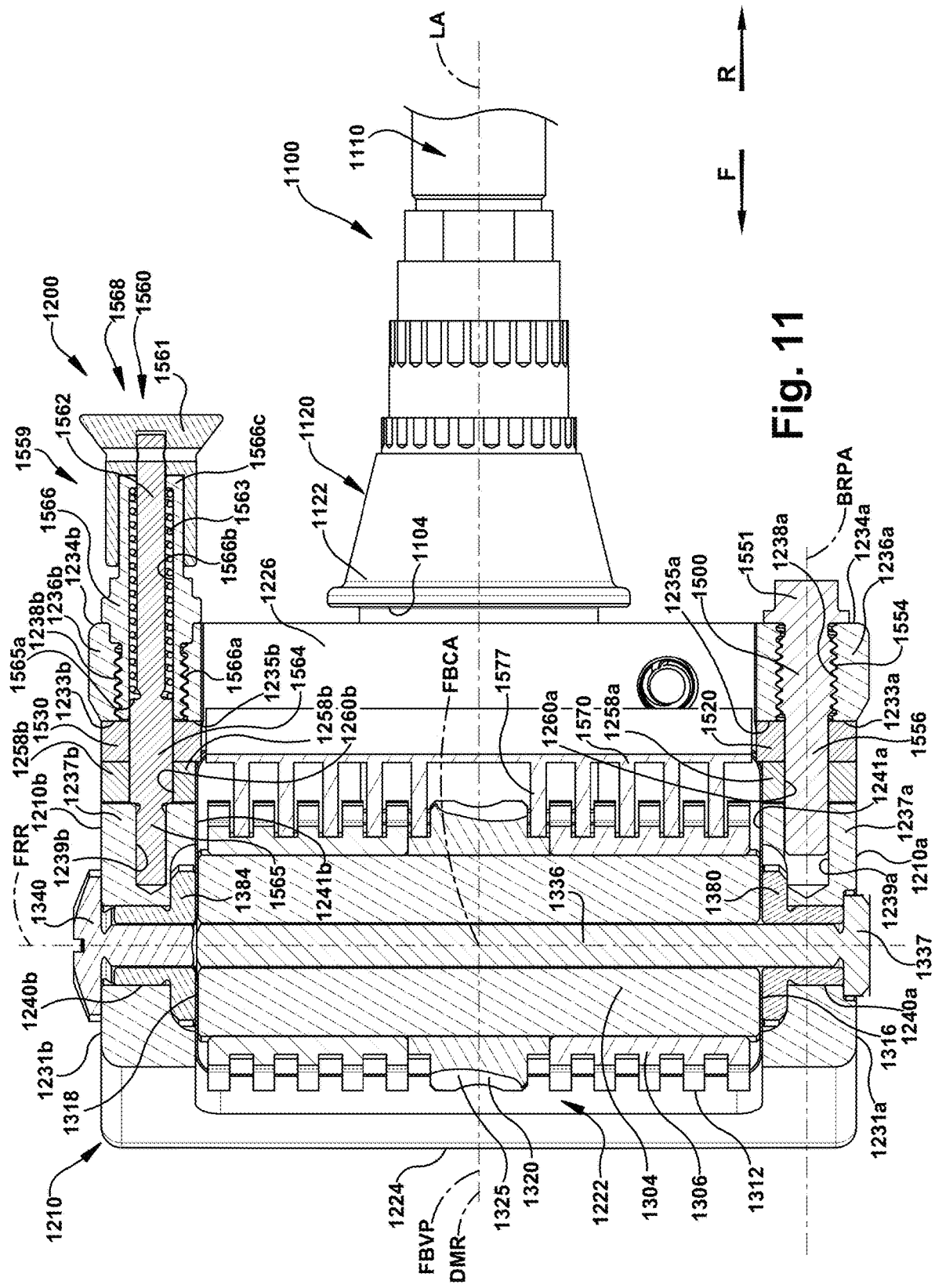
FIG. 11 is a schematic longitudinal horizontal sectional view of a portion of the power operated trimming tool of FIG. 4 as seen along a horizontal plane through the feed roll assembly.

As best seen in FIG. 11, the second threaded horizontal opening 1238b threadedly engages and receives the cylindrical casing 1566 which, in turn, supports the latch or latch fastener 1560 of the latch or latch assembly 1559 of the blade retainer assembly 1500. Advantageously, the latch fastener 1560 extends through an aligned slot 1532 of the blade retainer assembly 1500 and an aligned opening 1260b of the blade support assembly 1250. Thus, in the first, latched position 1568 of the latch fastener 1560, the latch fastener 1560 functions to both: a) secure the blade retainer plate 1510 to the lower portion 1231b of the second side wall 1230b of the support portion 1220 of the frame body 1210 such that the blade retainer plate 1510 is maintained in the first, blade retaining position 1598; and b) maintain or secure the frame 1252 of the blade support assembly 1250 to the lower portion 1231b of the second side wall 1230a of the support portion 1220 of the frame body 1210. In a second, unlatched position 1569 of the latch fastener 1560, the latch fastener 1560 is moved in the rearward direction R (as schematically depicted in FIGS. 5 and 13) and functions to both: a) allow release of the blade retainer plate 1510 from the latch fastener 1560 and thus allow release of the blade retainer plate 1510 from the lower portion 1231b of the second side wall 1230b of the support portion 1220 of the frame body 1210 such that the blade retainer plate 1510 may be pivoted about pivot axis BRPA to the second, blade changing position 1599 thus allowing access to the blade 1400 for blade sharpening or changing purposes; and b) maintain or secure the frame 1252 of the blade support assembly 1250 to the lower portion 1231b of the second side wall 1230a of the support portion 1220 of the frame body 1210. Thus, the latch fastener 1560 is a part of both the blade retainer assembly 1500 and the blade support assembly 1250 as it functions to releasably secure the blade support plate 1210 of the blade retainer assembly 1500 to the first side wall 1230a of the frame body support portion 1220 and to secure the frame 1252 of the blade support assembly 1250 to the first side wall 1230a of the frame body support portion 1220.

The forward or front wall 1224, the rear wall 1228, the upper wall 1226 and the first and second side walls 1230a, 1230b of the support portion 1220 define the interior region 1222. The upper wall 1226 of the support portion 1220 includes an upwardly protruding, dome-shaped central portion 1227, which provides clearance for a worm gear driver 1620 of the drive mechanism 1600 that extends into the interior region 1222. Located generally centrally in the first and second side walls 1230a, 1230b are a pair of circular openings 1236a, 1236b extending through first and second side walls 1230a, 1230b that receive respective press fit bushings 1380, 1382 of a feed roll shaft 1330 that supports the feed roll 1302 of the feed roll assembly 1300. The feed roll 1302 is mounted on the feed roll shaft 1330. The feed roll shaft 1330 is supported by the bushings 1380, 1382 and rotates about the feed roll axis FRR. A threaded end portion 1335 of the feed roll shaft 1330 receives a threaded cap 1340 to maintain the feed roll shaft 1330 with respect to the side walls 1330a, 1330b of the frame body support portion 1220. A stem 1345 portion of the threaded cap 1340 is received in the press fit bushing 1382 in second side wall 1330b, while a portion 1336 of the shaft 1330 adjacent an enlarged head 1337 of the shaft 1330 is received in the press fit bushing 1380 in first side wall 1330a.

Blade Support and Blade Retainer Assemblies 1250, 1500

Figure 9:
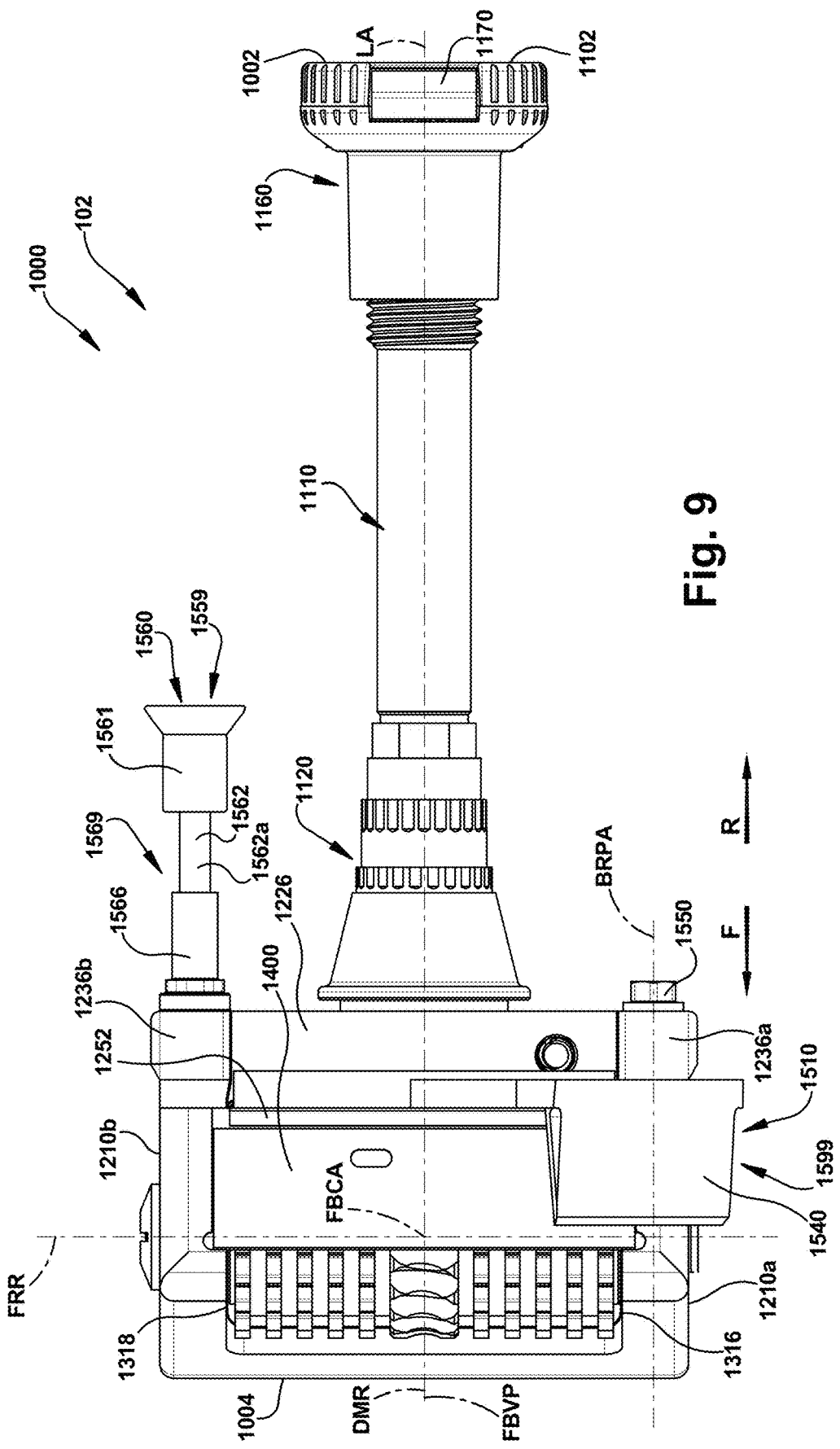
FIG. 9 is a schematic bottom plan view of the power operated trimming tool of FIG. 4, with the blade retainer assembly in the first blade retaining position.
Figure 10:
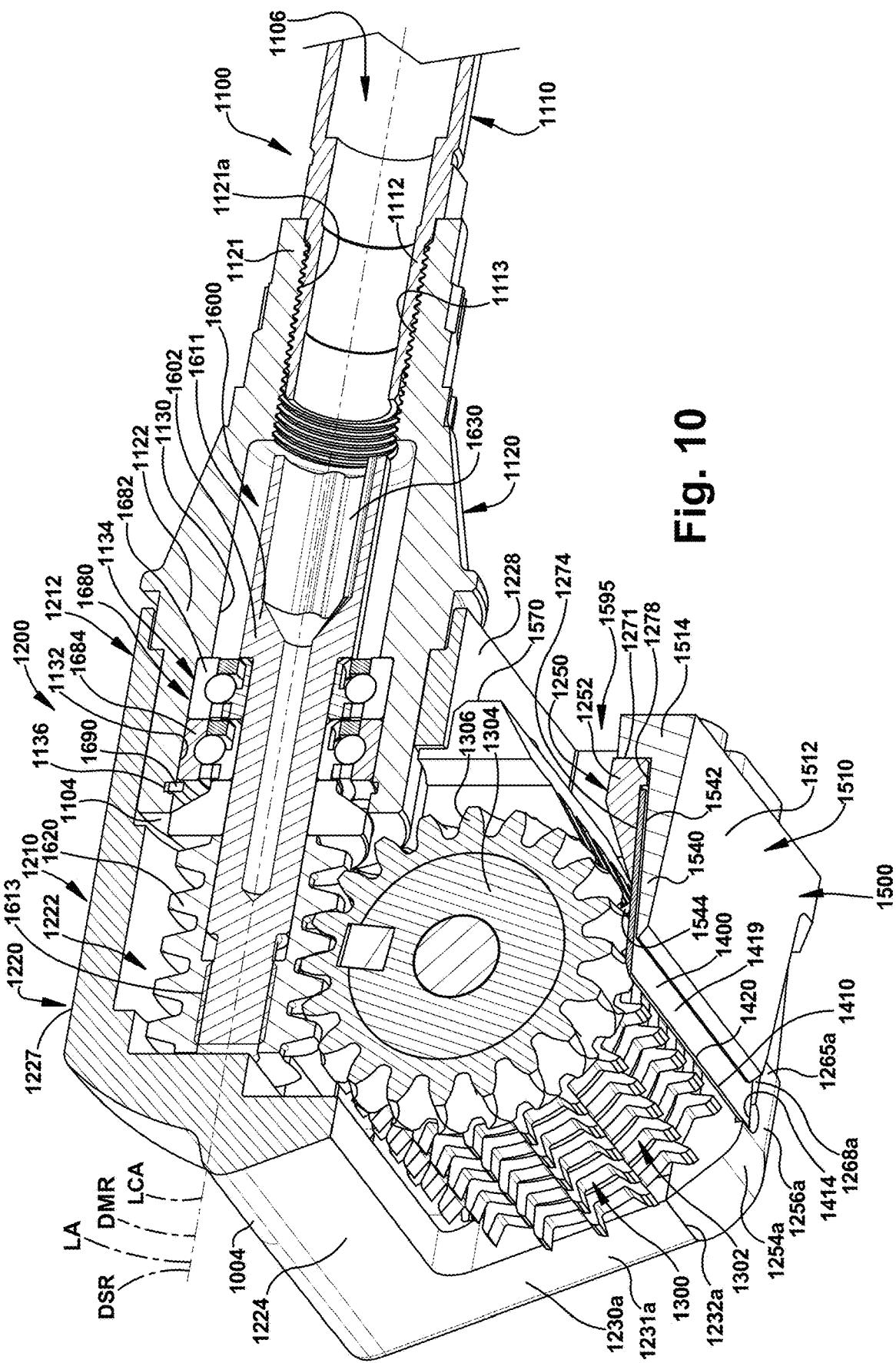
FIG. 10 is a schematic bottom, front, perspective longitudinal vertical section view of the power operated trimming tool of FIG. 4.

As best seen in FIGS. 4-6 and 9-13, the blade support or blade support assembly 1250 and the blade retainer assembly 1500 support the blade 1400 in fixed relation to the outer surface 1312 of the rotating feed roll 1302. The blade support assembly 1250 includes the blade support frame 1252 which is affixed to the lower portions 1231a, 1231b of the side walls 1230a, 1230b of the support portion 1220 of the frame body 1210. The blade support assembly 1250 also includes the pivot pin fastener 1550 and the latch fastener 1560, which are shared components with the blade retainer assembly 1500. As best seen in FIG. 11, the pivot pin 1550 and the latch 1560 extend through respective openings 1260a, 1260b of the blade support frame 1252 to secure the frame 1252 to the side walls 1230a, 1230b of the frame body 1210. Advantageously, the blade support frame 1252 of the blade support assembly 1250 includes first and second supports or brackets 1254a, 1254b spaced apart by a blade supporting cross member 1270. A horizontally extending portion of the blade supporting cross member 1270 includes a planar blade support plate 1272. A lower surface of the blade support plate 1272 includes a substantially planar blade support surface 1274 which overlies and supports a portion of the upper planar surface 1418 of the stationary blade 1400. Advantageously, extending downwardly along a rearward edge portion 1271 of the blade supporting cross member 1280 is a ledge 1278 (FIG. 14) of the lower blade support surface 1274. The ledge 1278 acts as a stop for the back side 1412 to constrain rearward movement of the blade 1400. As can be seen in FIG. 10, a front or forward portion 1276 of the blade support surface 1274 is recessed from the front side 1410 of the blade 1400.

Figure 14:
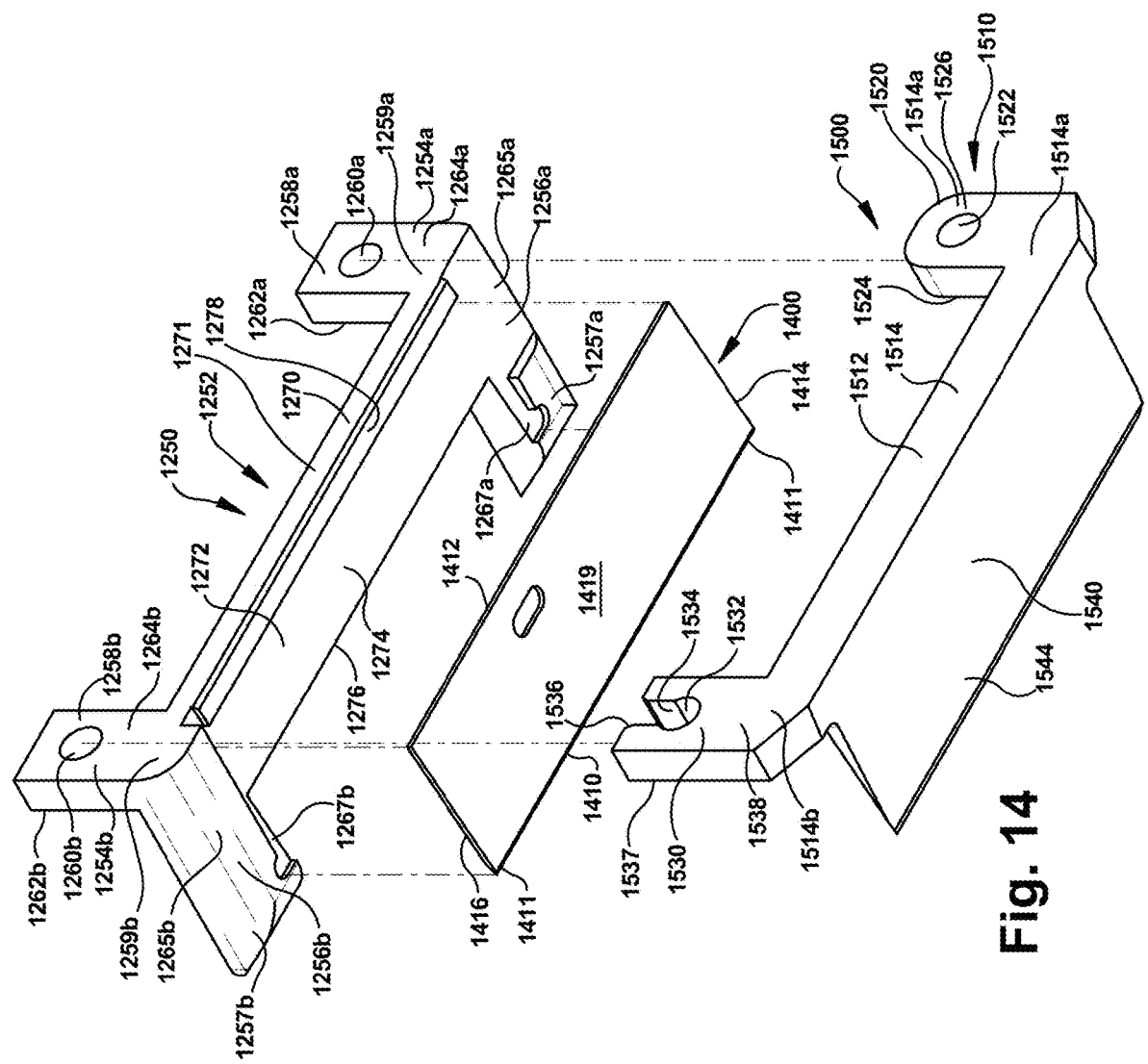
FIG. 14 is a schematic exploded bottom, rear perspective view of a portion of the head assembly of the power operated trimming tool of FIG. 4 including the blade, the blade support, and the blade retainer assembly.
Figure 15:
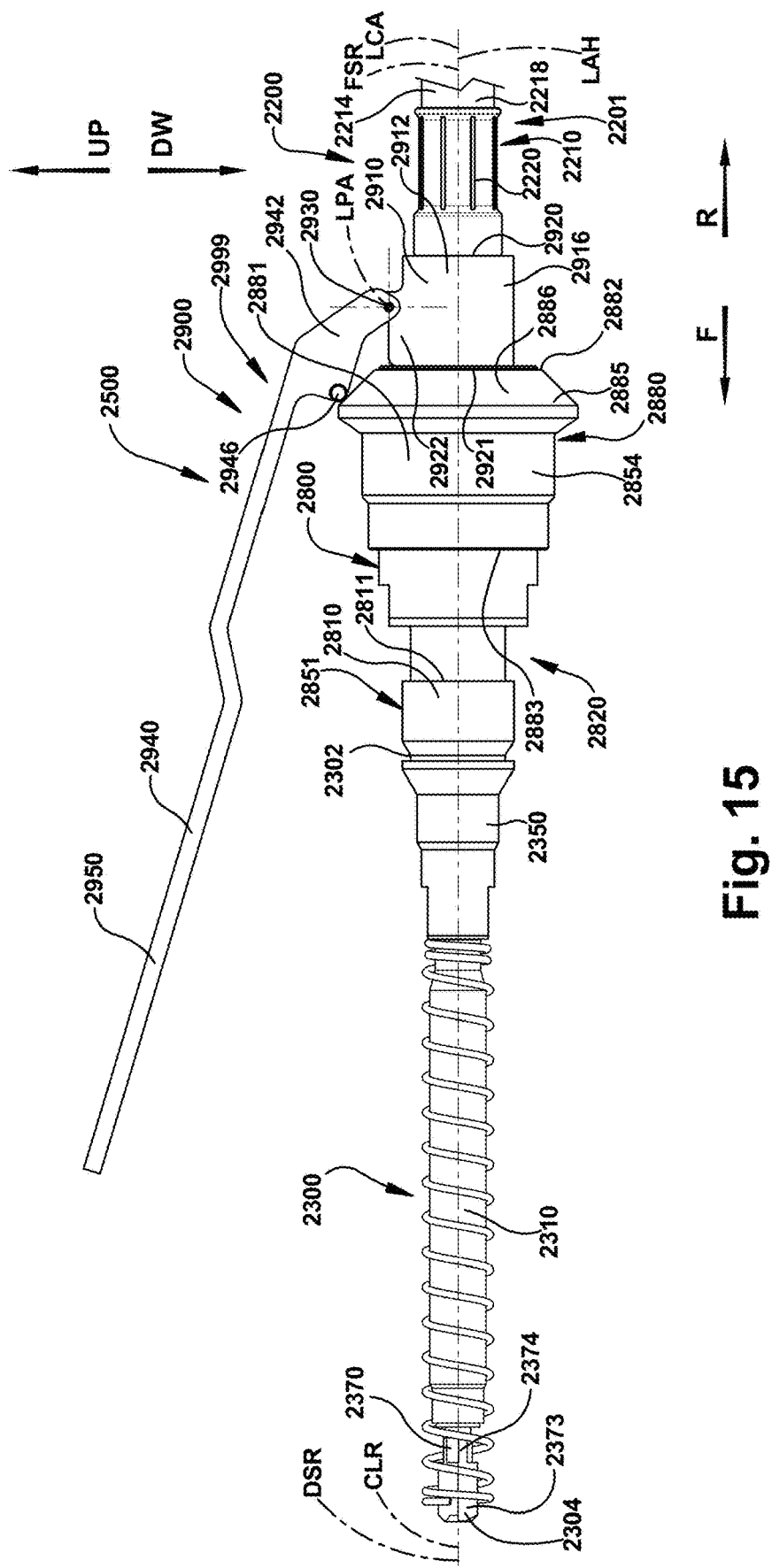
FIG. 15 is a schematic side elevation view of a portion of the external drive assembly of FIG. 1 including the clutch drive engagement assembly, the driver assembly, and a portion of the flexible shaft drive transmission assembly.

As explained above, the blade support frame 1252 is affixed to the lower portions 1231a, 1231b of the side walls 1230a, 1230b by the pivot pin fastener 1550 and the latch fastener 1560. As best seen in FIG. 14, in one exemplary embodiment, the first support or bracket 1254a of the frame 1252 of the blade support assembly 1250 includes a first horizontal base 1256a and a first mounting projection 1258a extending from a rearward end portion 1259a of the first horizontal base 1256a. Similarly, the second support or bracket 1254b of the frame 1252 includes a second horizontal base 1256b and a second mounting projection 1258b extending from a rearward end portion 1259b of the second horizontal base 1256b. In one exemplary embodiment, the first and second mounting uprights or mounting projections 1258a, 1258b of the first and second brackets 1254a, 1254b extend into respective ones of the u-shaped, upwardly extending notches 1233a, 1233b in the downward facing surfaces 1232a, 1232b of the lower portions 1231a, 1231b of the first and second side walls 1230a, 1230b. The mounting projections 1258a, 1258b, as disposed in the u-shaped notches 1233a, 1233b, include front walls 1262a, 1262b that are adjacent respective front wall sections 1242a, 1242b of the notches 1233a, 1233b.

As best seen in FIGS. 4-5 and 12-13, the back wall 1264a of the mounting projection 1258a of the first support or bracket 1254a of the frame 1252 of the blade support assembly 1250 is adjacent and parallel to a front wall 1524 of the pivot upright 1520 of the blade retainer plate 1510. That is, the mounting projection 1258a is sandwiched between and in contact with the front wall section 1242a of the notch 1233a and the front wall 1524 of the pivot upright 1520 of the blade retainer plate 1510 of the blade retainer assembly 1500. Since blade retainer plate 1510 of the blade retainer assembly 1500 pivots about the blade retainer plate pivot axis BRPA in moving between the first, blade retaining position 1598 and the second, blade changing position 1599 of the blade retainer plate 1510, the pivot upright 1520 necessarily pivots or rotates with respect to the back wall 1264a of the mounting projection 1258a and pivots or rotates with respect to the back wall section 1243a of the inverted u-shaped notch 1233a of the lower portion 1231a of the first side wall 1230a as the blade retainer plate 1510 moves through its swing angle SWG. However, in either blade retainer plate position 1598, 1599, the pivot upright 1520 of the blade retainer plate 1510 remains parallel to and in contact with the mounting projection 1258a of the bracket 1254a of the frame 1252 of the blade support assembly and remains parallel to and in contact with the notch 1233a of the lower portion 1231a of the first side wall 1230a, that is, the front wall 1524 of the pivot upright 1520 remains parallel to and in contact with the back wall 1264a of the mounting projection 1258a of the frame 1252 and the back wall 1526 of the pivot upright 1520 remains parallel to and in contact with the back wall section 1243a of the inverted, u-shaped upward extending notch 1233a.

In the first, blade retaining position 1598 of the blade retainer plate 1510 (FIGS. 4, 10 and 13), the back wall 1264b of the mounting projection 1258b of the second support or bracket 1254b of the frame 1252 of the blade support assembly 1250 is adjacent and parallel to a front wall 1537 of the pivot upright 1530 of the blade retainer plate 1510 of the blade retainer assembly 1500. That is, the mounting projection 1258b is sandwiched between and in contact with the front wall section 1242b of the notch 1233b and the front wall 1537 of the latch upright 1530 of the blade retainer plate 1510. As best seen in FIGS. 9 and 13, since blade retainer plate 1510 pivots about the blade retainer plate pivot axis BRPA in moving between the first, blade retaining position 1598 and the second, blade changing position 1599 of the blade retainer plate 1510, the latch upright 1530, in the second, blade changing position 1599, is necessarily pivoted away from and out of contact with the back wall 1264a of the mounting projection 1258a and the back wall section 1243b of the inverted u-shaped notch 1233b of the lower portion 1231b of the second side wall 1230b. However, in either blade retainer plate position 1598, 1599, the front wall 1537 of the latch upright 1530 remains parallel to the back wall 1264b of the mounting projection 1258b of the frame 1252 and the back wall 1538 of the latch upright 1530 remains parallel to the back wall section 1243b of the inverted, u-shaped upward extending notch 1233b.

As best seen in FIGS. 5, 10 and 14, the blade 1400 is seated on the downwardly facing, lower blade support surface 1274 of the blade support plate 1274 of the cross member 1270 along an entirety of its lateral extent between the first and second lateral sides 1414, 1416 of the blade 1400. The blade 1400 is sandwiched or constrained between the blade support surface 1274 of the blade support plate 1272 of the cross member 1270 and a blade cover 1540 extending from a base 1512 of a cross member 1512 of the blade retainer plate 1510 of the blade retainer assembly 1500 thereby preventing movement of the blade 1400 in the vertical direction, that is, in the upward direction UP or the downward direction DW. The upper surface 1418 of the blade 1400 is overlaid, contacted and supported by the lower blade support surface 1274 of the blade support plate 1272 of the blade support assembly 1250, while the lower surface 1419 of the blade 1400 is overlaid, contacted and supported by an upper blade support surface 1542 of the blade cover 1540 of the blade retainer plate 1510 of the blade retainer assembly 1500. Thus, the blade 1400 is advantageously rigidly fixed to and directly supported along its lateral extent by the blade support plate 1272 and by the blade cover 1540.

In one exemplary embodiment, respective forward or distal portions of the lower surfaces 1265a, 1265b of the horizontal bases 1256a, 1256b of brackets 1254a, 1254b of the frame 1252 of the blade support assembly 1250 include downwardly extending portions defining the blade receiving slots 1267a, 1267b. The blade receiving slots 1267a, 1267b receive respective end portions 1411 of the front side 1412 of the blade 1400 adjacent the lateral sides 1414, 1416. The blade receiving slots 1267a, 1267b advantageously serve to both position and stabilize the blade 1400 and limit or constrain movement blade in the forward or distal direction F. The back side 1412 of the blade 1400 bears against the ledge 1278 of the lower blade support surface 1274 of the blade support assembly 1250 to limit or constrain movement of the blade 1400 in the rearward or proximal direction R. As noted previously, the forward portion 1276 of the blade support plate 1272 of the frame 1252 of the blade support assembly 1250 is recessed rearwardly from the cutting edge 1420 of the blade 1400 such that the cutting edge 1420 is exposed for cutting the workpiece as the workpiece is fed into the cutting edge 1420 by rotation of the feed roll 1302 about the feed roll axis of rotation FRR. Similarly, a forward portion 1544 of the blade cover 1540 of the cross member 1512 of the blade retainer plate 1510 of the blade retainer assembly 1500 is recessed rearwardly from the cutting edge 1420 of the blade 1400 such that the cutting edge 1420 is exposed for cutting the workpiece as the workpiece is fed in the direction of the cutting edge 1420 by rotation of the feed roll 1302. As can best be seen in FIG. 3, the cutting edge 1420 of the blade 1400 is in proximity to the outer surface 1312 of the feed roll 1302 and, in one exemplary embodiment, the cutting edge 1420 is positioned slightly forward of the frame body central axis FBCA and the feed roll axis of rotation FRR.

As best seen in FIGS. 11 and 14, the pivot pin or pivot pin fastener 1550 extends through the following horizontally extending aligned openings: a) the first horizontal opening 1238a of the boss 1236a of the lower portion 1231a of the side wall 1230a; b) the pivot fastener opening 1522 of the pivot upright 1520 of the blade retainer plate 1510 of the blade retainer assembly 1500; c) the pivot fastener opening 1260a of the mounting projection upright 1258a of the bracket 1254 of the frame 1252 of the blade support assembly 1250; and d) the second horizontal opening 1239a of the mounting pedestal 1239a of the lower portion 1231a of the first side wall 1230a of the frame body 1210. In one exemplary embodiment, the pivot pin fastener 1550 includes a cylindrical shaft 1552 extending from an enlarged head 1551. The pivot shaft 1552 includes a threaded portion 1554 adjacent the enlarged head 1551 and a non-threaded portion 1556 spaced from the enlarged head 1551. The first horizontal opening 1238a of the boss 1236a of the lower portion 1231a of the side wall 1230a includes a mating threaded inner surface 1245a. The threaded portion 1554 of the pivot shaft 1552 threads into the threaded inner surface 1245a of the first horizontal opening 1238a of the boss 1238a to secure the pivot pin 1550 to the side wall 1330a of the frame body 1210. The pivot pin 1510 thereby couples: a) the pivot upright 1520 of the blade retainer plate 1510 of the blade retainer assembly 1500; and b) the mounting projection upright 1258a of the first bracket 1254a of the frame 1252 of the blade support assembly 1250 to the frame body 1210.

As best seen in FIGS. 11 and 14, in one exemplary embodiment, the blade retainer plate 1510 includes a latch upright 1530 which extends into the u-shaped upwardly extending notch 1233b of the second side wall 1230b. The latch upright 1530 includes a latch slot 1532. The latch slot 1532 includes a slot opening 1534 at a distal end 1536 of the latch upright 1530. The latch fastener 1560 extends through the second horizontal opening 1238b of the second side wall 1230b and through the aligned latch slot 1522 to releasably affix the blade retainer plate 1510 to the second side wall 1230b. The latch fastener 1560 is movable between a first, latched position 1568 and a second, unlatched position 1569. The first latched position 1568 of the latch fastener 1560 corresponds to the first blade retaining position 1598 of the blade retaining plate 1510 and a second, unlatched position 1569 of the latch fastener 1560 corresponds to the second blade changing position 1599 of the blade retaining plate 1510.

In one exemplary embodiment, the latch fastener assembly 1559 includes the latch fastener 1560, the return spring 1563 and the cylindrical casing 1566. In one exemplary embodiment, the latch fastener 1560 includes an enlarged head 1561 and a variable diameter shaft 1562. The shaft 1562 includes a small diameter proximal portion 1562a and a forward portion including a larger diameter portion 1564 and a smaller diameter portion 1565, adjacent a distal end of the shaft 1562. The return spring 1563 is captured between a radially extending shoulder 1565a between the shaft proximal portion 1562a and the larger diameter forward portion 1564 and an internal radially inward step 1566c at a proximal end of the casing throughbore 1566b. The return spring 1563 biases the latch fastener 1560 in the forward direction F to a first, latched position 1568 of the latch fastener 1560. The cylindrical casing 1566 is received in the threaded horizontal opening 1238b extending through the support boss 1236b of the lower portion 1231b of the side wall 1230b. The cylindrical casing 1566 includes a horizontally extending throughbore 1566b which slidingly supports the variable diameter shaft 1562 of the latch fastener 1560. The cylindrical casing 1566 also includes the threaded outer portion 1566a which threads into the threaded horizontal opening 1238b of the side wall 1230b of the support portion 1220 of the frame body 1210.

In the first latched position 1598 of the latch fastener 1560, the larger diameter forward portion 1564 of the variable diameter shaft 1562 is positioned within the latch slot 1532 of the latch upright 1530. A diameter of the larger diameter forward portion 1564 is sufficiently large compared to the slot opening 1534 such that the latch fastener 1560 maintains the position of the blade retainer plate 1510 in the first blade retaining position 1598 and couples or secures the blade retainer plate 1510 to the second side wall 1230b. By contrast, in the second unlatched position 1599 of the latch fastener 1560, the smaller diameter forward portion 1565 of the variable diameter shaft 1562 is positioned within the latch slot 1532 of the latch upright 1530 is sufficiently small compared to the slot opening 1534 such that the blade retainer plate 1510 can be pivoted away from the latch fastener 1560 and out of the u-shaped upwardly extending notch 1233b of the second side wall 1230b and pivoted to the second blade changing position 1599 of the blade retaining plate 1510 thus allowing access to the blade 1400 for purposes of changing the blade or sharpening the blade. When the latch 1560 is moved from its first, latched position 1568 (corresponding to the first, blade retaining position 1598 of the blade retainer plate 1510) to the second, unlatched position 1569 (corresponding to the second, blade changing position 1599 of the blade retainer plate 1510), the latch 1560 is pulled or moved in the rearward direction R a predetermined distance.

In the first, blade retaining position 1598 of the blade retainer plate 1510, the latch or latch fastener 1560 extends through the following horizontally extending aligned openings: a) the first threaded horizontal opening 1238b of the boss 1236b of the lower portion 1231b of the side wall 1230b; b) the throughbore 1566b of the cylindrical casing 1566 of the latch fastener assembly 1559; c) the latch fastener slot 1532 of the latch upright 1530 of the blade retainer plate 1510 of the blade retainer assembly 1500; d) the latch fastener opening 1260b of the mounting projection upright 1258b of the bracket 1254 of the frame 1252 of the blade support assembly 1250; and e) the second horizontal opening 1239b of the mounting pedestal 1239b of the lower portion 1231b of the second side wall 1230b of the frame body 1210. In the first, latched position 1568 of the latch 1560, the latch 1560 couples: a) the latch upright 1530 of the blade retainer plate 1510 of the blade retainer assembly 1500; and b) the mounting projection upright 1258b of the second bracket 1254b of the frame 1252 of the blade support assembly 1250 to the frame body 1210.

The blade retainer assembly 1500 includes the blade retainer plate 1510, the pivot fastener 1550 and the latch fastener 1560. The pivot fastener 1550 defines the blade retainer plate pivot axis BRPA and the blade retainer plate 1510 pivots or swings through the swing angle SWG between the first blade retaining position 1598 and the second blade changing position 1599. In the first blade retaining position 1598, the blade 1400 is secure or sandwiched between the lower blade support surface 1274 of the blade support plate 1272 of the blade support 1250 and the upper blade support surface 1542 of the blade cover 1540 of the cross member 1512 of the blade retainer plate 1510 of the blade retainer 1500.

As best seen in FIG. 14, in one exemplary embodiment, the blade retainer plate 1510 of the blade retainer assembly 1500 comprises the cross member 1512 which extends between the pivot upright 1520, coupled to the first side wall 1230a of the frame body 1210, and the latch upright 1530, coupled to the second side wall 1230b of the frame body. In the first, blade retaining position 1598 of the blade support plate 1510, the cross member 1512 extends substantially orthogonally to the frame body central axis FBCA and substantially parallel to the feed roll axis of rotation FRR. The cross member 1512 includes the base 1514, which is generally rectangular in section view as bisected by the frame body vertical plane FBVP, and the blade cover 1540 which extends in the forward direction F from a planar front surface 1516 of the base. The blade cover 1240 includes the planar upper blade support surface 1542 which provides a seating surface for the lower surface 1419 of the blade 1400. The pivot upright 1520 extends vertically or axially from a first end portion 1514a of the base 1514, while the latch upright 1530 extends vertically or axially from the second end portion 1514b of the base 1514. The pivot upright 1520 includes the pivot fastener opening 1522 through which the pivot pin fastener 1550 extends. The pivot pin fastener 1550 defines the blade retainer plate pivot axis BRPA. The blade retainer plate 1510, in moving between the first blade retaining position 1598 and the second blade changing position 1599 pivots about the blade retainer plate pivot axis BRPA over a swing angle SWG that subtends approximately 90°. As schematically depicted in FIG. 5, the swing angle SWG is sufficient such that in the second blade changing position 1699, the blade retainer plate 1510 is spaced from the entirety of the blade 1400 and the blade-changing region 1594 vertically below and adjacent to the blade 1400. In the second, blade changing position 1599, the position of the trimming tool 1000 will typically be inverted from the orientation shown in FIG. 5 such that when the blade retainer plate 1510 is pivoted or swung away from the blade 1400, the blade 1400 will be resting on the blade support plate 1272 of the blade support assembly 1250 and will remain in place until an operator grasps the blade 1400.

Figure 4:
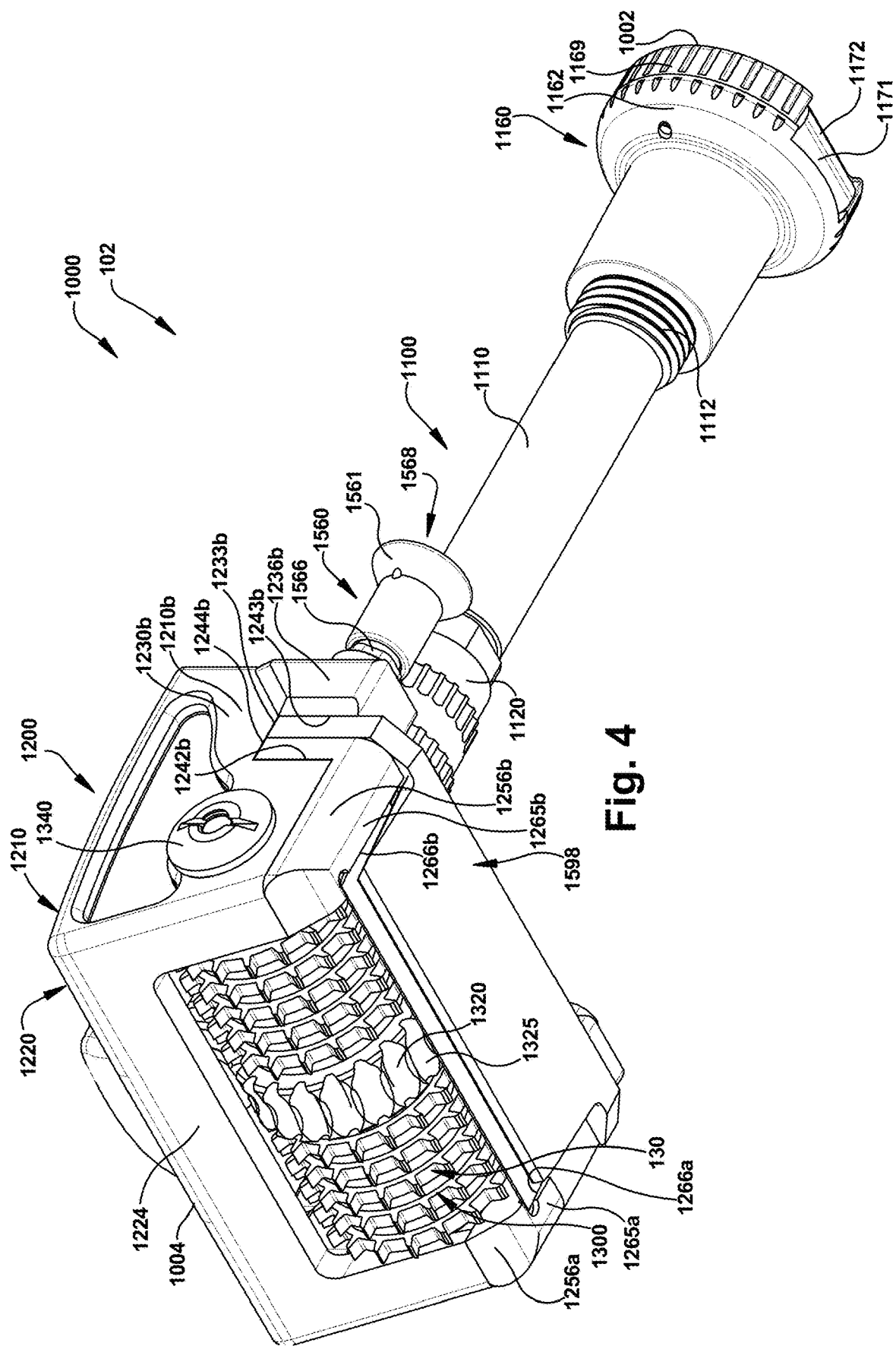
FIG. 4 is a schematic bottom, front perspective view of the power operated trimming tool of FIG. 1, with the blade retainer assembly in a first blade retaining position.

As best seen in FIG. 4, a width of the blade cover 1540, as measured along the feed roll axis of rotation FRR, is advantageously sized such that the upper blade support surface 1542 supports substantially the entirety of the lower surface 1419 of the blade 1400 and at the same time the blade cover 1540 is received with the lateral distance or width between inwardly facing surfaces 1266a, 1266b of the lower surfaces 1265a, 1265b of the horizontal bases 1256a, 1256b of the brackets 1254a, 1254b of the frame 1252 of the blade support assembly 1250. In this way, a lower surface of head member 1200 in the region of the feed roll 1302, as defined by exposed lower surfaces of the blade support assembly 1250, the blade retainer assembly 1500 and the blade 1400 are substantially planar. The planar extent of the exposed lower surfaces of the blade support assembly 1250, the blade retainer assembly 1500 and the blade 1400 allow for the trimming tool 1000 to be smoothly and uniformly advanced in the forward direction F along a workpiece by action of the rotating feed roll 1302 to trim an upper layer of tissue from the workpiece. As is schematically depicted in FIG. 10, the blade 1400 is angled upwardly slightly with respect to a generally horizontal planar lower surface of the blade cover 1540 of the blade retainer plate 1510 of the blade retainer assembly 1500.

Trimmed tissue or material flows from the cutting edge 1420 at the forward or front side 1410 of the blade 1400 rearwardly and slightly upwardly (given the cutting angle of the blade 1400) along the upper surface 1418 of the blade and then rearwardly and upwardly along a forward surface of the angled projections 1577 of the comb 1570 and out the exit opening 1595 defined by the frame body 1210, the blade support plate 1272 of the blade support assembly 1250, and the blade retainer plate 1510 of the blade retainer assembly 1500. Advantageously, by varying the thickness of the blade support plate and the angular orientations of facing lower and upper blade supporting surfaces 1274, 1542 of the blade support plate 1272 of the blade support assembly 1250 and the blade retainer plate 1510 of the blade retainer assembly 1500, a distance or cutting depth between the cutting edge 1420 of the blade 1400 and the outer surface 1312 of the feed roll 1302 may be adjusted. As noted previously and as shown in FIG. 3, the cutting edge 1420 of the blade 1400 is in proximity to the feed roll outer surface 1312 and may be positioned just slightly forward of the frame body central axis FBCA. In other exemplary embodiments, the cutting edge 1420 of the blade 1400 may be even with or slightly rearward of the frame body central axis FBCA. Thus, the cutting depth is determined by a vertical distance between the cutting edge 1420 of the blade 1400 and the outer surface 1312 of the feed roll 1302. Similarly, the angular orientation of the blade 1400 with respect of the feed roll 1302 may similarly be adjusted to provide different cutting angles of the blade for different trimming applications. That is, the power operated trimming tool 1000 may advantageously be utilized with several matching sets of blade support frames 1252 and blade retainer plates 1510, all of the sets being sized to be interchangeably received within the u-shaped notches 1233a, 1233b of the frame body 1210. Thus, depending on the trimming application to be performed by the trimming tool 1000, the matching set of blade support frame and retainer plate which provides the most optimal cutting depth and cutting angle for the application will be selected and installed on the frame body 1210. By way of example, it is envisioned that the cutting depth between the upper surface 1418 of the blade 1400 and the outer surface 1312 of the feed roll 1302 could vary between 0.01 in and 0.06 in., depending on the specific trimming/cutting application to be performed with the trimming tool 1000.

Drive Mechanism 1600

As best seen in FIGS. 3, 10 and 12, in one exemplary embodiment, the drive mechanism 1600 comprises a drive gear 1602 which supported for rotation about the drive mechanism axis of rotation DMR by the shaft support assembly 1680. The drive mechanism axis of rotation DMR is substantially aligned with and coincident with the handle assembly longitudinal axis LA. The drive gear 1602 includes a cylindrical shaft 1611 (FIG. 12), the worm gear driver 1620 at a distal end portion of the cylindrical shaft 1611 and a driven fitting 1630 formed in a proximal end portion of the cylindrical shaft 1611. In one exemplary embodiment, the distal end portion of the cylindrical shaft 1611 includes an exterior threaded region 1613 and the worm gear driver 1620 is fabricated as a separate component. The worm gear driver 1620 includes a mating threaded central opening. The threaded central opening of the worm gear driver 1620 threads onto the threaded region 1613 of the cylindrical shaft 1611 to secure the worm gear driver 1620 to the shaft 1611. The worm gear driver 1620 includes a disk-shaped locating plate which abuts a shoulder of the cylindrical shaft 1611 proximal to the threaded region to positively locate the worm gear driver 1620 with respect to a longitudinal extent of the cylindrical shaft 1611.

As best seen in FIGS. 10 and 12, in one exemplary embodiment, the driven fitting 1630 is formed as a socket in the enlarged diameter, proximal end portion of the cylindrical shaft 1611. The cylindrical shaft 1611 includes a central cylindrical body portion which is received in the shaft support assembly 1680 to support the drive gear 1602 for rotation about the drive mechanism axis of rotation DMR. The driven fitting 1630 is sized to receive the distal drive fitting 2373 of the driver shaft 2370 of the driver assembly 2300. In one exemplary embodiment, the shaft support assembly 1680 advantageously includes the first distal bearing support assembly 1682 and the second proximal bearing support assembly 1684 which support the cylindrical shaft 1611 of the drive gear 1602. In one exemplary embodiment, as depicted schematically in FIG. 10, the first and second bearing support assemblies 1682, 1684 are ball bearing support assemblies and are supported in the bearing seating region 1134 of a distal section 1132 of an inner surface 1130 of the handle extension 1130 of the handle assembly 1100. Advantageously, by locating the first and second bearing support assemblies 1682, 1684 within the handle throughbore 1102, as opposed to the frame body 1210, and locating the driver assembly 1716 of the tool end coupling 1714 within the handle throughbore 1102, results in precise longitudinal alignment of the drive mechanism axis of rotation DMR and the axis of rotation DSR of the driver shaft 2370 of the driver assembly 2300, which avoids undesirable premature component wear, trimming tool chatter and vibration problems associated with misalignment of the drive mechanism and driver shaft axes of rotation DMR, DSR.

Feed Roll Assembly 1300

As best seen in FIG. 11, the feed roll assembly 1300 is supported by the first and second side walls 1233a, 1233b of the frame body 1210 and includes the generally cylindrical feed roll 1302 supported for rotation about the feed roll axis of rotation FRR by the feed roll shaft 1340. The feed roll shaft 1340 does not rotate; rather the feed roll 1302 rotates on the feed roll shaft 1340. The feed roll shaft 1340 is supported, in turn, by the first and second side walls 1230a, 1230b of the frame body 1210. In one exemplary embodiment, the feed roll 1302 includes an inner surface defining a throughbore and a radially spaced apart outer surface 1312. The feed roll shaft 1340 extends though the throughbore and the feed roll 1302 is rotated on the feed roll shaft 1340 by the drive gear 1602 of the drive mechanism 1600. The outer surface 1312 of the feed roll 1302 includes the central portion 1320 which defines the outwardly protruding worm wheel 1325. The worm wheel 1325, which, in one exemplary embodiment is a spur gear having a plurality of circumferentially spaced apart gear teeth, is operatively engaged by the worm gear driver 1620, which is a helical gear, of the drive gear 1602 and, as the drive gear 1602 rotates about the drive mechanism axis of rotation DMR, the feed roll 1302 is rotationally driven about its axis of rotation FRR.

In one exemplary embodiment, the outer diameter of the outer surface 1312 of the feed roll 1302 is approximately 1.43 in. In one exemplary embodiment, a length of the feed roll 1302 between first and second ends 1316, 1318 is approximately 2.75 in. In one exemplary embodiment, the feed roll 1302 is driven at a rotational speed of approximately 325 revolutions per minute and a minimum gap between the upper surface 1418 of the blade 1400 and an extending outermost surface of the outer surface 1312 of the feed roll 1302 has a range of approximately 0.01-0.06 in., depending on the thickness of the blade cover 1540 of the blade retainer plate 1510. As would be understood by one of skill in the art, the foregoing dimensions and rotational speeds may vary depending on the characteristics of the workpiece, the desired trimming operations to be performed and other factors.

In one exemplary embodiment, the handle assembly 1100 of the power operated trimming tool 1000 may be fabricated of plastic or other material or materials known to have comparable properties and may be formed by molding and/or machining. The frame body 1210 may be fabricated of aluminum or stainless steel or other material or materials known to have comparable properties and may be formed/shaped by casting and/or machining. The knife blade 1400, components of the feed roll assembly 1300, the blade support assembly 1250, the blade retainer assembly 1500, and the drive mechanism 1600 may be fabricated of a hardenable grade of alloy steel or a hardenable grade of stainless steel, or other material or materials known to have comparable properties and may be formed/shaped by machining, forming, casting, forging, extrusion, metal injection molding, additive manufacturing and/or electrical discharge machining or another suitable process or combination of processes. Various components of the clutch drive engagement assembly 2500 including the driveline coupler 2600, the driver coupler 2700, the housing 2800, the actuation collar assembly 2880 and the lever assembly 2900 may be fabricated of a hardenable grade of alloy steel or a hardenable grade of stainless steel, or other material or materials known to have comparable properties and may be formed/shaped by machining, forming, casting, forging, extrusion, metal injection molding, additive manufacturing and/or electrical discharge machining or another suitable process or combination of processes.

With respect to the description of the power operated trimming tool 1000 and components and assemblies thereof, the forward direction F is a direction along or parallel to the handle assembly longitudinal axis LA toward the distal end 1004 of the power operated trimming tool 1000, while the rearward direction R is opposite the forward direction F, the upward direction UP is along or parallel to the frame body central axis FBCA in a direction toward the upper wall 1230 of the support portion 1220 of the frame body 1210, while the downward direction DW is opposite the upward direction UP.

Annular, as used herein, means generally ring-like or generally ring-shaped in configuration and includes configurations wherein the ring includes or does not include a split extending through a diameter of the ring or annulus. Axially above or axially spaced above, as used herein, means positioned above as viewed with respect to an axis, for example, the frame body central axis FBCA, even if the two elements are not in axial alignment with respect to the axis. Similarly, the terms axially below or axially spaced below, as used herein, means positioned below as viewed with respect to an axis, even if the two elements are not in axial alignment with respect to the axis. Axially extending, as used here, means one element extends from and is positioned above or below a second element with respect to an axis, even if the two elements are not in axial alignment with respect to the axis. Similarly, the terms radially offset from, radially outward of, radially inward of, as used herein, means one element is positioned offset from a second element, as viewed along a radius line extending radially from an axis, even if the two elements are not in radial alignment along the radius line.

As used herein, terms of orientation and/or direction such as front, rear, forward, rearward, distal, proximal, distally, proximally, upper, lower, inward, outward, inwardly, outwardly, upwardly, downwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure or invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A clutch drive engagement assembly coupled between a flexible shaft drive transmission and a driver assembly insertable into a handle assembly of a power operated tool, the flexible shaft drive transmission including an outer casing and an elongated shaft rotatable within the outer casing about a central axis of rotation, the outer casing including a drive engagement coupling and the driver assembly including a driver shaft rotatable within a tube assembly to provide rotational power to a drive train of the power operated tool, the tube assembly including a drive engagement coupler, the clutch drive engagement assembly comprising:

a) a housing affixed to and extending between the drive engagement coupling of the outer casing of the flexible shaft drive transmission and the drive engagement coupler of the tube assembly of the driver assembly, the housing extending along a longitudinal axis and including a proximal end and an axially spaced apart distal end and a side wall including an inner surface and a radially spaced outer surface, the inner surface defining a longitudinally extending throughbore extending between the proximal and distal ends of the housing, the side wall including an opening, the proximal end of the housing affixed to the drive engagement coupling of the outer casing of the flexible shaft drive transmission and the distal end of the housing affixed to the drive engagement coupler of the tube assembly of the driver assembly;

b) an activation collar assembly extending through the opening of the housing side wall and including a body slidably mounted on the housing and a first bearing assembly supported within the throughbore of the housing, the activation collar assembly moveable axially with respect to the longitudinal axis of the housing between a first deactivation position and a second activation position;

c) a driveline coupler supported for rotation about a clutch axis of rotation within the throughbore of the housing by the first bearing assembly of the activation collar assembly and moving with the activation collar assembly between the first deactivation position and the second activation position, the driveline coupler including a proximal portion and an axially spaced apart distal portion, the proximal portion coupled to the elongated shaft of the flexible shaft drive transmission such that the driveline coupler rotates with the elongated shaft and the distal portion including a first clutch plate having a first clutch engagement surface;

d) a driver coupler supported for rotation about the clutch axis of rotation within the throughbore of the housing, the driver coupler including a distal portion coupled to the driver shaft of the driver assembly to rotate the driver shaft as the driver coupler rotates about the driver coupler axis of rotation and a proximal portion including a second clutch plate having a second clutch engagement surface; and e) wherein as the activation collar assembly is moved from the first deactivation position to the second activation position, the first clutch engagement surface of the first clutch plate of the driveline coupler engages the second clutch engagement surface of the second clutch plate of the driver coupler to rotate the driver coupler as the driveline coupler rotates about the clutch axis of rotation.

2. The clutch drive engagement assembly of claim 1 wherein the activation collar assembly further includes a radially inwardly extending projection coupled to the body and extending through the side wall of the housing and a bearing guide coupled to the radially inwardly extending projection and disposed in the throughbore of the housing, the bearing guide supporting at least a portion of the first bearing assembly.

3. The clutch drive engagement assembly of claim 2 the first bearing assembly includes a first bearing and a second bearing and a bearing collar secured to a shaft of the driveline coupler, the first bearing assembly providing radial and thrust bearing support to a bearing region of the shaft of the driveline coupler to support the driveline coupler for rotation about the clutch axis of rotation.

4. The clutch drive engagement assembly of claim 3 wherein the bearing guide of the activation collar assembly includes a side wall with a longitudinally extending slot, the radially inwardly extending projection of the activation collar assembly extending into the slot to couple the bearing guide to the body of the activation collar assembly.

5. The clutch drive engagement assembly of claim 1 wherein the first clutch plate is slidably mounted on the distal portion of the driveline coupler and the clutch drive engagement assembly further includes a biasing assembly including a first biasing member interposed between the driveline coupler and the first clutch plate to bias the first clutch plate axially toward the second clutch engagement surface of the second clutch plate of the driver coupler.

6. The clutch drive engagement assembly of claim 5 wherein the biasing assembly includes a second biasing member interposed between the bearing guide and an inwardly stepped portion of the inner surface of the side wall of the housing to bias the actuation collar assembly and the driveline coupler in an axial direction toward the proximal end of the housing.

7. The clutch drive engagement assembly of claim 1 wherein the housing includes a first proximal housing part and a second distal housing part, the first proximal housing part including a forward portion and a rearward portion and the second distal housing part including a rearward portion having an interface end received in the forward end portion of the first proximal housing part, the radially extending opening through the side wall of the housing being defined by a longitudinally extending slot of the rearward portion of the second distal housing part.

8. The clutch drive engagement assembly of claim 7 wherein the interface end of the rearward portion of the second distal housing part includes a threaded inner surface portion and the forward portion of the first proximal housing part includes a threaded outer surface portion, the first proximal housing part and the second distal housing part being coupled via a threaded engagement of the threaded inner surface portion of the rearward portion of the second distal housing part and the threaded outer surface portion of the forward portion of the first proximal housing part.

9. The clutch drive engagement assembly of claim 1 wherein the driveline coupler includes a shaft including a radially outwardly extending bearing region intermediate the proximal and distal end portions of the driveline coupler, the radially outwardly extending bearing region including a first cylindrical portion, a second cylindrical portion and an enlarged diameter annular rim intermediate the first and second cylindrical portions, the first bearing assembly abutting the enlarged diameter rim.

10. The clutch drive engagement assembly of claim 1 further including a lever assembly coupled to the housing and rotatable about the longitudinal axis of the housing, the lever assembly movable between a first lever assembly position and a second lever assembly position, the lever assembly contacting the body of the activation collar assembly and moving the activation collar assembly to the second activation position as the lever assembly is moved from the first lever assembly position to the second lever assembly position.

11. The clutch drive engagement assembly of claim 10 wherein the body of the activation collar assembly includes an inclined contact surface and the lever assembly includes a lever support and a lever pivotally attached to the lever support at a first end portion of the lever, the lever including a gripping portion spaced from the first end portion of the lever, the gripping portion defining a longitudinal axis of the lever, the lever further including a projection engaging the inclined contact surface of the body of the actuation collar assembly, as the lever assembly moves from the first lever assembly position to the second lever assembly position, the lever pivots with respect to the lever support such that the gripping portion of the lever moves toward the housing and the lever projection slides along the inclined contact surface of the body to move the activation collar assembly axially from the first deactivation position to the second activation position.

12. A power operated trimming tool comprising:
   a) an elongated handle assembly including a throughbore extending along a longitudinal axis of the handle assembly;
   b) a head assembly affixed to the handle extension of the handle assembly, the head assembly including a frame body supporting a feed roll, a blade and a blade retainer assembly;
   c) the feed roll supported for rotation about a feed roll axis of rotation;
   d) the blade including a forward side, a back side, first and second lateral sides extending between the forward and back sides and an upper surface and a lower surface, a cutting edge of the blade extending along the forward side, the cutting edge being in proximity to an outer surface of the feed roll;
   e) the frame body including an interface portion and a support portion extending from the interface portion, the interface portion coupled to a distal end portion of the handle assembly to couple the head assembly to the handle assembly, the support portion defining an interior region and including an upper wall and first and second side walls extending from the upper wall, the first side wall including a first upwardly extending notch formed in a lower surface of the first side wall and the second side wall including a second upwardly extending notch formed in a lower surface of the second side wall;
   f) a blade support affixed to the frame body and overlying at least a portion of the upper surface of the blade; and
   g) a blade retainer plate assembly including a blade retainer plate pivotally coupled to first side wall of the frame body to pivot between a first, blade retaining position and a second, blade changing position, the blade retainer plate including a first upright and a second upright and a cross member extending between the first and second uprights, the first upright extending into the first upwardly extending notch of the first side wall of the support portion of the frame body and, in the first, blade retaining position of the blade retainer plate, the second upright extending into the second upwardly extending notch of the second side wall of the support portion of the frame body and the blade retainer plate overlying at least a portion of the lower surface of the blade.

13. The power operated trimming tool of claim 12 wherein the blade support includes a first bracket, a second bracket and a cross member extending between the first and second brackets and including a blade support surface, the first bracket overlying a portion of the lower surface of the first side wall of the support portion of the frame body and including a first projection extending into the first upwardly extending notch of the first side wall and the second bracket overlying a portion of the lower surface of the second side wall of the support portion of the frame body and including a second projection extending into the second upwardly extending notch of the second side wall, the blade positioned on the cross member such that the blade support surface overlies at least a portion of the upper surface of the blade.

14. The power operated trimming tool of claim 13 wherein the blade retainer assembly further includes a pivot fastener and a first opening through the first upright and the first projection of the first bracket of the blade support further includes a first opening through the first projection and the frame body further includes a first opening in the first side wall of the support portion of the frame body, the first opening of the first upright, the first opening of the first projection and the first opening in the first side wall being aligned, the pivot fastener extending through the first opening of the first upright, the first projection and extending into the first opening in the first side wall to couple the first upright and the first projection to the first side wall, the pivot fastener defining a pivot axis of the blade retainer plate, the pivot axis extending through and parallel to the first side wall of the support portion of the frame body.

15. The power operated trimming tool of claim 12 wherein the cross member of the blade retainer plate includes a base positioned in proximity to the back side of the blade to constrain the blade from movement in a rearward direction with respect to the cross member of the blade retainer plate.

16. The power operated trimming tool of claim 15 wherein the cross member of the blade retainer plate further includes a blade cover extending from the base, the blade cover including a planar blade support surface.

17. The power operated trimming tool of claim 12 wherein the blade retainer assembly further includes a pivot fastener and a first opening through the first upright of the blade retainer plate and the frame body further includes a first opening in the first side wall of the support portion of the frame body, the first opening of the first upright and the first opening in the first side wall being aligned.

18. The power operated trimming tool of claim 17 wherein the pivot fastener defines a pivot axis of the blade retainer plate, the pivot axis extending through and parallel to the first side wall of the support portion of the frame body.

19. The power operated trimming tool of claim 17 wherein the blade retainer assembly further includes a latch fastener and a second slot through the second upright, the second slot including an exit opening at an end of the second upright, the frame body further includes a second opening in the second side wall of the support portion of the frame body, the second slot of the second upright and the second opening in the second side wall being aligned, the latch fastener extending through the second slot of the second upright and extending into the first opening in the second side wall, in a first, latched position of the latch fastener, a first portion of the latch fastener extending through the second slot of the second upright constraining the blade retainer plate from pivoting from the first, blade retaining position to the second, blade changing position and, in a second, unlatched position of the latch fastener, a second portion of the latch fastener extending through the second slot of the second upright passing through the second slot to permit the blade retainer plate to pivot from the first, blade retaining position to the second, blade changing position.

20. The power operated trimming tool of claim 19 wherein the latch fastener includes a shaft having first larger diameter section and second smaller diameter section, the first portion of the latch fastener corresponding to the first larger diameter section of the shaft and the second portion of the latch fastener corresponding to the second smaller diameter section of the shaft.

21. The power operated trimming tool of claim 19 wherein the pivot fastener defines a pivot axis of the blade retainer plate, the pivot axis extending through and parallel to the first side wall of the support portion of the frame body and the latch fastener extends parallel to the pivot axis.

\* \* \* \* \*